United States Patent
Utoh et al.

(10) Patent No.: US 11,184,493 B2
(45) Date of Patent: Nov. 23, 2021

(54) INFORMATION PROCESSING SYSTEM, INFORMATION PROCESSING METHOD, AND APPARATUS FOR EXTENDING A WORKFLOW

(71) Applicants: Yohsuke Utoh, Kanagawa (JP); Tomoyuki Tazuke, Tokyo (JP)

(72) Inventors: Yohsuke Utoh, Kanagawa (JP); Tomoyuki Tazuke, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/922,250

(22) Filed: Jul. 7, 2020

(65) Prior Publication Data
US 2021/0014371 A1 Jan. 14, 2021

(30) Foreign Application Priority Data

Jul. 10, 2019 (JP) .............................. JP2019-128744
May 15, 2020 (JP) .............................. JP2020-086328

(51) Int. Cl.
| | | |
|---|---|---|
| *G06F 3/12* | (2006.01) | |
| *H04N 1/00* | (2006.01) | |
| *H04N 1/32* | (2006.01) | |
| *H04N 1/23* | (2006.01) | |

(52) U.S. Cl.
CPC ..... *H04N 1/00413* (2013.01); *H04N 1/00411* (2013.01); *H04N 1/00811* (2013.01); *H04N 1/233* (2013.01); *H04N 1/32128* (2013.01)

(58) Field of Classification Search
None
See application file for complete search history.

(56) References Cited

U.S. PATENT DOCUMENTS

| | | |
|---|---|---|
| 8,578,197 B2 | 11/2013 | Utoh |
| 8,713,341 B2 | 4/2014 | Utoh |
| 8,897,662 B2 | 11/2014 | Tsukahara et al. |
| 8,913,262 B2 | 12/2014 | Utoh et al. |
| 9,111,209 B2 | 8/2015 | Utoh et al. |

(Continued)

FOREIGN PATENT DOCUMENTS

| | | |
|---|---|---|
| JP | 2018-007085 | 1/2018 |
| JP | 2018-037923 | 3/2018 |

*Primary Examiner* — Henok Shiferaw
(74) *Attorney, Agent, or Firm* — IPUSA, PLLC

(57) ABSTRACT

An information processing system includes a service providing system and an apparatus that mutually communicate via a network. The service providing system includes a processing method storage configured to register a processing method in association with identification information of output data; and a first communicator that transmits, to the apparatus, the output data to which the identification information is appended. The apparatus includes an outputter that outputs the output data received from the service providing system together with the identification information; an inputter that accepts input of input data based on the output data output by the outputter; and a second communicator that transmits, to the service providing system, the input data input by the inputter, to which the identification information is appended. The service providing system performs a process on the input data by the processing method associated with the identification information appended to the input data.

13 Claims, 58 Drawing Sheets

(56) References Cited

U.S. PATENT DOCUMENTS

| | | |
|---|---|---|
| 9,483,220 B2 | 11/2016 | Kimura et al. |
| 9,584,687 B2 | 2/2017 | Watanabe et al. |
| 9,817,463 B2 | 11/2017 | Yoshida et al. |
| 9,961,224 B2 | 5/2018 | Utoh |
| 10,270,657 B2 | 4/2019 | Utoh |
| 10,416,940 B2 | 9/2019 | Asakimori et al. |
| 10,587,766 B2 | 3/2020 | Utoh |
| 2011/0090534 A1* | 4/2011 | Terao ................ H04N 1/32561 358/1.15 |
| 2014/0085669 A1* | 3/2014 | Kashimoto ........ G06K 9/00469 358/1.15 |
| 2014/0093170 A1* | 4/2014 | Ohguro .................... G06K 9/78 382/176 |
| 2014/0333963 A1* | 11/2014 | Nakamura .............. H04L 67/16 358/1.15 |
| 2015/0304520 A1* | 10/2015 | Nakamura ......... H04N 1/00411 358/403 |
| 2016/0094748 A1 | 3/2016 | Utoh |
| 2016/0124690 A1* | 5/2016 | Kimura ................ G06F 3/1242 358/1.15 |
| 2016/0212298 A1* | 7/2016 | Hama .................. G06K 9/2081 |
| 2017/0013169 A1* | 1/2017 | Kim .................... H04N 1/4413 |
| 2018/0349078 A1* | 12/2018 | Yoshihashi ............. H04L 67/16 |
| 2020/0097162 A1* | 3/2020 | Hayashi .............. G06F 3/04847 |
| 2020/0162627 A1 | 5/2020 | Utoh et al. |

* cited by examiner

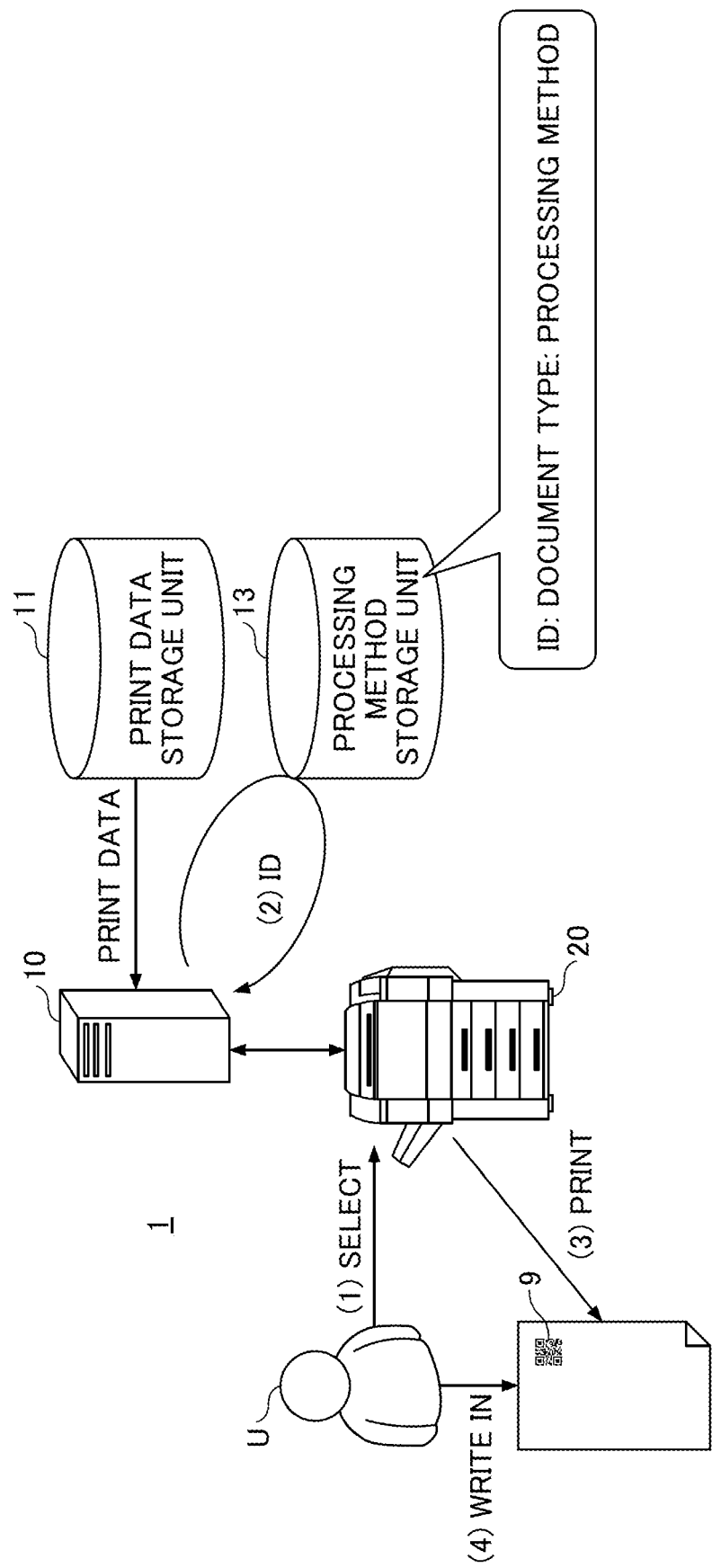

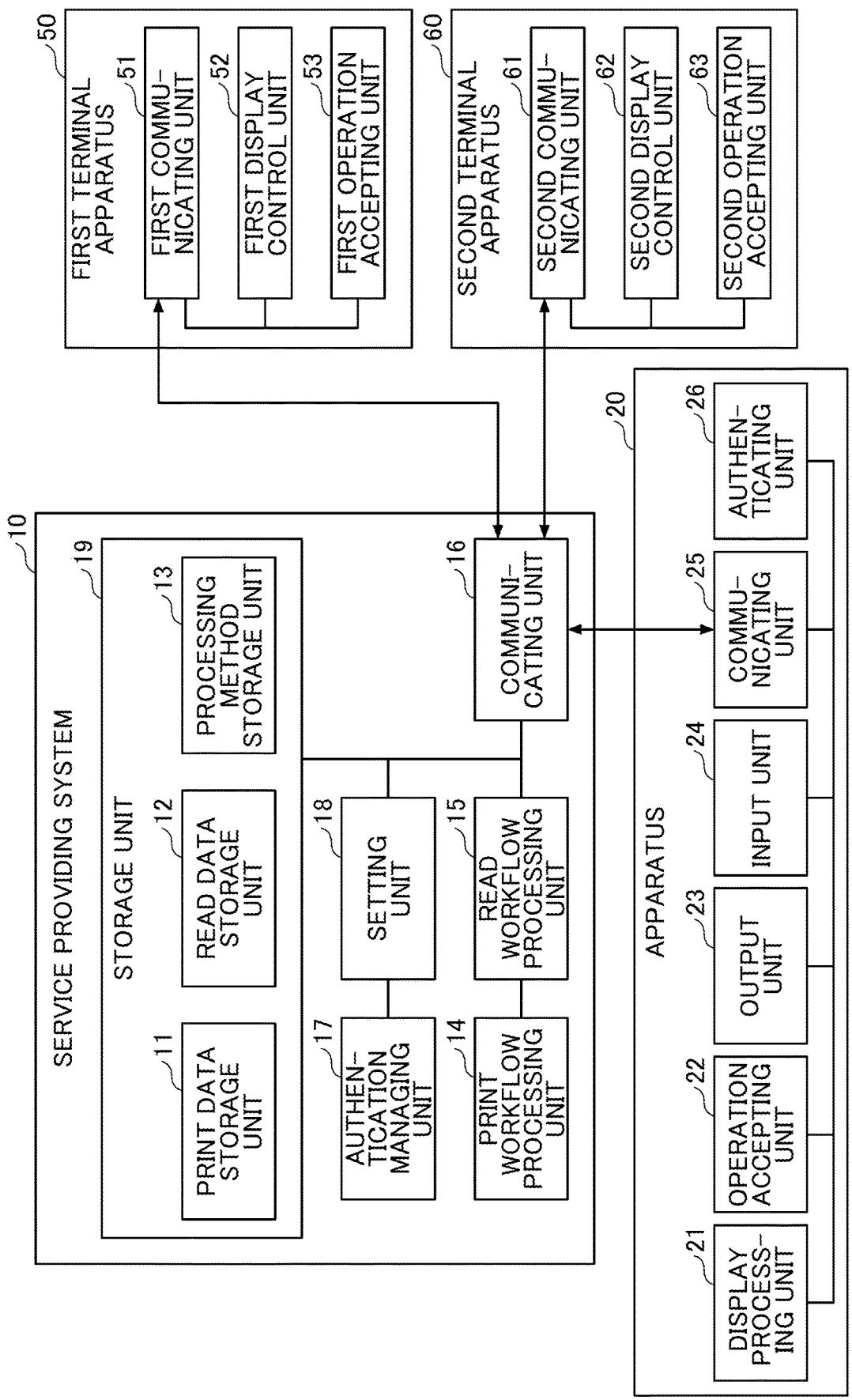

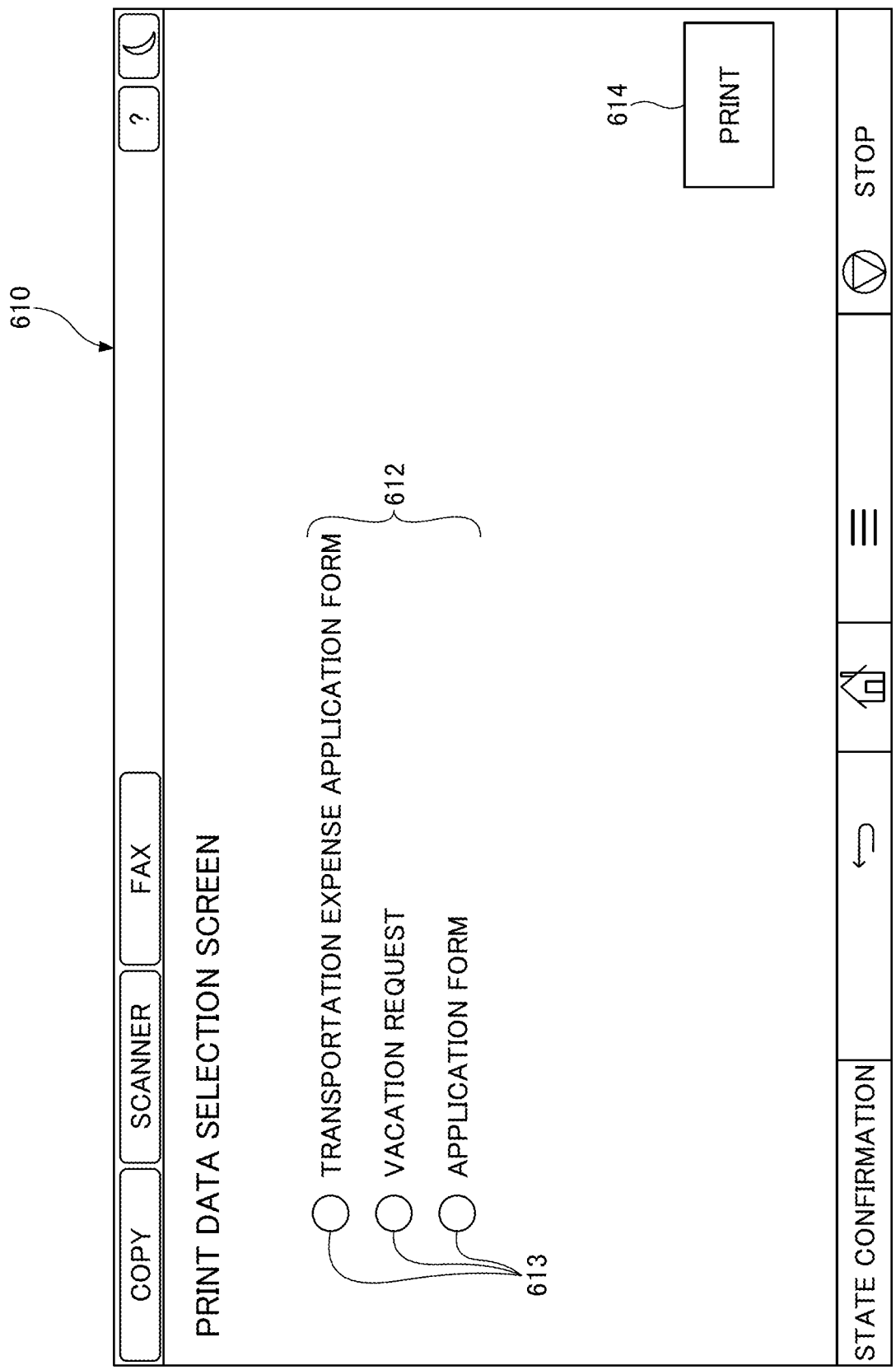

VACATION REQUEST

THIS IS A REQUEST FOR A VACATION.

NAME
DEPARTMENT
ADDRESS

BEFORE APPENDING

VACATION REQUEST 　9

THIS IS A REQUEST FOR A VACATION.

NAME
DEPARTMENT
ADDRESS

AFTER APPENDING

FIG.20

OCR ON IMAGE → TRANSMIT IMAGE TO CLOUD A → TRANSMIT MAIL → FAX TRANSMISSION

FIG.21

| ID | DOCUMENT TYPE | TRANSMISSION DESTINATION (FOLDER) | REPORT DESTINATION | FAX TRANSMISSION DESTINATION |
|---|---|---|---|---|
| paper_id_001 | INVOICE | /seikyuu FOLDER AND BELOW | aaa@bb.cc | 03-XXXX-XXXX |
| paper_id_002 | TRANSPORTATION EXPENSE APPLICATION FORM | /koutuu FOLDER AND BELOW | NONE | 06-XXXX-XXXX |
| paper_id_003 | VACATION REQUEST | /kyuuka FOLDER AND BELOW | ccc@bb.cc | 03-XXXX-XXXX |

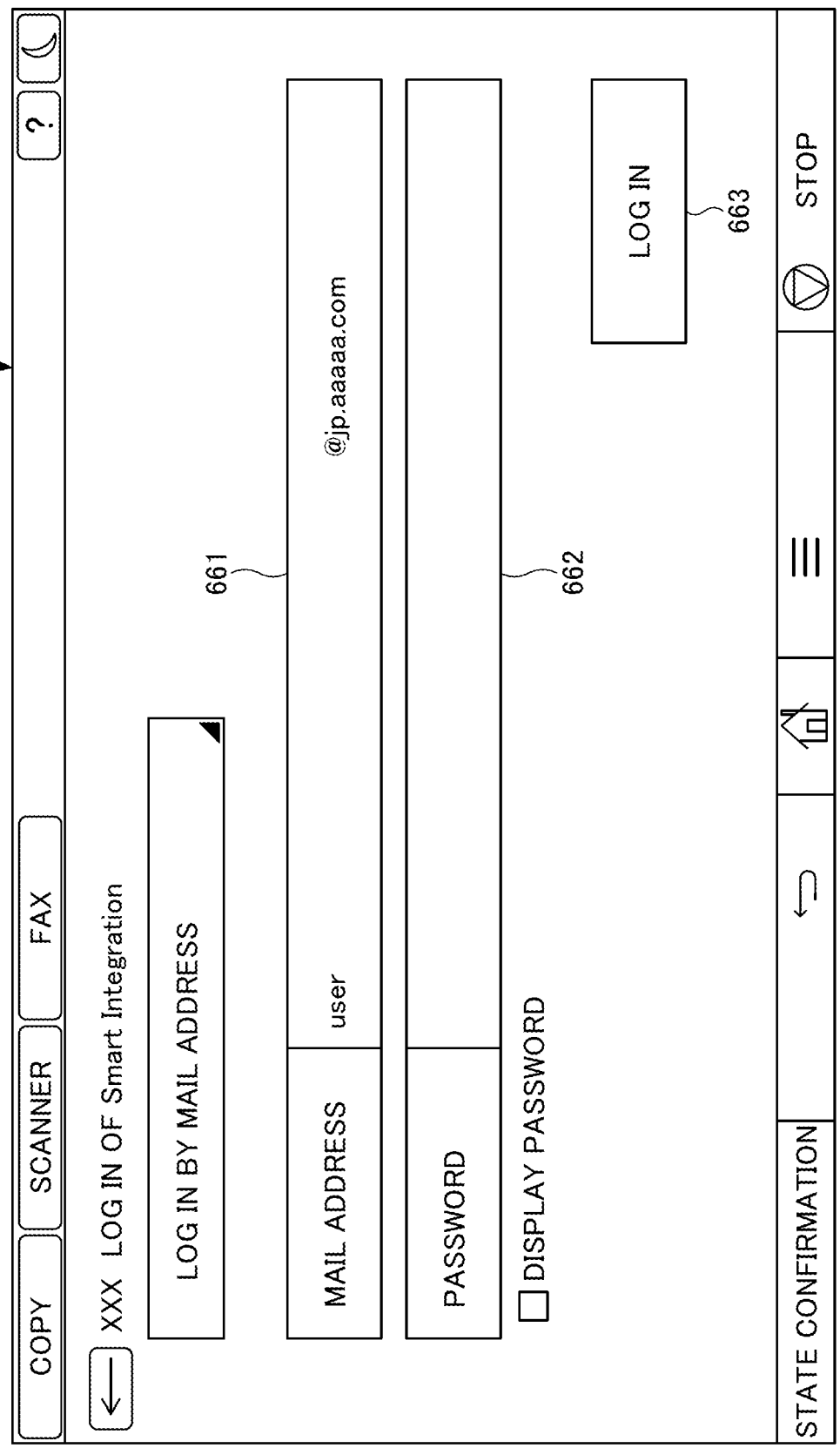

FIG.36A

COMMON I/F OF FILE PROCESSING UNIT

| COMMON I/F | OUTLINE |
|---|---|
| /EXTERNAL SERVICE NAME/process/file | ACQUIRE FILE FROM SPECIFIED STORAGE SERVICE |
| /EXTERNAL SERVICE NAME/process/folder | STORE FILE IN SPECIFIED STORAGE SERVICE |
| ... | ... |

FIG.36B

UNIQUE I/F OF FILE PROCESSING UNIT

| UNIQUE I/F | OUTLINE |
|---|---|
| /EXTERNAL SERVICE NAME/process/extension/attach | APPEND FILE TO DOCUMENT STORED IN SPECIFIED STORAGE SERVICE |
| ... | ... |

FIG.36C

COMMON I/F OF DATA PROCESSING UNIT

| COMMON I/F | OUTLINE |
|---|---|
| /EXTERNAL SERVICE NAME/data/files | ACQUIRE FILE LIST FROM SPECIFIED STORAGE SERVICE |
| /EXTERNAL SERVICE NAME/data/folders | ACQUIRE FOLDER LIST IN SPECIFIED STORAGE SERVICE |
| ... | ... |

FIG.36D

UNIQUE I/F OF DATA PROCESSING UNIT

| UNIQUE I/F | OUTLINE |
|---|---|
| /EXTERNAL SERVICE NAME/data/extension/images | ACQUIRE IMAGE FILE LIST FROM SPECIFIED STORAGE SERVICE |
| ... | ... |

FIG.37A

SCAN DELIVERY SERVICE

```
[
  {
    "data_id" : 1,
    "data_key" : "storage_filename",
    "format" : "input_text",
    "data_source" : null
  },                                                          ⎬1101
  {
    "data_id" : 2,
    "data_key" : "storage_targetfolder",
    "format" : "select",
    "data_source" : http://sample.xxx.co.jp/service-a/data/folders
  }                                                           ⎬1102
]
```

FIG.37B

CLOUD PRINT SERVICE

```
[
  {
    "data_id" : 1,
    "data_key" : "storage_targetfiles",
    "format" : "select",
    "data_source" : http://sample.xxx.co.jp/service-a/data/files
  }
]
```

SCAN DELIVERY SERVICE

```
[
  {
    "data_id" : 1,
    "display_name" : "FILE NAME",    ─1301
    "layout" :[
      "order" : 1
    ]
  },
  {
    "data_id" : 2,
    "display_name" : "SELECT STORAGE DESTINATION FOLDER",    ─1302
    "layout" :[
      "order" : 2
    ]
  }
]
```

FIG.38B

CLOUD PRINT SERVICE

```
[
  {
    "data_id" : 1,
    "display_name" : "SELECT PRINT TARGET FILE",    ⎫
    "layout" : [                                    ⎬ 1401
      "order" : 1                                   ⎭
    ]
  }
]
```

FIG.39A

SCAN DELIVERY SERVICE

```
From("file : input")
.to("process : ocr")
.to("storage : send_to_folder ? type=service-a")
```

FIG.39B

CLOUD PRINT SERVICE

```
From("file : input")
.to("storage : recieve_file ? type=service-a")
.to("process : conv")
```

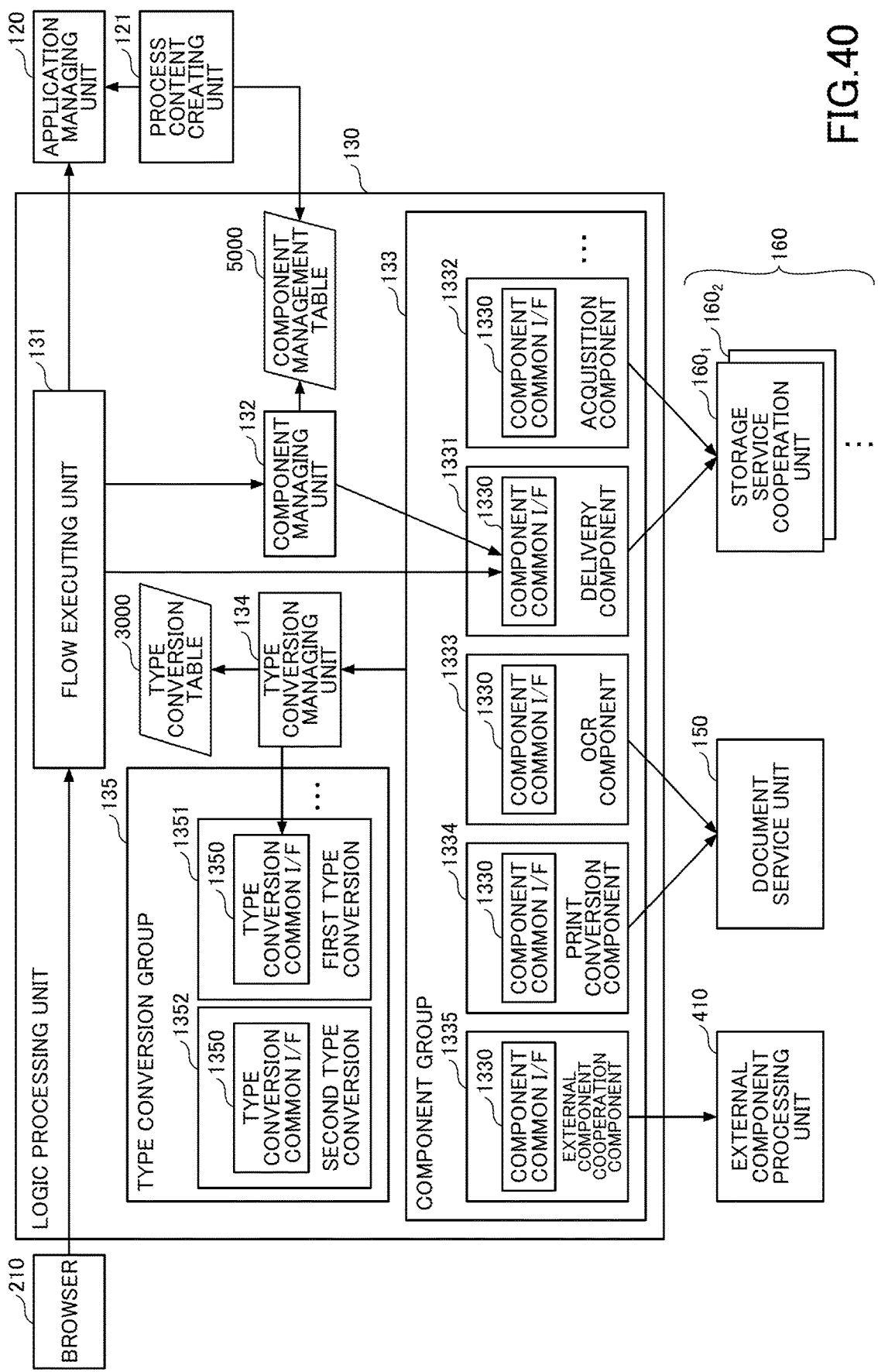

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

FIG.42

| COMPONENT ID | COMPONENT NAME | HOST NAME |
|---|---|---|
| 0001 | send_to_folder | local host |
| 0002 | recieve_file | local host |
| 0003 | ocr | local host |
| 0004 | conv | local host |
| 0005 | send_to_folder α | server2.com |
| 0006 | conv β | server2.com |
| ... | ... | ... |

Scan to STORAGE SERVICE A

PERFORM OCR PROCESS ON SCANNED FILE
AND STORE IN STORAGE A.

FILE NAME [            ] }2001

SELECT STORAGE
DESTINATION FOLDER [FolderA ▼] }2002

[Scan] ~2003

FIG.45B

```
<html>
<head>
...
</head>
<body>
<h1>Scan Sample</h1>

<p><label>FILE NAME</label>
<input id="storage_filename" type="text" name="storage_filename" /></p>  } 2101
<p><label>SELECT STORAGE DESTINATION FOLDER</label>
<select id="storage_targetfolder" name="targetfolder" >
  <option value="folder_id_a">FolderA</option>
  <option value="folder_id_b">FolderB</option>
</select></p>                                                              } 2102
<p><button onclick="scan_function()">Scan</button></p>

</body>
</html>
```

FIG.47

```
From("file : input")
.to("process : ocr")
.to("storage : send_to_folder α ? type=service-b")
```

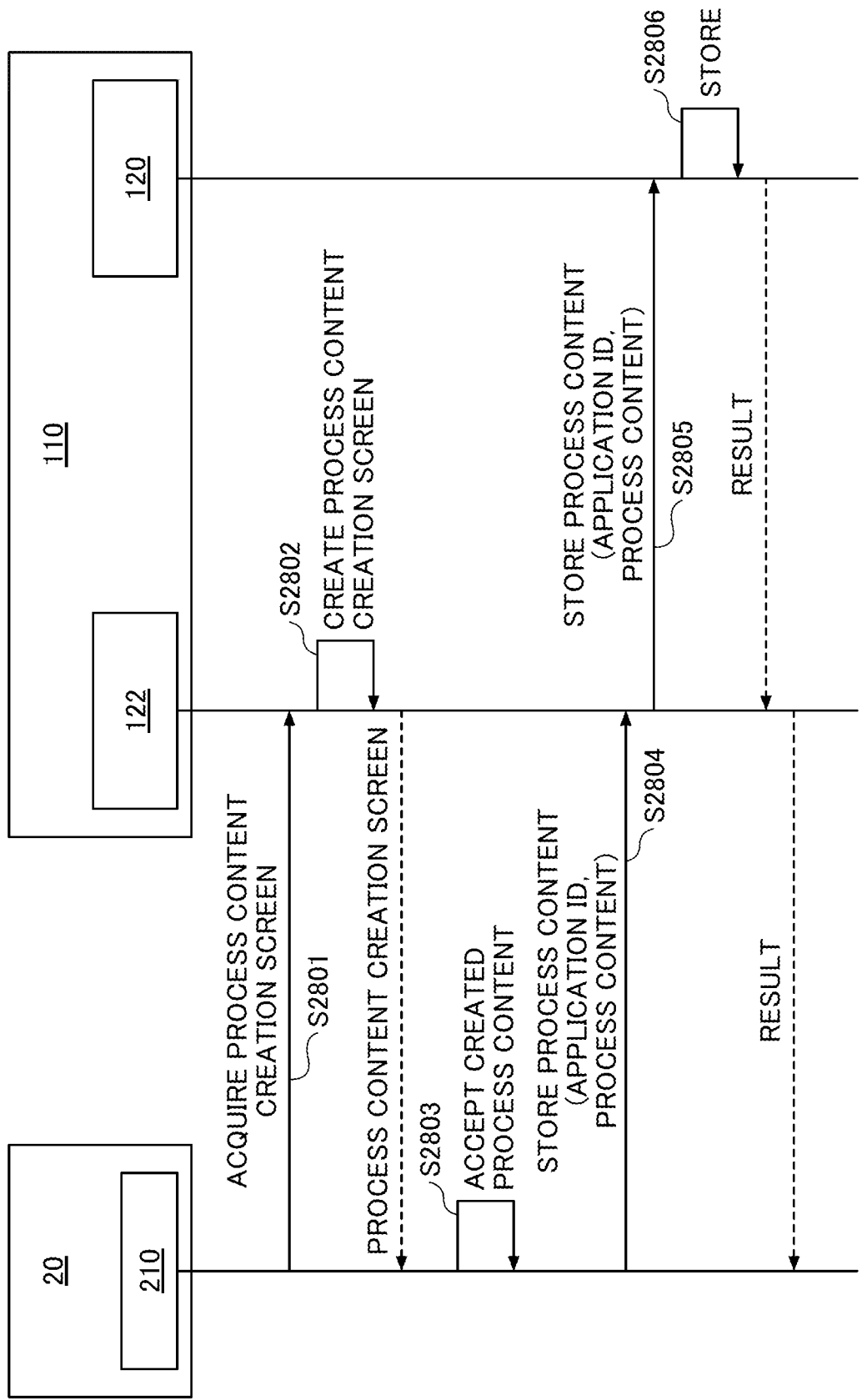

INFORMATION PROCESSING SYSTEM, INFORMATION PROCESSING METHOD, AND APPARATUS FOR EXTENDING A WORKFLOW

CROSS-REFERENCE TO RELATED APPLICATION

The present application is based on and claims priority under 35 U.S.C. § 119 to Japanese Patent Application No. 2019-128744, filed on Jul. 10, 2019, and Japanese Patent Application No. 2020-086328, filed on May 15, 2020, the contents of which are incorporated herein by reference in their entirety.

BACKGROUND OF THE INVENTION

1. Field of the Invention

The present invention relates to an information processing system, an information processing method, and an apparatus.

2. Description of the Related Art

There is known an information processing system that performs one or more processes on image data input by a scanner function or a facsimile receiving function of an apparatus, and that delivers the image data that has undergone the process. Information processing systems are sometimes referred to as workflow systems because a predetermined set of processes (workflow) is performed sequentially on the image data.

There are known techniques for automatically switching a process to be performed by an information processing system (see, for example, Patent Document 1). Patent Document 1 discloses a system in which an image code is formed in a document read by an apparatus, and the information processing system analyzes the image code of the read image data and switches the processing based on the analysis result.

Patent Document 1: Japanese Unexamined Patent Application Publication No. 2018-007085

SUMMARY OF THE INVENTION

According to one aspect of the present invention, there is provided an information processing system including a service providing system; and an apparatus that communicates with the service providing system via a network, wherein the service providing system includes a processing method storage configured to register a processing method in association with identification information of output data to be output by the apparatus; and a first communicator configured to transmit, to the apparatus, the output data to which the identification information of the output data is appended, and wherein the apparatus includes an outputter configured to output the output data received from the service providing system together with the identification information of the output data; an inputter configured to accept input of input data based on the output data output by the outputter together with the identification information of the output data; and a second communicator configured to transmit, to the service providing system, the input data input by the inputter, to which the identification information of the output data is appended, wherein the service providing system performs a process on the input data by the processing method associated with the identification information of the output data appended to the input data.

BRIEF DESCRIPTION OF THE DRAWINGS

FIGS. 1A and 1B are diagrams illustrating an outline of an operation of an information processing system according to a first embodiment of the present invention;

FIG. 5 is an example of a functional block diagram illustrating the functions of a service providing system and an apparatus in a block pattern according to the first embodiment of the present invention;

FIGS. 13A and 13B are diagrams illustrating an example of a print screen according to the first embodiment of the present invention;

FIG. 20 is a diagram illustrating a read workflow including fax transmission according to the first embodiment of the present invention;

FIG. 21 is a diagram illustrating an example of processing method information corresponding to a workflow including fax transmission according to the first embodiment of the present invention;

FIGS. 24A and 24B are diagrams illustrating an example of an authentication screen according to the second embodiment of the present invention;

FIGS. 36A to 36D are diagrams for explaining an example of a common I/F and a unique I/F according to the seventh embodiment of the present invention;

FIGS. 37A and 37B are diagrams for explaining an example of a data definition according to the seventh embodiment of the present invention;

FIGS. 38A and 38B are diagrams for explaining an example of layout information according to the seventh embodiment of the present invention;

FIGS. 39A and 39B are diagrams for explaining an example of a process content according to the seventh embodiment of the present invention;

FIG. 40 is a process block diagram illustrating an example of a logic processing unit according to the seventh embodiment of the present invention;

FIG. 41 is a diagram for explaining an example of a type conversion table according to the seventh embodiment of the present invention;

FIG. 42 is a diagram for explaining an example of a component management table according to the seventh embodiment of the present invention;

FIGS. 45A and 45B are diagrams for explaining an example of an application screen for using a scan delivery service according to the seventh embodiment of the present invention;

FIG. 47 is a diagram for explaining another example of a process content according to the seventh embodiment of the present invention;

FIG. 49 is a sequence diagram illustrating an example of a process of creating a process content according to the seventh embodiment of the present invention.

DETAILED DESCRIPTION OF THE PREFERRED EMBODIMENTS

There has been a problem in a conventional technology in that a process cannot be easily extended. For example, when a delivery destination of the process results of a workflow is changed, an administrator creates a new workflow and prints, with the apparatus, a document in which a new identifier corresponding to this workflow is formed. Then, the apparatus reads the document and executes a new workflow corresponding to the identifier. Accordingly, conventionally, when extending the workflow, it has been necessary to take actions both at the time of printing and at the time of reading.

A problem to be addressed by an embodiment of the present invention is to provide an information processing system by which a process can be easily extended.

Hereinafter, as an example of an embodiment of the present invention, an information processing system 1 and an information processing method performed by the information processing system 1 will be described with reference to the drawings.

First Embodiment

Figure 1B:
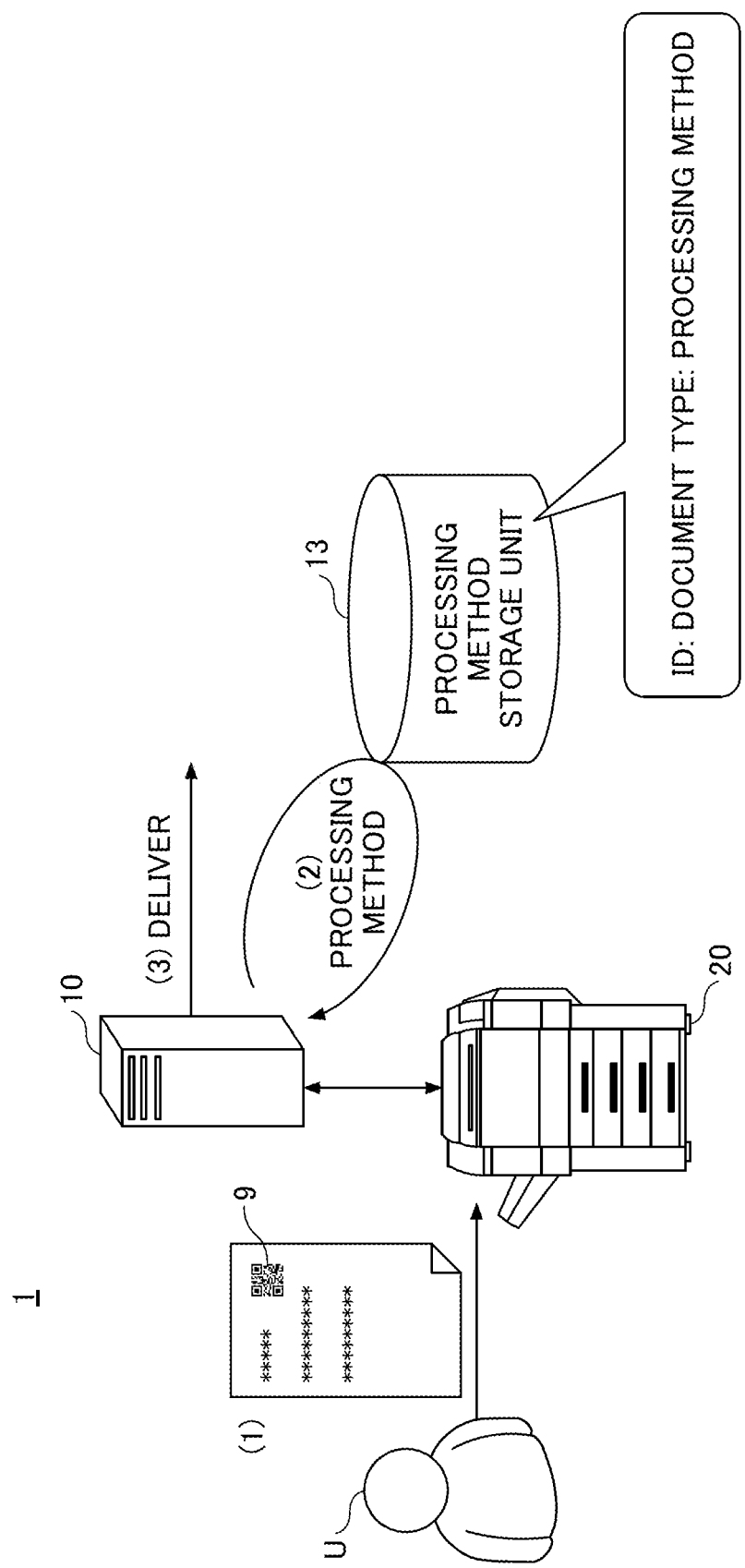

<Outline of Operation According to the First Embodiment>
FIGS. 1A and 1B are diagrams illustrating an outline of an operation of the information processing system 1 according to a first embodiment. In the present embodiment, the print workflow and the read workflow are performed in cooperation with each other (linked) by processing method information. Processing method information can be edited by the administrator so that the workflow can be easily extended.

First, a workflow of printing (print workflow, an example of a first workflow) will be described with reference to FIG. 1A.

(1) The user first selects the print workflow. Accordingly, an apparatus 20 displays the document type acquired by a service providing system 10 from a print data storage unit 11. The user selects the document type he/she wants to print in the workflow.

(2) The apparatus 20 transmits the document type to the service providing system, and the service providing system 10 acquires the ID associated with the document type of from a processing method storage unit 13. Processing method information (ID: document type: processing method) is registered in the processing method storage unit 13. An ID is identification information that identifies the document and links the print workflow to the read workflow. The document type is information that identifies the document, such as the name of various documents such as an application form and other documents. The processing method indicates how to process the image data of the document in the read workflow.

The service providing system 10 acquires the print data of the document indicated by the document type from the print data storage unit 11.

(3) The service providing system 10 converts the ID into an image code (e.g., a Quick Response (QR) code (registered trademark)) 9, forms the image code 9 in the print data of the document, and transmits the document to the apparatus 20. Accordingly, the apparatus 20 can print a document in which the image code 9 is formed.

(4) The user writes in necessary items for the read workflow in the document. It is not necessarily needed to write in items.

Next, a workflow of reading (read workflow, an example of a second workflow) will be described based on FIG. 1B.

(1) The user causes the apparatus 20 to read the document in which the necessary items have been written in.

(2) The apparatus 20 transmits the image data of the document to the service providing system, and the service providing system 10 analyzes the image code 9 to retrieve an ID. The service providing system 10 acquires a processing method associated with the ID from the processing method storage unit 13.

(3) The service providing system 10 processes image data of the document based on a processing method. For example, the image data of the document is delivered to a folder specified by the processing method or reported by e-mail.

As described above, by referring to the common processing method storage unit 13 at the time of printing and at the time of reading, the print workflow and the read workflow can be linked (performed in cooperation with each other). Therefore, when it is desired to extend the workflow, this can be done only by modifying the processing method. The workflow can be changed by the administrator by setting the processing method. Only the "ID: document type: processing method" is to be set in the processing method storage unit 13, and, therefore, the workflow can be easily extended.

When the user selects the document, the image data can be processed by a processing method according to the document type. The workflow can be extended according to the user-selected document, without changing the print workflow and the read workflow.

<Terminology>

Output data is data output by the apparatus, and the form of output may be just displaying or printing. When printed, output data is referred to as image data. When displayed, output data is referred to as display data.

The processing method is information about how the input data is to be processed. For example, a delivery destination, a report destination, a transmission destination, etc., may be specified.

The type of output data indicates individual output data, and pieces of the output data may be of the same type or may be of different types. In the present embodiment, the term "document type" is used.

The input data based on the output data may be data that can be recognized as including the output data. Examples are data that directly includes output data, data in which characters are added to output data, data in which output data is processed, and the like.

An extension of a workflow is to perform a different process from that of the existing workflow and may be referred to as a change in the workflow or an addition of a workflow that performs a different process.

<Example of System Configuration According to the First Embodiment>

Figure 2:
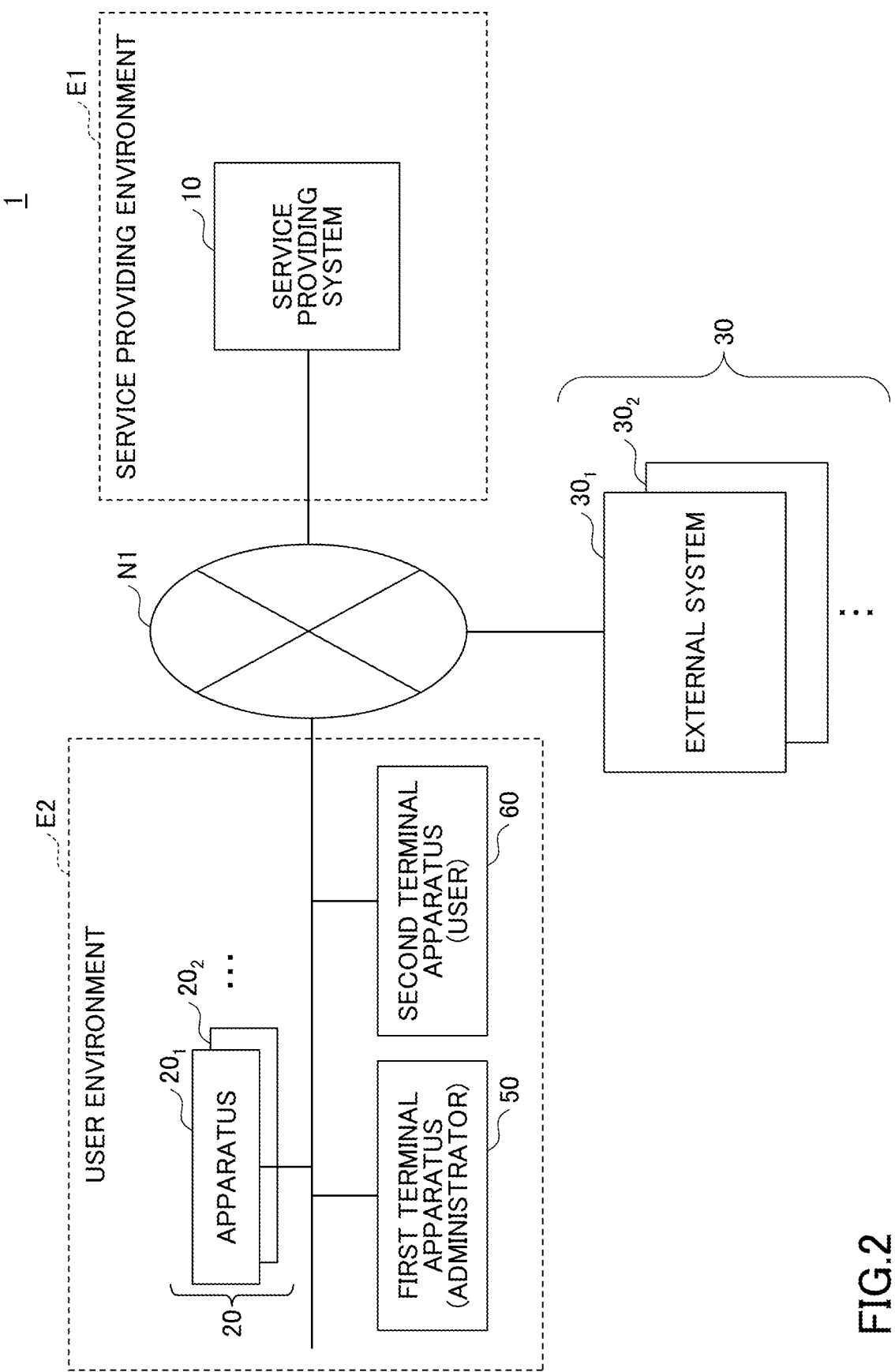
FIG. 2 is a configuration diagram of an example of an information processing system according to the first embodiment of the present invention.

FIG. 2 is a configuration diagram illustrating an example of the information processing system 1. The information processing system 1 illustrated in FIG. 2 includes a service providing environment E1, a user environment E2, and an external system 30, which are communicatively connected via a wide-area network N1 such as the Internet.

The service providing environment E1 is a system environment that provides external services such as cloud services via a network. Although the present embodiment adopts a cloud service as an exemplary external service, the present embodiment may be applied to a service provided via a network, such as a service provided by an Application Service Provider (ASP) or a web service.

The service providing environment E1 includes the service providing system 10 implemented by one or more information processing apparatuses. The service providing system 10 provides predetermined services via the network. For example, the service providing system 10 provides a service (scan delivery service) in which an electronic file generated by scanning a document in the apparatus 20 of the user environment E2 is processed by an Optical Character Reader (OCR) and stored in the external system 30. For example, the service providing system 10 provides a service (cloud print service) for printing an electronic file stored in the external system 30 by the apparatus 20 of the user environment E2. In the present embodiment, the service providing system 10 will be described as providing such a scan delivery service and a cloud print service.

However, the service provided by the service providing system 10 is not limited thereto, and for example, the service may be a service of projecting an electronic file stored in the external system 30 with a projector of the user environment E2. The electronic file generated by scanning the document in the apparatus 20 may be translated into a predetermined language (e.g., translated from English to Japanese) after undergoing OCR processing and stored in the external system 30.

Incidentally, all or part of the service providing system 10 may be installed in the user environment E2. That is, all or a part of the information processing apparatus constituting the service providing system 10 may be included in the user environment E2.

The user environment E2 is, for example, a system environment in a company and the like that is a user of the apparatus 20. In the user environment E2, one or more apparatuses 20, a first terminal apparatus 50, and a second terminal apparatus 60 are connected via a network such as a local area network (LAN).

The apparatus 20 according to the present embodiment is an image forming apparatus having a printer function and a scanner function. The apparatus 20 may be a multifunction peripheral and the like that includes a copy function, a fax communication function, and the like in addition to a printer function and a scanner function. Hereafter, when distinguishing each of the plurality of the apparatuses 20, the apparatus 20 is described with a subscript, as the "apparatus $20_1$", the "apparatus $20_2$", and the like.

In the apparatus 20, an apparatus having a printer function and an apparatus having a scanner function may be separate from each other. Even though the apparatus 20 includes a printer function and a scanner function, the apparatus 20 to perform printing and the apparatus 20 to perform scanning may be different. The apparatus 20 includes a browser as described below, and the browser is capable of displaying, processing, and executing instructions for a web application that constitutes a workflow of various services provided by the service providing system 10. The apparatus 20 may have an exclusive-use application installed, and the exclusive-use application and the web application may cooperate with each other to execute the same process. In this case, the exclusive-use application may share a part of the processes of the web application.

The first terminal apparatus 50 is an information processing apparatus such as a smartphone, a mobile phone, a tablet personal computer (PC), desktop PC, notebook PC, and the like operated by an administrator. The first terminal apparatus 50 includes a program having a screen display function such as a web browser. The program is not limited to a web browser as long as the program has a function of displaying screen information received from the service providing system 10 as a screen. The program may be an exclusive-use program of the service providing system 10. A plurality of administrators may perform operations by using different first terminal apparatuses 50, respectively.

The second terminal apparatus 60 is an information processing apparatus such as a smartphone, a mobile phone, a tablet PC, a desktop PC, a notebook PC, and the like used by a general user. The second terminal apparatus 60 includes a program having a screen display function such as a web browser. The program is not limited to a web browser as long as the program has a function of displaying screen information received from the service providing system 10 as a screen. The program may be an exclusive-use program of the service providing system 10. A plurality of users may perform operations by using different second terminal apparatuses 60, respectively.

The external system 30 may be a backbone system of a company or a system provided by an external company. The external system 30 is, for example, a computer system that provides cloud services, referred to as storage services (or online storage) via the network. A storage service is a service for renting storage space of the external system 30. In the present embodiment, in the scan delivery service, an OCR processed electronic file is stored (uploaded) in a storage area lent by the external system 30. Further, in the present embodiment, in the cloud print service, an electronic file to be printed is acquired (downloaded) from the storage area lent by the external system 30. Hereinafter, when distinguishing each of the plurality of external systems 30, the external systems 30 is described with a subscript, such as the "external system $30_1$", "external system $30_2$", and the like. The name of the service provided by the external system $30_1$ is "storage service A", the name of the service provided by the external system $30_2$ is "storage service B", and the like.

The external system 30 may be a system implemented by a plurality of information processing apparatuses. Further, the configuration of the information processing system 1 illustrated in FIG. 2 is an example and may be other configurations. For example, as described above, the user environment E2 may include various apparatuses, such as a projector, an electronic blackboard, etc., in addition to or in lieu of the apparatus 20.

<Hardware Configuration According to the First Embodiment>

<<Hardware of Service Providing System According to the First Embodiment>>

Figure 3:
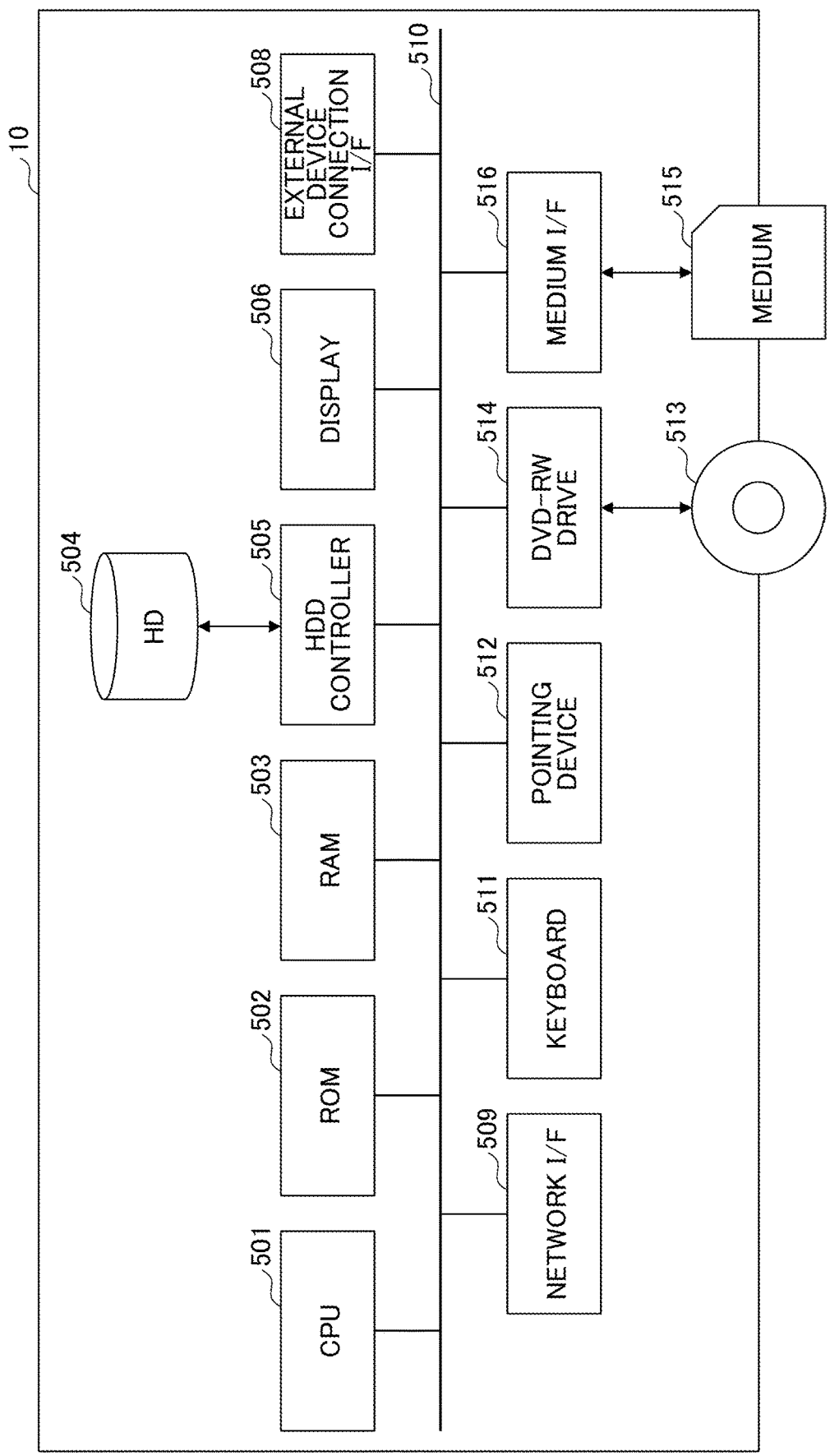
FIG. 3 is an example of a hardware configuration diagram of a service providing system according to the first embodiment of the present invention.

FIG. 3 is a diagram illustrating the hardware configuration of the service providing system. As illustrated in FIG. 3, the service providing system is constructed by a computer and includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a Digital Versatile Disk Rewritable (DVD-RW) drive 514, and a medium I/F 516, as illustrated in FIG. 3.

Among these, the CPU 501 controls the operation of the entire service providing system. The ROM 502 stores a program used to drive the CPU 501, such as an initial program loader (IPL). The RAM 503 is used as the work area of the CPU 501. The HD 504 stores various kinds of data such as a program. The HDD controller 505 controls the reading or writing of various kinds of data to the HD 504 according to the control of the CPU 501. The display 506 displays various kinds of information such as cursors, menus, windows, characters, or images. The external device connection I/F 508 is an interface for connecting various external devices. In this case, the external device may be, for example, a Universal Serial Bus (USB) memory or a printer. The network I/F 509 is an interface for performing data communication using a communication network 100. A bus line 510 is an address bus, a data bus, and the like for electrically connecting components such as the CPU 501 illustrated in FIG. 3.

The keyboard 511 is a type of input means with a plurality of keys for input of characters, numbers, various instructions, and the like. The pointing device 512 is a type of input means for selecting and executing various instructions, selecting a processing target, moving a cursor, and the like. The DVD-RW drive 514 controls the reading or writing of various kinds of data to the DVD-RW 513 as an example of a removable recording medium. the recording medium is not limited to a DVD-RW, but may be a Digital Versatile Disc Recordable (DVD-R), etc. The medium I/F 516 controls the reading or writing (storage) of data to a recording medium 515, such as a flash memory.

<<Hardware of Apparatus According to the First Embodiment>>

Figure 4:
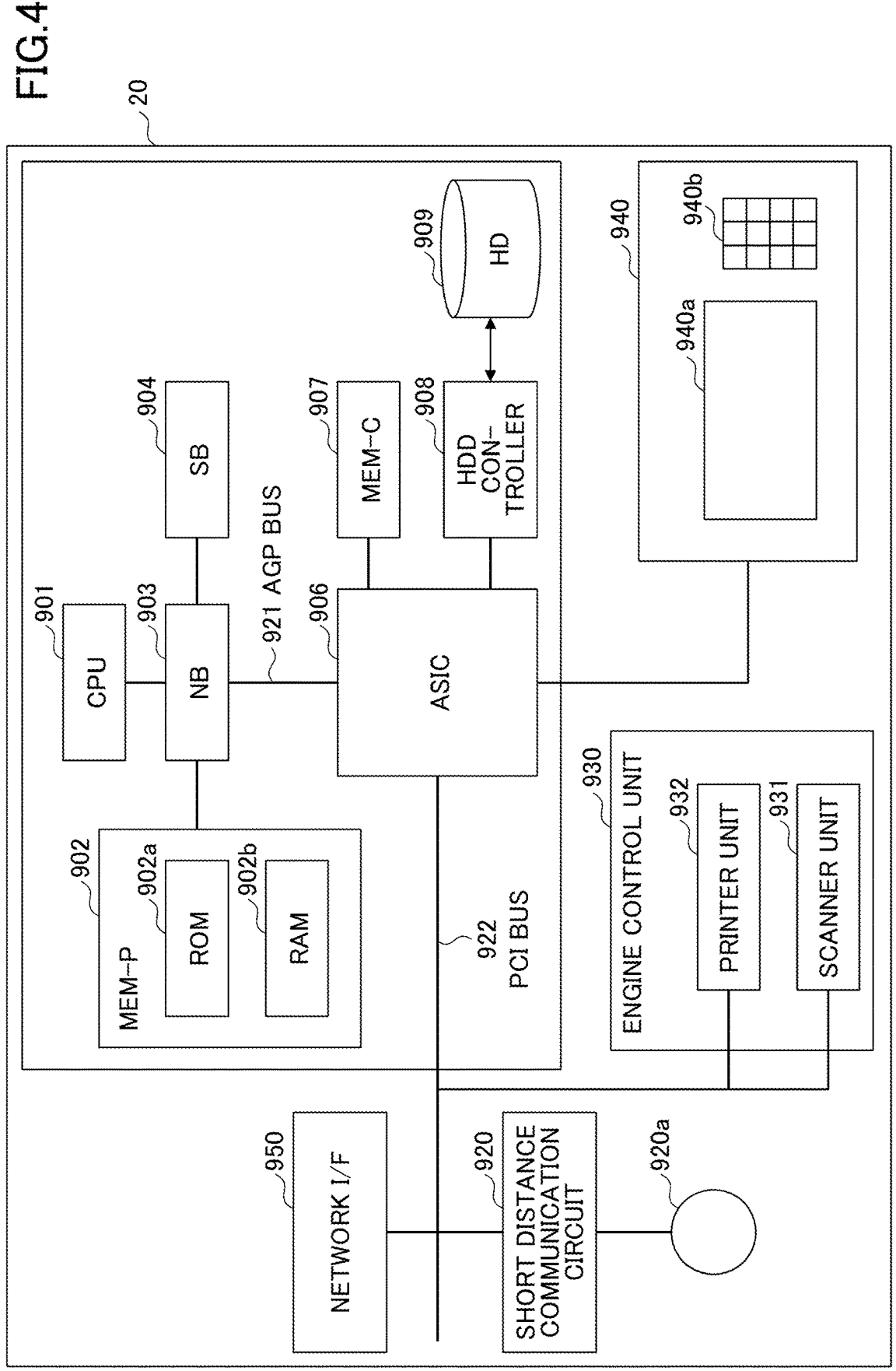
FIG. 4 is an example of a hardware configuration diagram of an apparatus according to the first embodiment of the present invention.

FIG. 4 is a diagram illustrating a hardware configuration of the apparatus. As illustrated in FIG. 4, the apparatus includes a controller 910, a short distance communication circuit 920, an engine control unit 930, an operation panel 940, and a network I/F 950. The hardware configuration of the apparatus 20 is not limited to the configuration illustrated in FIG. 4. For example, the operation panel 940 may be configured to be connected to a south bridge (SB) 904 rather than an ASIC (Application Specific Integrated Circuit) 906.

Among these, the controller 910 includes a CPU 901, a system memory (MEM-P) 902, a north bridge (NB) 903, the SB 904, the ASIC 906, a local memory (MEM-C) 907, an HDD controller 908, and an HD 909 that is a storage unit, and the NB 903 is connected to the ASIC 906 by an Accelerated Graphics Port (AGP) bus 921. However, the configuration of the controller 910 is not limited thereto. For example, two or more components, such as the CPU 901, the NB 903, the SB 904, may be implemented by the System on Chip (SoC). In this case, the SoC and the ASIC 906 may be connected by a Peripheral Component Interconnect (PCI) express bus (registered trademark).

Among these, the CPU 901 is a control unit that performs overall control of the apparatus 20. The NB 903 is a bridge for connecting the CPU 901 to the MEM-P 902, the SB 904, and the AGP bus 921 and has a memory controller for controlling reading and writing to the MEM-P 902, a Peripheral Component Interconnect (PCI) master, and an AGP target.

The MEM-P 902 includes a ROM 902a, which is a memory for storing programs and data by which each function of the controller 910 is implemented, and a RAM 902b, which is used as a program or data expansion and a rendering memory for memory printing. The program stored in the RAM 902b may be configured to be recorded in a computer-readable recording medium such as a compact disk read-only memory (CD-ROM), a CD recordable (CD-R), or a digital versatile disc (DVD) in a file in an installable format or an executable format.

The SB 904 is a bridge for connecting the NB 903 to PCI devices and peripheral devices. The ASIC 906 is an integrated circuit (IC) for image processing purposes having hardware elements for image processing, and serves as a bridge connecting the AGP bus 921, a PCI bus 922, the HDD controller 908, and the MEM-C907, respectively. The ASIC 906 includes a PCI target and AGP master, an arbitrator (ARB) that forms the core of the ASIC 906, a memory controller that controls the MEM-C 907, a plurality of Direct Memory Access Controllers (DMACs) that rotates image data by hardware logic, and the like, and a PCI unit that performs data transfer between the scanner unit 931 and the printer unit 932 via the PCI bus 922. The interface of the Universal Serial Bus (USB) or an Institute of Electronic and Electronic Engineers 1394 (IEEE 1394) may be connected to the ASIC 906.

The MEM-C907 is a local memory used as an image buffer and a code buffer for copying. The HD 909 is a storage device for storing image data, storing font data used for printing, and storing forms. The HD 909 controls the reading or writing of data to the HD 909 according to the control of the CPU 901. The AGP bus 921 is a proposed bus interface for graphics accelerator cards to speed up graphics processing, and by directly accessing the MEM-P 902 with high throughput, the graphics accelerator card can be made faster. However, the MEM-C 107 may not be installed.

The short distance communication circuit 920 is provided with a short distance communication circuit 920a. The short distance communication circuit 920 is a communication circuit such as Near Field Communication (NFC), Bluetooth (registered trademark), and the like.

The engine control unit 930 further includes a scanner unit 931 and a printer unit 932. The operation panel 940 includes a panel display processing unit 940a, such as a touch panel, which displays a current setting value or a selection screen and accepts input from an operator, and a hard key 940b, such as a numerical pad which receives a set value of an image forming condition, such as a density setting condition, and or a start key to receive a copy start instruction. The controller 910 controls the entire apparatus 20 and controls, for example, rendering, communication, input from the operation panel 940, and the like. The scanner unit 931 or the printer unit 932 includes an image processing portion such as error diffusion or gamma conversion.

In the apparatus 20, the application switching key of the operation panel 940 allows sequential switching of the document box function, the copy function, the printer function, and the facsimile function, so that one of these functions can be selected. When the document box function is selected, the document box mode is set, when the copy function is selected, the copy mode is set, when the printer function is selected, the printer mode is set, and when the facsimile function is selected, the facsimile mode is set. The operation panel 940 includes a display processing unit 21, such as a liquid crystal display (LCD) for displaying various kinds of information and an light-emitting diode (LED) for displaying an operation state by lighting or turning off, and an input unit including a touch panel or a hard key switch. Further, if the operation panel 940 is provided with a touch panel, there may be no hard key switches.

The network I/F 950 is an interface for performing data communication using the communication network 100. The short distance communication circuit 920 and the network I/F 950 are electrically connected to the ASIC 906 via the PCI bus 922.

<Functions According to the First Embodiment>

FIG. 5 is an example of a functional block diagram illustrating the functions of the service providing system 10 and the apparatus 20 in a block pattern.

<<Functions of Apparatus According to the First Embodiment>>

The apparatus 20 includes the display processing unit 21, an operation accepting unit 22, an output unit 23, an input unit 24, a communicating unit 25, and an authenticating unit 26. Each of these functions provided by the apparatus 20 is a function or means that is implemented as the components illustrated in FIG. 4 are operated by instructions from the CPU 901 according to a program loaded in the RAM 902b from the HD 909. This program is downloaded from a predetermined server and installed in the apparatus 20.

The display processing unit 21 displays a screen operated by a user on the operation panel 940. For example, a button to activate the workflow, a list of document types, a message to guide the operation, a print setting, a read setting, etc. are displayed.

The operation accepting unit 22 accepts an operation to the apparatus 20. For example, the operation accepting unit 22 accepts the selection of the workflow to be activated and the document type to be used for the workflow.

The output unit 23 prints the print data transmitted from the service providing system 10. In some cases, printing may be referred to as outputting. The print data may be converted to Printer Description Language (PDL) by the servicing providing system 10, or by the apparatus 20.

The input unit 24 optically reads the document that is a sheet material such as paper and creates image data. Reading is also referred to as scanning, and sometimes image data is referred to as scan data. The document may include more than one page.

The communicating unit 25 (an example of the second communicator) connects the apparatus 20 to the network and transmits and receives various kinds of information. For example, the print data is received from the service providing system 10, the document is read, and the generated image data is transmitted to the service providing system 10.

The authenticating unit 26 authenticates the user. Authentication means to determine whether the user has legitimate authority. In the present embodiment, it is determined whether the user has the authority to use the service providing system 10. If authentication is successful, the user logs in to the apparatus 20. Login refers to an authentication activity of using pre-registered account information to access system resources when using various services on a computer or the Internet. Account information includes a user ID and a password, an integrated circuit (IC) card number, biometric authentication information, etc.

<<Functions of First Terminal Apparatus According to the First Embodiment>>

The first terminal apparatus 50 includes a first communicating unit 51, a first display control unit 52, and a first operation accepting unit 53. The first terminal apparatus 50 executes a program (for example, a web browser) and implements functional blocks as illustrated in FIG. 5.

The first communicating unit 51 communicates with the service providing system 10 and receives screen information for displaying a screen, such as a setting screen, by the first terminal apparatus 50. Further, the administrator transmits the information input to each screen to the service providing system 10.

The first display control unit 52 analyzes screen information received from the service providing system 10 and displays the screen information on the display 506. The first operation accepting unit 53 accepts an operation (for example, input to each screen) of the administrator with respect to the first terminal apparatus 50.

<<Functions of Second Terminal Apparatus According to the First Embodiment>>

The second terminal apparatus 60 includes a second communicating unit 61, a second display control unit 62, and a second operation accepting unit 63. The second terminal apparatus 60 executes a program (for example, a web browser) and implements functional blocks as illustrated in FIG. 5.

The second communicating unit 61 communicates with the service providing system 10 and receives screen information for displaying image data such as an application form. Further, the person in charge of processing transmits the information input to each screen to the service providing system 10.

The second display control unit 62 analyzes screen information received from the service providing system 10 and displays the screen information on the display 506. The second operation accepting unit 63 accepts the operation (for example, input to each screen) of the person in charge of transactions with respect to the second terminal apparatus 60.

<<Functions of Service Providing System According to the First Embodiment>>

The service providing system 10 includes a print workflow processing unit 14, a read workflow processing unit 15, a communicating unit 16, an authentication managing unit 17, and a setting unit 18. Each function of the service providing system 10 is a function or means that is implemented as the components illustrated in FIG. 3 are operated by instructions from the CPU 501 according to a program loaded in the RAM 503 from the HD 504.

The print workflow processing unit 14 controls the execution of a print workflow. For example, an image code is formed in the print data of a document and the print data is transmitted to the apparatus 20. The read workflow processing unit 15 controls the execution of a read workflow. For example, the image data transmitted by the apparatus 20 is analyzed to decode the image code and determine the processing method of the read workflow.

The print workflow processing unit 14 and the read workflow processing unit 15 may execute a workflow in cooperation with the basic system of a company or may execute a workflow in cooperation with a system provided by an external organization (another company, etc.).

The communicating unit 16 (an example of the first communicator) connects the service providing system 10 to the network and transmits and receives various kinds of information. For example, the print data of a document selected by the user is transmitted to the apparatus 20, and the image data is received from the apparatus 20. Further, the image data is transmitted to an external system to request processing. The communicating unit 16 receives, from the first terminal apparatus 50, information relating to the setting of an application, and transmits and receives information relating to a process of an application form with the second terminal apparatus 60.

The authentication managing unit 17 controls the authentication. For example, for each company, the following are managed.

Information about registered users, administrators, and apparatuses

Contract (used) applications (applications for which a contract has been made)

License information of the contract applications

The authentication managing unit 17 authenticates the presence or absence of a usage authority based on the above information and information transmitted from the apparatus 20, the first terminal apparatus 50, or the second terminal apparatus 60. The authentication managing unit 17 functions as the authentication management base that provides services such as authentication, determination of the usage authority, and information management, etc., when the web applications constituting various workflows and the following setting unit 18 are used from each apparatus or terminal apparatus.

The setting unit 18 accepts the settings relating to an application document printing service 601 (corresponding to the print workflow) and a simple application service 602 (corresponding to the read workflow) described later, from the first terminal apparatus 50. The setting unit 18 is a web server (setting site) that can be accessed by the first terminal apparatus 50 or the second terminal apparatus 60 through the web browser. The setting unit 18 accepts the input of the account information of the external system 30 a setting specifying the processing method storage unit, the print data storage unit, and the read data storage unit as the reference destination to be referenced when the print workflow and the read workflow are executed. The setting unit 18 may form a portion of the web application that constitutes various workflows. If a contract is made for a web application for various workflows to start being used by a company, the corresponding setting unit 18 (setting site) can also be used.

The service providing system 10 includes a storage unit 19 implemented by one or more of the HD 504, the RAM 503, and the ROM 502 illustrated in FIG. 3. The print data storage unit 11, a read data storage unit 12, and the processing method storage unit 13 are constructed in the storage unit 19.

The print data storage unit 11, the read data storage unit 12, and the processing method storage unit 13 of the storage unit 19 may not be held by the service providing system 10. For example, these storages may be on the cloud or may be on the external system 30 illustrated in FIG. 2. Private or public storage services (e.g., cloud storage services such as Google Drive (registered trademark) and One Drive (registered trademark)) may be used. The print data storage unit 11, the read data storage unit 12, and the processing method storage unit 13 in the storage unit 19 may exist on-premise rather than in the cloud. The print data storage unit 11, the read data storage unit 12, and the processing method storage unit 13 may all be different folders or in the same folder in the same cloud storage service. These storages may be provided in a plurality of different cloud storage services (external systems $30_1$, $30_2$ . . . ) may also be provided.

The print data to be printed by the apparatus 20 is stored in the print data storage unit 11. Print data is a file created by Portable Document Format (PDF) or various kinds of application software.

The read data storage unit 12 corresponds to a folder that is a delivery destination, and image data (read data) that is read and generated by the apparatus 20 is stored.

As described above, the "ID: document type: processing method" is associated with the processing method storage unit 13. An ID is identification information that identifies the document type or type as described above. The processing method storage unit 13 may be a folder for storing files or a database. An example of the processing method information stored in the processing method storage unit 13 is indicated in Table 1.

TABLE 1

| ID | DOCUMENT TYPE | TRANSMISSION DESTINATION (FOLDER) | REPORT DESTINATION |
|---|---|---|---|
| paper_id_001 | INVOICE | /seikyuu FOLDER AND BELOW | aaa@bb.cc |
| paper_id_002 | TRANSPORTATION EXPENSE APPLICATION FORM | /koutuu FOLDER AND BELOW | NONE |
| paper_id_003 | VACATION REQUEST | /kyuuka FOLDER AND BELOW | ccc@bb.cc |

Table 1 indicates an example of the processing method information stored in the processing method storage unit 13. For the processing method information, a processing method for each document type (destination folder, report destination, etc.) is specified. For example, in the case of the invoice, it is indicated that the transmission destination folder for scanned data is "/seikyu folder and below" and to report at the same time by e-mail to "aaa@bb.cc". There may be other processing methods than those indicated in Table 1, there may be one processing method, and the number of processing methods is not limited to two. For example, there may be items such as a fax transmission destination (either a telephone line type or an internet fax).

Different processing methods may be associated with the same document type depending on the purpose and the timing of use. For example, the storage destination folder can be switched depending on the application month. In order to handle such a process, the administrator registers a different ID even for the same document type in the processing method storage unit 13, so that even when the document type is the same, different processing methods can be defined for IDs that differ depending on the document.

The document type item is used in the print workflow, the processing method is used in the read workflow, and the ID is used in both. Thus, the ID allows linkage (cooperation) between the print workflow and the read workflow.

The administrator adds new processing method information, and deletes or edits the old processing method information, in the print data storage unit 11. The administrator can freely set the ID, the information identifying the document (e.g., a file name), and the processing method, at his/her own discretion. For example, the format of the processing method information may be a spreadsheet file, comma-separated values (CSV), eXtensible Markup Language (XML), or JavaScript Object Notation (JSON). The processing method information may be a text file simply including "ID, document type, and processing method". When an administrator registers the processing method information in a database format, he/she operates a database client running on a PC (Personal Computer) to register "ID, document type, and processing method".

The Uniform Resource Locater (URL) of the processing method storage unit 13 is already known to the print workflow processing unit 14 and the read workflow processing unit 15. If necessary, the administrator sets the URL in the print workflow processing unit 14 and the read workflow processing unit 15. Accordingly, the print workflow processing unit 14 and the read workflow processing unit 15 can execute the workflow upon referring to the processing method storage unit 13.

<Example of Workflow According to the First Embodiment>

Figure 6A:
FIGS. 6A and 6B are diagrams illustrating an example of a workflow according to the first embodiment of the present invention.
Figure 6B:

FIGS. 6A and 6B are diagrams illustrating examples of workflows. FIG. 6A illustrates an example of a workflow for printing, and FIG. 6B illustrates an example of a workflow for reading.

The print workflow is for sequentially executing a series of processes such as "downloading a document from cloud B", "appending an image code", and "printing". The read workflow is for sequentially executing a series of processes such as "performing OCR on image", "transmitting the image to cloud A", and "transmitting mail".

The workflow setting method will be described later (see seventh embodiment). The administrator can set the workflow in advance. In the present embodiment, the workflow can be constructed in a program-less manner and on the user side. For example, the workflow can be set by combining each process in FIG. 6 with a Graphical User Interface (GUI). In the example illustrated in FIG. 6(b), a workflow can be set in a program-less manner by preparing in advance "a function of performing OCR on an image", "a function of transmitting an image to a cloud A", and "a function of transmitting a mail" and connecting these functions as illustrated in FIG. 6B.

Further, each process of the workflow may not only be completed within the service providing system 10, but may also be delegated to an external system. In this case, the service providing system 10 delegates processing via a Web Application Programming Interface (API) of an external system. The Web API is not strictly defined, but is an interface between applications and systems that are called over a network using protocols such as HyperText Transport Protocol (HTTP).

<Setting of Print Workflow and Read Workflow According to the First Embodiment>

Figure 7:
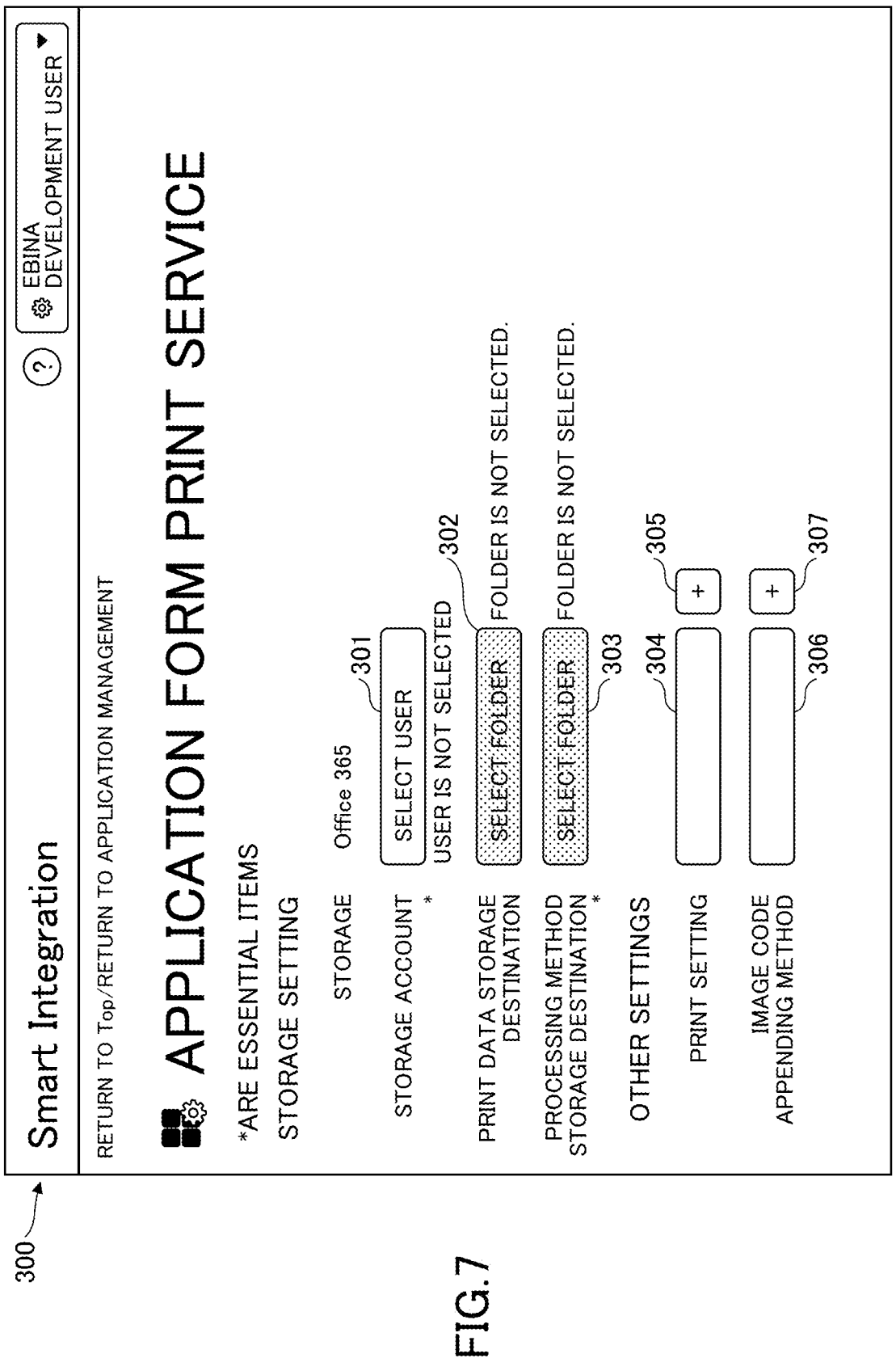
FIG. 7 illustrates an example of a setting screen of a print workflow according to the first embodiment of the present invention.

FIG. 7 is an example of a setting screen 300 of a print workflow. The administrator operates the first terminal apparatus 50 to connect to the service providing system 10 and causes the first terminal apparatus 50 to display the screen of FIG. 7.

The setting screen 300 of the print workflow includes a storage account setting field 301, a print data storage destination setting field 302, a processing method storage destination setting field 303, a print setting field 304, and an image code appending method setting field 306.

The storage account setting field 301 is a field in which the administrator selects the user's account information for the service providing system 10 to access a storage (cloud storage service). The account information may be, for example, a user ID (mail address) and a password. In FIG. 7, a list of users is displayed by pull-down and when the administrator selects the user, account information is also set.

Figure 11:
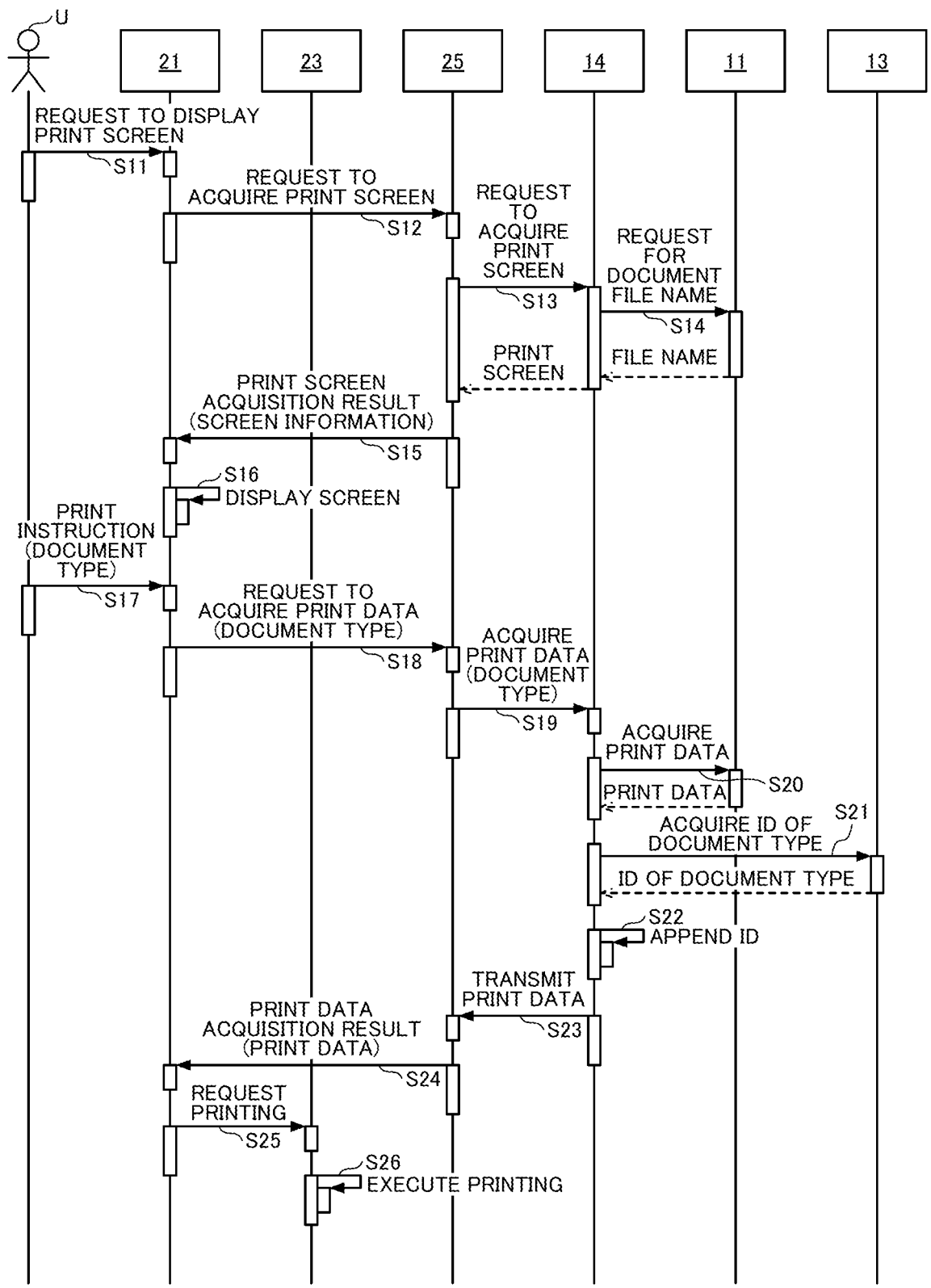
FIG. 11 is an example of a sequence diagram explaining the processing performed by the information processing system in a print workflow according to the first embodiment of the present invention.

The print data storage destination setting field 302 is a field in which the administrator sets the path information of the folder of the storage destination of the print data (for example, the print data storage section 11). For example, "/store/print_data/" is set. In FIG. 11, which will be described later, for the acquisition of a list of the file names in step S14, and for the acquisition of the print data in step S20, the above storage destination will be the acquisition destination.

The processing method storage destination setting field 303 is a field in which the administrator sets the path information of the folder of the storage destination of the processing method (for example, the processing method storage unit 13). For example, "/store/process_data/" is set. For the ID acquisition in step S21 in FIG. 11 which will be described later, and for the acquisition of the processing method corresponding to the ID in step S42 in FIG. 16 which will be described later, the above storage destination will be the acquisition destination.

The API and connection method differ depending on the storage used, and, therefore, one storage is fixedly set for each web application (workflow application) and package. However, it may be possible switch among multiple storages.

In the print setting field 304, a setting value in the apparatus 20 (for example, an image forming apparatus) at the time of output of all print data is input. The setting value may be fixed by the administrator. Multiple items can be input because the setting items are added by a + button 305. Setting items include the following.

Size: A4/A3
Color: Monochrome/Color/Bichrome
Post-processing: punch/staple, etc.
Append information on the processing method and print (transmission destination, person in charge of processing, handling of document)

The image code appending method setting field 306 can be used by the administrator to select a processing method (information to be coded). By pressing a + button 307, it is possible to select one of the following setting items.

Append the identification information of the document as an image code.
Append identification information of the logged-in user as an image code.
Append both the identification information of the document and the identification information of the user as image codes.
Do not append an image code.

Figure 8:
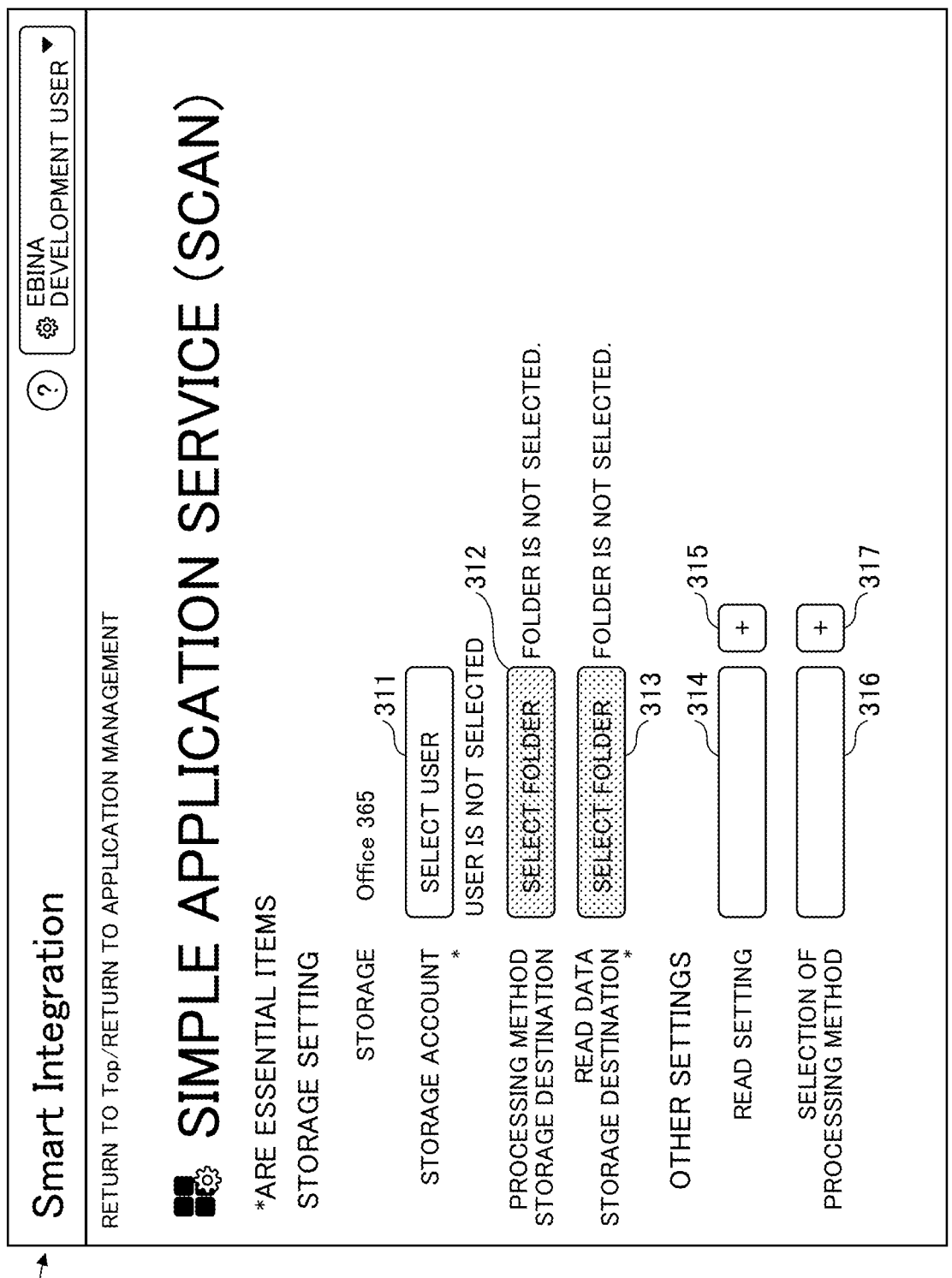
FIG. 8 illustrates an example of a setting screen of a read workflow according to the first embodiment of the present invention.

FIG. 8 is an example of a setting screen 310 of a read workflow. The administrator operates the first terminal apparatus 50 to connect to the service providing system and causes the first terminal apparatus 50 to display the screen of FIG. 8.

The setting screen 310 of the read workflow includes a storage account setting field 311, a processing method storage destination setting field 312, a read data storage destination setting field 313, a read setting field 314, and a processing method selection field 316.

The storage account setting field 311 is the same as the storage account setting field 301 of the print workflow setting screen 300 illustrated in FIG. 7.

The processing method storage destination setting field 312 is a field for setting the path information of the folder of the storage destination of the processing method (for example, the processing method storage unit 13) by the administrator. For example, "/store/process_data/" is set. If the setting of the print workflow (the application document printing service 601) is included here, the service providing system shall refer to the setting and follow the setting.

The read data storage destination setting field 313 is a field in which the administrator sets the path information of the folder of the storage destination (for example, the read data storage unit 12) of the image data generated by the apparatus 20 (for example, the image forming apparatus) after reading the application form. For example, "/store/scan_data/seikyu" is set. If a setting is made in the processing method storage destination setting field 312, a setting may not be made in the read data storage destination setting field 313.

Further, the administrator may select the following options: "if a setting is not made in the read data storage destination setting field, reference is made to the storage destination or the transmission destination set in the processing method selection field"; "in addition to the processing method, all image data is stored in one storage destination"; "without applying the processing method, all image data is forcibly stored in one storage destination", and the like.

The read setting field 314 is a field in which the administrator sets the setting value of the apparatus 20 (e.g., image forming apparatus) at the time of reading the application form. The administrator can fix the setting. By pressing a + button 315, it is possible to add a setting item so that the administrator can input multiple setting items. The following are examples of setting items.

Size: A4/A3
Color: Monochrome/Color/Bichrome
Resolution: 200 dpi/300 dpi/400 dpi, etc.

In the processing method selection field 316, by pressing a + button 317, the administrator selects one of the following items.

"Perform process corresponding to identification information of the document"
"Perform a process corresponding to identification information of the logged-in user"
"Perform processes corresponding to both the identification information of the document and the identification information of the user"

"If a setting for the time of printing (application document printing service) is input, follow the setting"

"Do not process (transmit)"

Figure 9:
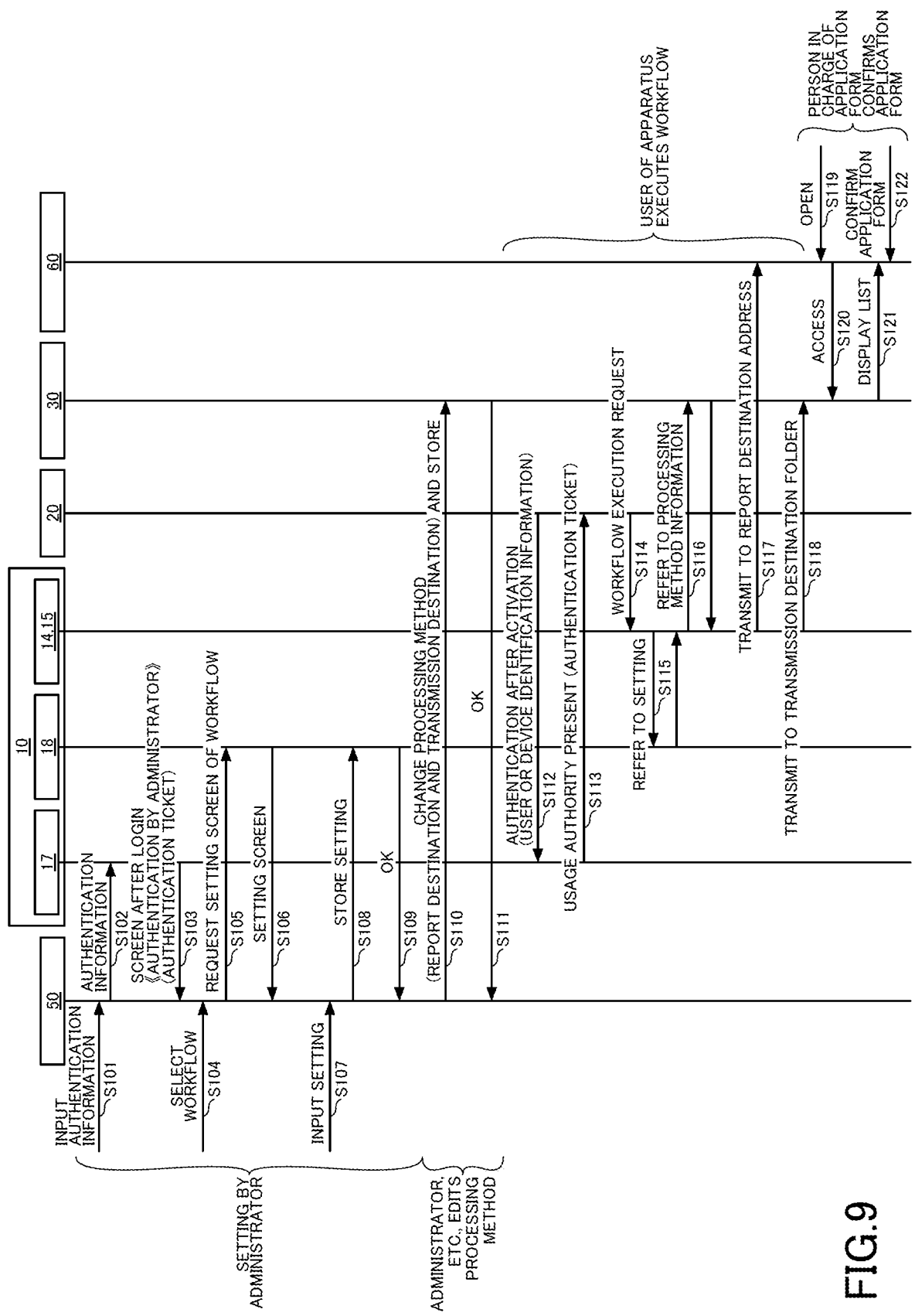
FIG. 9 illustrates an example of a sequence diagram explaining the flow of setting a print workflow and a read workflow and executing the read workflow, and a process flow of confirming an application form according to the first embodiment of the present invention.

FIG. 9 is an example of a sequence diagram illustrating a sequence flow of a print workflow, setting of a read workflow, executing of a read workflow, and a confirmation process of a request form.

S101: An administrator operates the first terminal apparatus 50 to connect to the service providing system 10. The first display control unit 52 of the first terminal apparatus 50 displays the login screen, and, therefore, the administrator inputs the authentication information. The first operation accepting unit 53 of the first terminal apparatus 50 accepts the input.

S102: The first communicating unit 51 of the first terminal apparatus 50 transmits the authentication information to the service providing system. The authentication managing unit 17 of the service providing system authenticates the administrator with the authentication information. That is, it is authenticated that the administrator has the authority.

S103: The communicating unit 16 of the service providing system transmits an authentication ticket to the first terminal apparatus 50. The authentication ticket is associated with the logged-in user and indicates who has logged in and the process that is allowed to the user.

S104: The administrator selects a workflow to make a setting relating to a print workflow or a read workflow. The first operation accepting unit 53 of the first terminal apparatus 50 accepts the selection.

S105: The first communicating unit 51 of the first terminal apparatus 50 sends a request to the service providing system for a setting screen (screens illustrated in FIG. 7 and FIG. 8) for the selected workflow.

S106: The communicating unit 16 of the service providing system receives the request for the setting screen of the workflow, and the setting unit 18 transmits the screen information of the setting screen to the first terminal apparatus 50.

S107: The first communicating unit 51 of the first terminal apparatus 50 receives screen information of the setting screen. The first display control unit 52 displays the setting screen 300 of the print workflow or the setting screen 310 of the read workflow, and, therefore, the administrator inputs a setting value. The first operation accepting unit 53 of the first terminal apparatus 50 accepts the input.

S108: The first communicating unit 51 of the first terminal apparatus 50 transmits the setting value to the service providing system 10. The communicating unit 16 of the service providing system 10 receives the setting value, and the setting unit 18 stores the setting value.

S109: A message (OK) that the setting value is saved is transmitted to the first terminal apparatus 50.

S110: The administrator can edit the processing method. For example, the administrator causes the first terminal apparatus 50 to display a spreadsheet file or a file describing the processing method, and edits the processing method for each ID. The first operation accepting unit 53 of the first terminal apparatus 50 accepts the editing. The edited processing method is stored in the external system 30.

S111: The message (OK) that the processing method is stored is transmitted to the first terminal apparatus 50.

Subsequently, the user goes to the apparatus 20 to execute a read workflow. It is assumed that the print workflow has already been executed.

S112: The communicating unit 25 of the apparatus 20 transmits an authentication request to the service providing system 10 after activation. User or device identification information is transmitted.

S113: The authentication managing unit 17 of the service providing system 10 authenticates the user or the apparatus 20, and when the authentication is successful, transmits an authentication ticket indicating that usage authority is present to the apparatus 20.

S114: The communicating unit 25 of the apparatus 20 transmits a request for execution of the user-selected workflow to the service providing system 10. For example, the apparatus 20 reads an application form and transmits the generated image data.

S115: The communicating unit 16 of the service providing system 10 receives the request for execution of the workflow, and the read workflow processing unit 15 acquires the setting value of the read workflow from the setting unit 18.

S116: The read workflow processing unit 15 identifies a storage destination (the external system 30) of the processing method based on the setting value and acquires the processing method information that has been edited from the external system 30.

S117: The read workflow processing unit 15 transmits image data to the report destination address based on the processing method information. For example, an e-mail is transmitted to the person in charge of transactions.

S118: The read workflow processing unit 15 transmits (stores) image data to the transmission destination folder based on the processing method information.

Next, the person in charge of processing the application form confirms the application form.

S119: The person in charge of processing operates the second terminal apparatus 60 to connect to the service providing system 10. The storage destination (the folder of the external system 30) has been reported to the second terminal apparatus 60 by e-mail and the like, and, therefore, the person in charge of processing inputs an operation to open the folder of the transmission destination. The second operation accepting unit 63 of the second terminal apparatus 60 accepts the input.

S120: The second communicating unit 61 of the second terminal apparatus 60 connects to the transmission destination folder.

S121: Accordingly, the second communicating unit 61 of the second terminal apparatus 60 receives a list of image data (such as an application form) stored in the transmission destination folder, and the second display control unit 62 can display the list of image data.

S122: When the person in charge of processing selects the desired application form, etc., the second communicating unit 61 of the second terminal apparatus 60 receives the image data of the application form. When the second display control unit 62 displays the image data, the person in charge of processing can confirm the application form, etc.

<Operation Procedure According to the First Embodiment>

Figure 10:
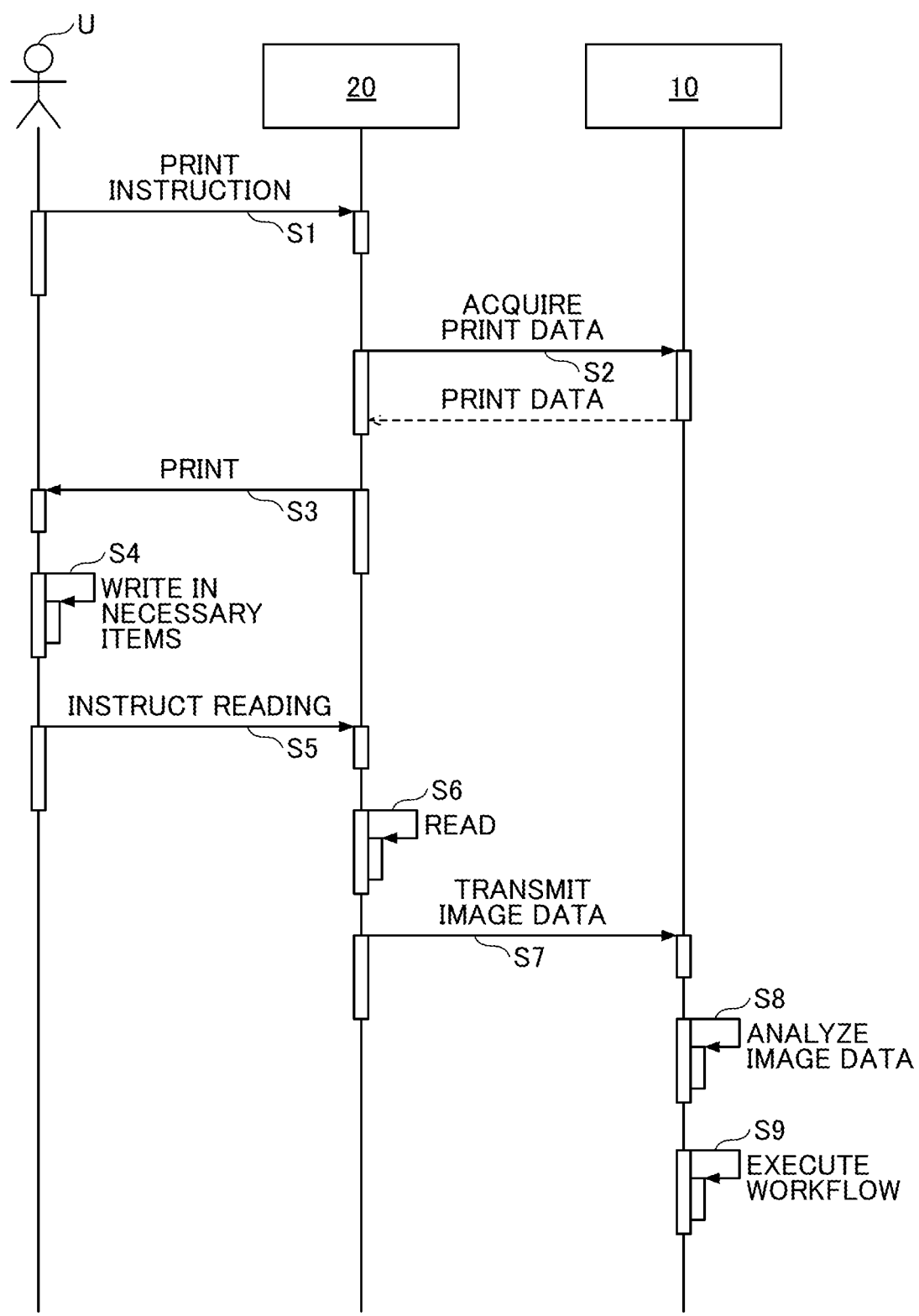
FIG. 10 is a sequence diagram illustrating an overall flow of basic printing and reading according to the first embodiment of the present invention.

Next, an operation of the information processing system 1 will be described with reference to FIG. 10. First, FIG. 10 is a sequence diagram illustrating the basic overall flow of printing and reading.

S1: The user inputs a print instruction to the apparatus 20. The operation accepting unit 22 of the apparatus 20 receives a print instruction.

S2: The communicating unit 25 of the apparatus 20 acquires the print data of the document from the service providing system 10.

S3: The output unit 23 of the apparatus 20 prints the print data.

S4: The user writes in the necessary items in the printed document.

S5: The user inputs an instruction to read the filled in document, to the apparatus 20. The operation accepting unit 22 of the apparatus 20 accepts the reading instruction.

S6: The input unit 24 of the apparatus 20 optically reads the document and generates image data.

S7: The communicating unit 25 of the apparatus 20 transmits the image data to the service providing system 10.

S8: The read workflow processing unit 15 of the service providing system 10 analyzes the transmitted image data and acquires the ID of the document to be described later.

S9: The read workflow processing unit 15 of the service providing system 10 performs a series of processes on the image data as described in FIG. 6B based on the analyzed workflow.

Hereinafter, each of the print workflow and the read workflow in FIG. 10 will be described in detail.

<Process of Print Workflow According to the First Embodiment>

FIG. 11 is an example of a sequence diagram illustrating a process executed by the information processing system 1 in a print workflow.

Figure 12:
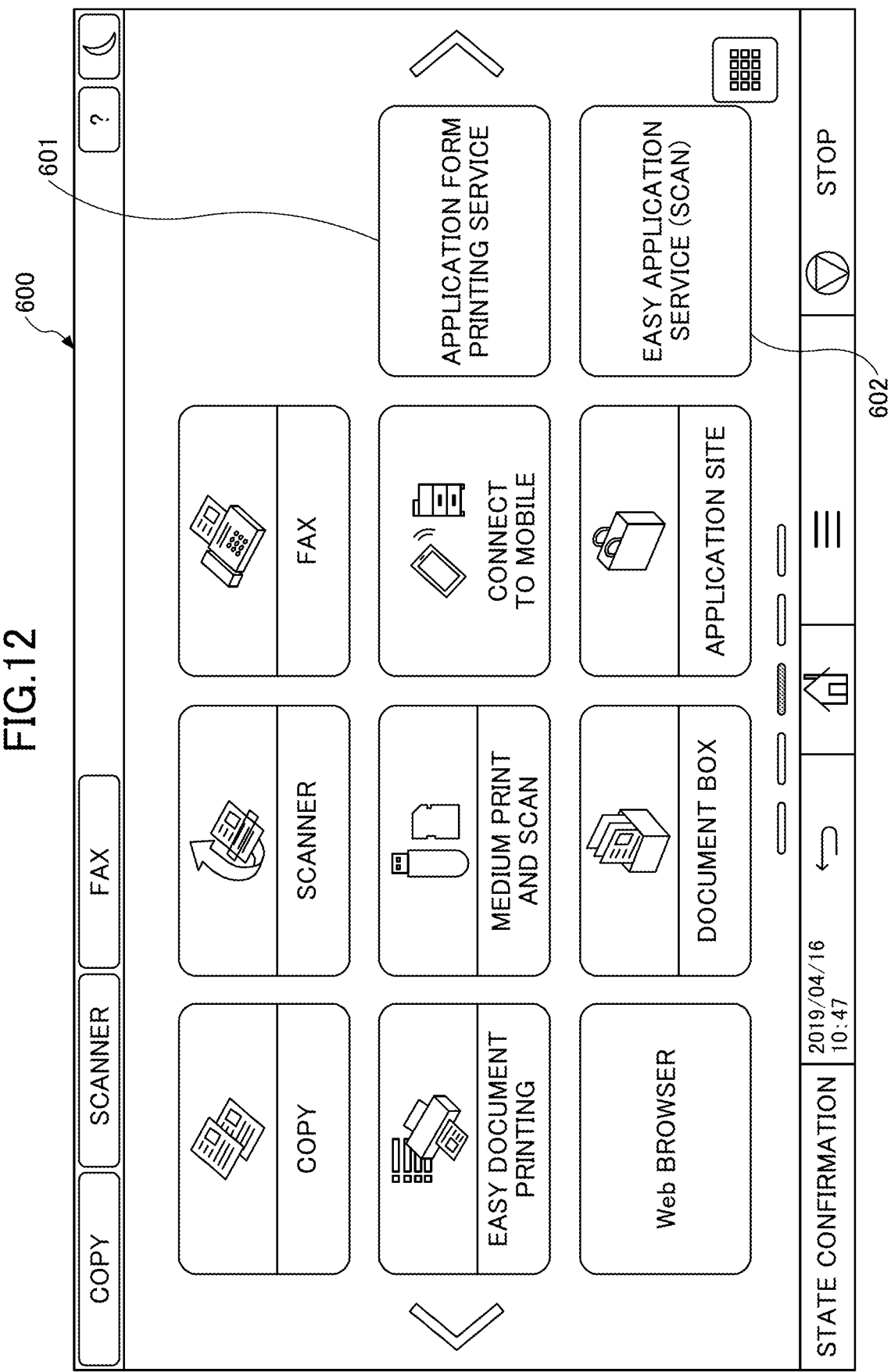
FIG. 12 is a diagram illustrating an example of a home screen according to the first embodiment of the present invention.

S11: The apparatus 20 displays a home screen, for example, where a list of several applications is displayed, and the user selects an application corresponding to the print workflow. An example of the home screen is illustrated in FIG. 12. When a user inputs an operation for displaying a print screen (when an application is selected), the operation accepting unit 22 accepts the input and reports the input to the display processing unit 21. This screen displayed by the application is referred to as a print screen (screen for printing).

S12: The display processing unit 21 transmits a request for acquiring the print screen to the communicating unit 25.

S13: The communicating unit 25 transmits a request for acquiring a print screen to the service providing system 10. The communicating unit 16 of the service providing system 10 receives a request for acquiring a print screen.

S14: The print workflow processing unit 14 requests the print data storage unit 11 for a file name of the document, in order to generate screen information of the print screen. The information is not limited to a file name but may be any relevant information that can identify a document. The information that can identify a document may be acquired from the processing method storage unit 13. The print workflow processing unit 14 acquires a list of documents stored in the print data storage unit 11.

The print workflow processing unit 14 transmits the file name of the document to the apparatus 20 via the communicating unit 16. The print workflow processing unit 14 may simply transmit the file name of the document to the apparatus 20 or may transmit screen information for displaying the file name of the document (or a name known by the user, such as the document name) as a web server to the apparatus 20. The screen information is described in Hyper Text Markup Language (HTML), XML, scripting language, and cascading style sheet (CSS), and is mainly analyzed and displayed by browser software.

S15: The communicating unit 25 of the apparatus 20 receives the file name of the document or screen information and transmits the result of acquiring the print screen (the file of the document name or screen information) to the display processing unit 21.

Figure 13A:
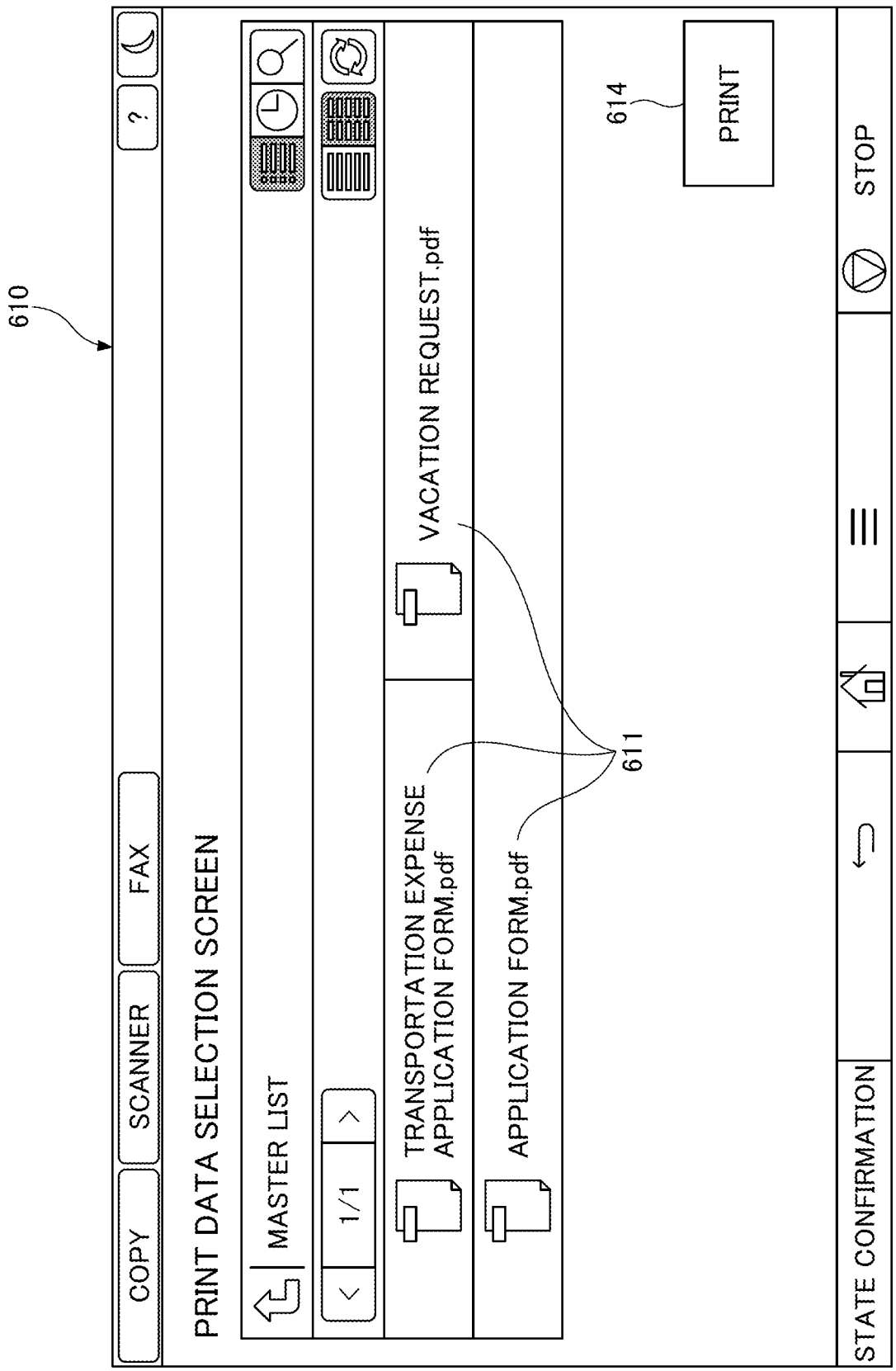

S16: The display processing unit 21 displays the print screen on the operation panel 940 based on the file name of the document or screen information. An example of a print screen is illustrated in FIGS. 13A and 13B. In the print screen, the user selects which document is to be printed. At this time, the print screen may prompt a document to be selected by directly displaying the contents of the print data storage unit 11 as illustrated in FIG. 13A, or the print screen may prompt a document to be selected by presenting documents in a selective format as illustrated in FIG. 13B. In either screen, the document type according to the selected document is specified in the following sequence.

S17: The user selects the document to be printed in the print screen. The operation accepting unit 22 accepts the document type according to the selection and reports the document type to the display processing unit 21. The document type is to be information identifying the print data. For example, a file name, an identification number in the print data storage unit 11, and the like may be used. The file name or the identification number in the print data storage unit 11 is acquired in step S14.

Figure 14:
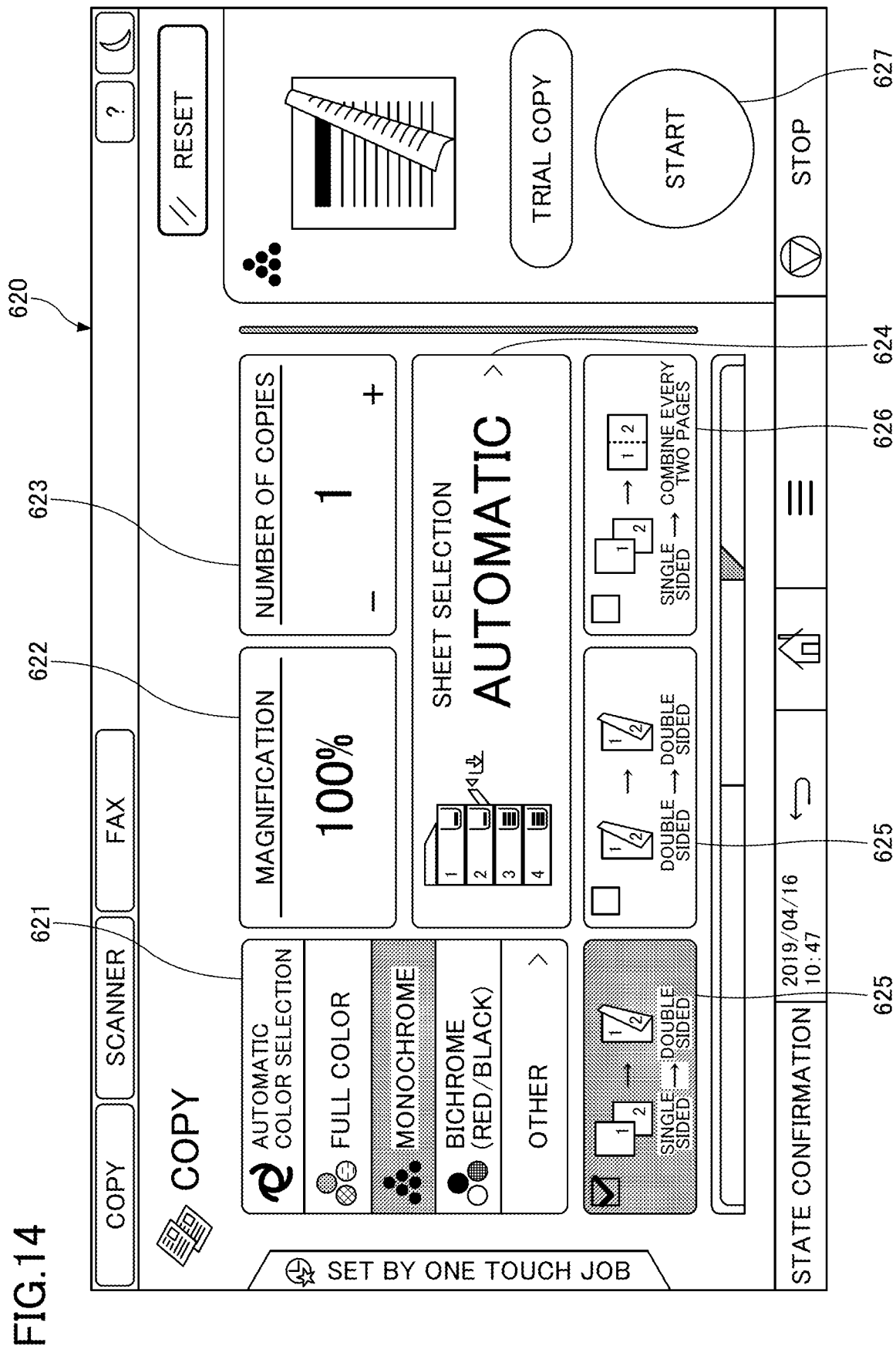
FIG. 14 is a diagram illustrating an example of a print setting screen according to the first embodiment of the present invention.

When the user selects the document, the print screen transitions to a print setting screen. The user can make print settings for the document in the print setting screen. An example of the print setting screen is illustrated in FIG. 14.

S18: The display processing unit 21 specifies the document type and transmits a print data acquisition request to the communicating unit 25.

S19: The communicating unit 25 of the apparatus 20 specifies the document type and transmits a print data acquisition request to the service providing system 10.

S20: The communicating unit 16 of the service providing system 10 receives the print data acquisition request, and the print workflow processing unit 14 of the service providing system 10 specifies the document type and acquires the print data of the document from the print data storage unit 11.

S21: The print workflow processing unit 14 of the service providing system 10 specifies the document type and acquires an ID from the processing method storage unit 13. In the example indicated in Table 1, if the document type is a vacation request, the ID "paper_id_003" is acquired.

S22: The print workflow processing unit 14 processes the print data. That is, the ID is appended to the print data. As the appending method, a character string may be appended directly, an image code (image information embedded with specific information such as a Quick Response (QR) code, a two-dimensional code, a bar code, etc.) may be appended, or an electronic watermark, a ground tint, and the like may be appended. In the present embodiment, an image code will be described as an example.

S23: The print workflow processing unit 14 transmits print data to the apparatus 20 via the communicating unit 16.

S24: The communicating unit 25 of the apparatus 20 receives the print data and returns the print data to the display processing unit 21. The text of the print data may be displayed for confirmation.

S25: The display processing unit 21 specifies the print data and transmits a print request to the output unit 23.

S26: The output unit 23 executes printing.

Thus, the print workflow executed and a template of a desired document in which an image code including an ID of the document type is formed, is printed.

<Example of Screen when Printing According to the First Embodiment>

FIG. 12 illustrates an example of the home window 600. The home window 600 is the start screen for user operation and is the first screen displayed after activation or login. A list of several applications is displayed, one of which is an application corresponding to the print workflow and one of which is an application corresponding to the read workflow.

For example, the application document printing service 601 is an application (one example of the first application) that corresponds to the print workflow, and the simple application service 602 is an application (one example of the second application) that corresponds to the read workflow. When the application document printing service 601 is selected, a print screen 610 illustrated in FIG. 13A or 13B is displayed.

Applications for these workflows are available to the user from an app market site in the operation panel 940. The added application has a link to a web application and accesses the web application created on the cloud by a workflow creation means.

FIGS. 13A and 13B illustrate examples of the print screen 610. FIG. 13A is the print screen 610 for directly displaying the contents of the print data storage unit 11. For this reason, a file name 611 of the document is listed. The user can select the desired document from these file names 611. The user can select the document by pressing the file name 611.

FIG. 13B is the print screen 610 for selecting a document in a selective format. The print screen 610 is created by the print workflow processing unit 14 or the display processing unit 21 of the apparatus 20, from the information of the print data storage unit 11. The print screen 610 displays a list 612 of documents. In FIG. 13B, the list 612 of documents is the same as the file names, but the name of the document known by the user can be displayed. For example, in in the print data storage unit 11, if an identification number is appended to each document and is associated with a file name, the name of the document displayed in the list 612 of documents may be any name. The user can select the document by pressing a radio button 613.

When the print button 614 is pressed in FIG. 13A or 13B, the display processing unit 21 displays the print setting screen.

FIG. 14 illustrates an example of a print setting screen 620. The print setting screen 620 is a screen for setting color/monochrome 621, magnification 622, a number of copies 623, a sheet 624, double-sided/single-sided 625, combine 626, and the like. When the user presses a start button 627, printing of the selected document is started (step S18 and subsequent steps are processed).

<Example of Writing into Document According to the First Embodiment>

Figures 15A, 15B:
FIGS. 15A and 15B are diagrams illustrating an example of a document printed by an apparatus according to the first embodiment of the present invention.

FIGS. 15A and 15B illustrate an example of a document printed by the apparatus 20. The document illustrated in FIGS. 15A and 15B is an example of a vacation request, but the document may be any kind. FIG. 15A illustrates a vacation request before appending the ID of the document type, and FIG. 15B illustrates the vacation request in which an image code 9 including the ID of the document type is formed. In FIG. 15B, the image code 9 is formed in the upper right of the vacation request. The ID of the document type (for example, paper_id=003) is encoded in the image code 9. Note that the position of forming the image code 9 can be set by the administrator in the setting of the workflow. The user fills in necessary items in the vacation request and instructs to execute the read workflow.

<Process of Read Workflow According to the First Embodiment>

Figure 16:
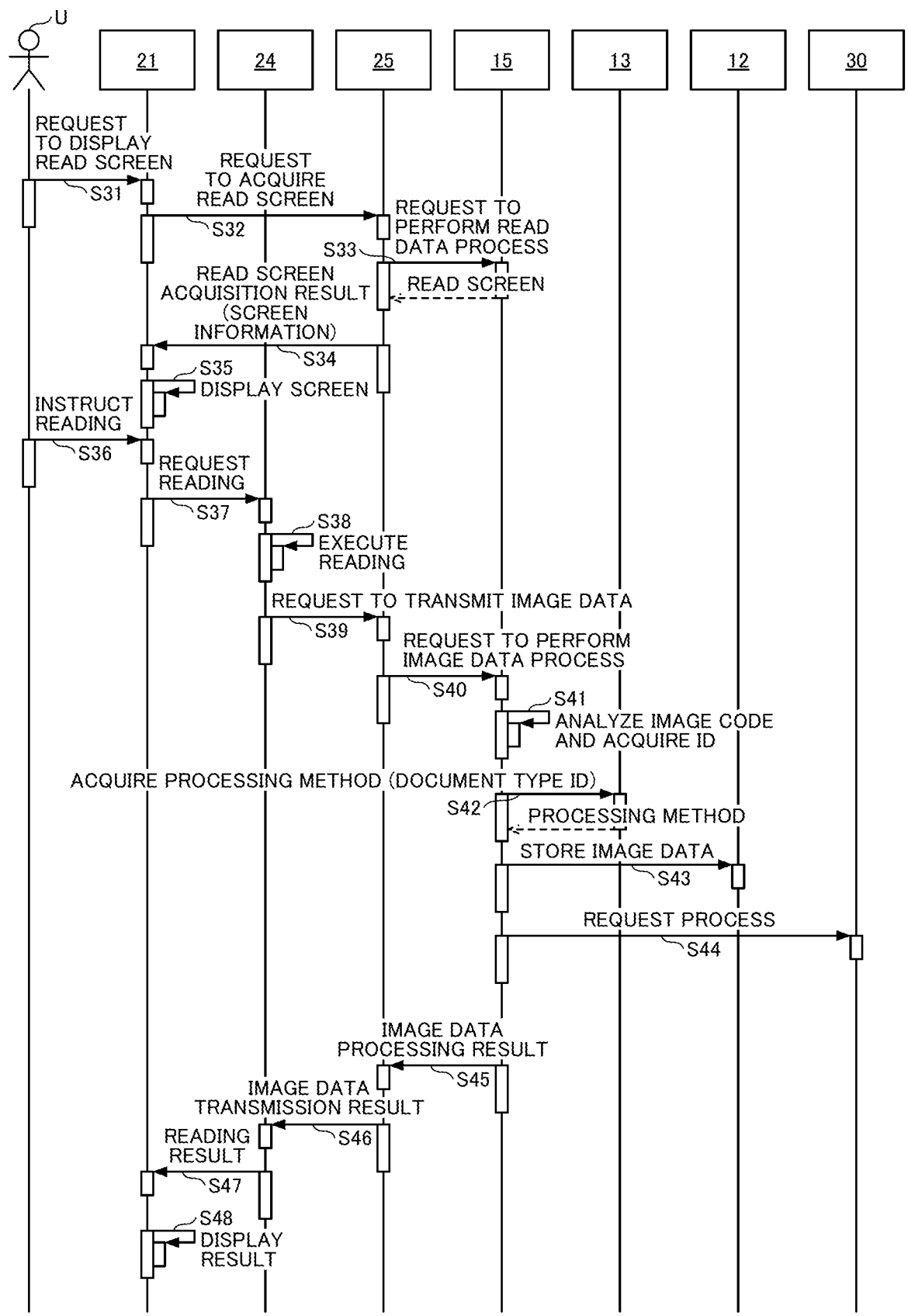
FIG. 16 is a sequence diagram illustrating a process executed by an information processing system in a read workflow according to the first embodiment of the present invention.

FIG. 16 is an example of a sequence diagram illustrating a process performed by the information processing system 1 in a read workflow.

S31: Similarly, the user has instructed to display the home screen 600, and the user selects an application (the simple application service 602) corresponding to the read workflow. The screen displayed by this application is a screen used for reading (the read screen). When the user inputs an operation for displaying the read screen (pressing the simple application service 602), the operation accepting unit 22 accepts the input and reports the input to the display processing unit 21.

S32: The display processing unit 21 transmits a request for acquiring a read screen to the communicating unit 25.

S33: The communicating unit 25 transmits the request for acquiring a read screen to the service providing system 10. The communicating unit 16 of the service providing system 10 receives the request for acquiring a read screen. The read workflow processing unit 15 transmits screen information of the read screen to the apparatus 20. The read screen may be a fixed screen displaying a predetermined message.

S34: The communicating unit 25 of the apparatus 20 transmits the screen information of the received read screen to the display processing unit 21.

Figure 17:
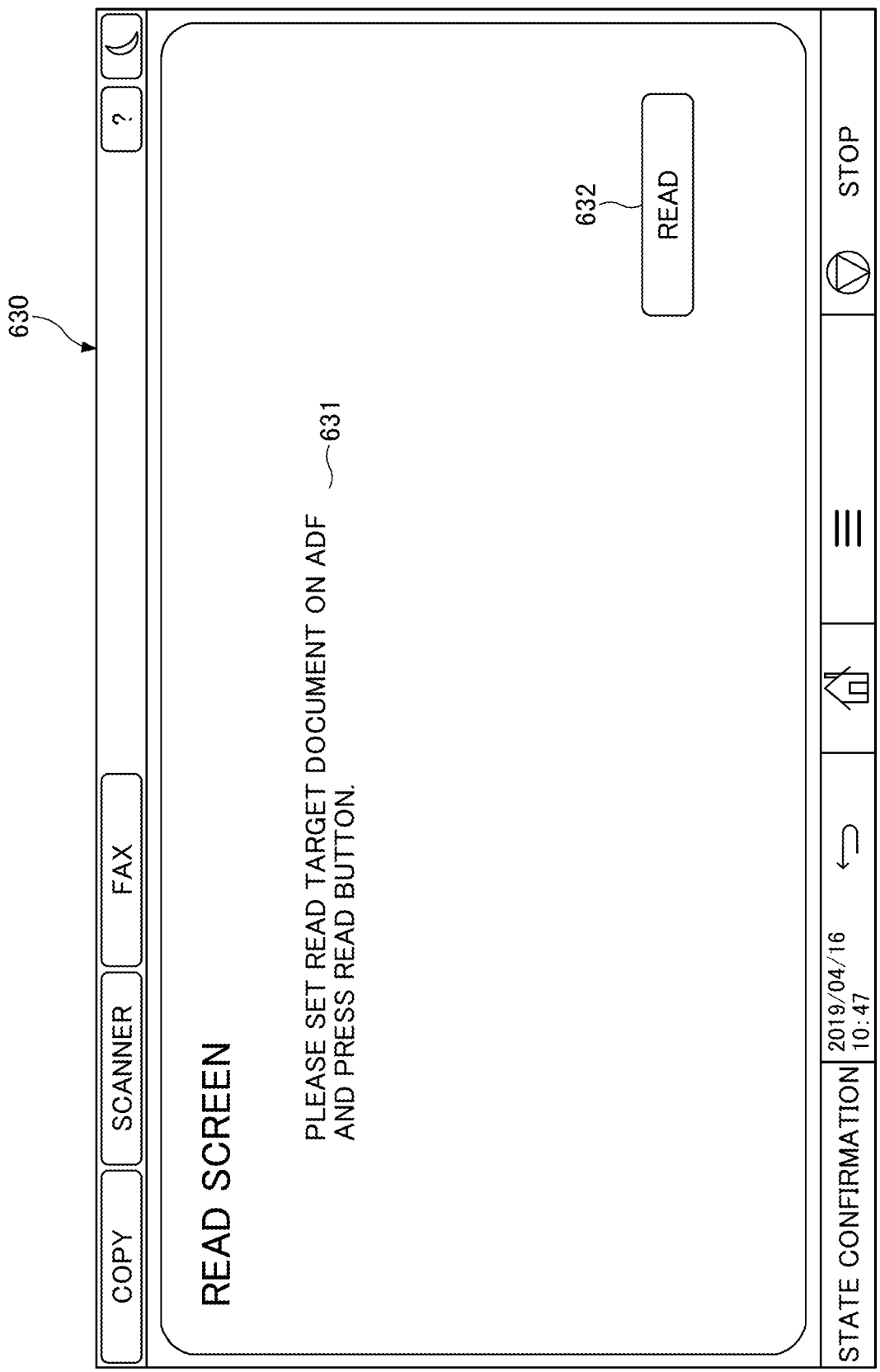
FIG. 17 is a diagram illustrating an example of a read screen according to the first embodiment of the present invention.

S35: The display processing unit 21 displays the read screen on the operation panel 940 based on the screen information of the read screen. An example of a read screen is illustrated in FIG. 17.

S36: The user refers to the read screen and sets the document in the automatic document feeder (ADF) and the like, and inputs an instruction to read the filled in document, to the apparatus 20. The operation accepting unit 22 accepts the read instruction.

Figure 18:
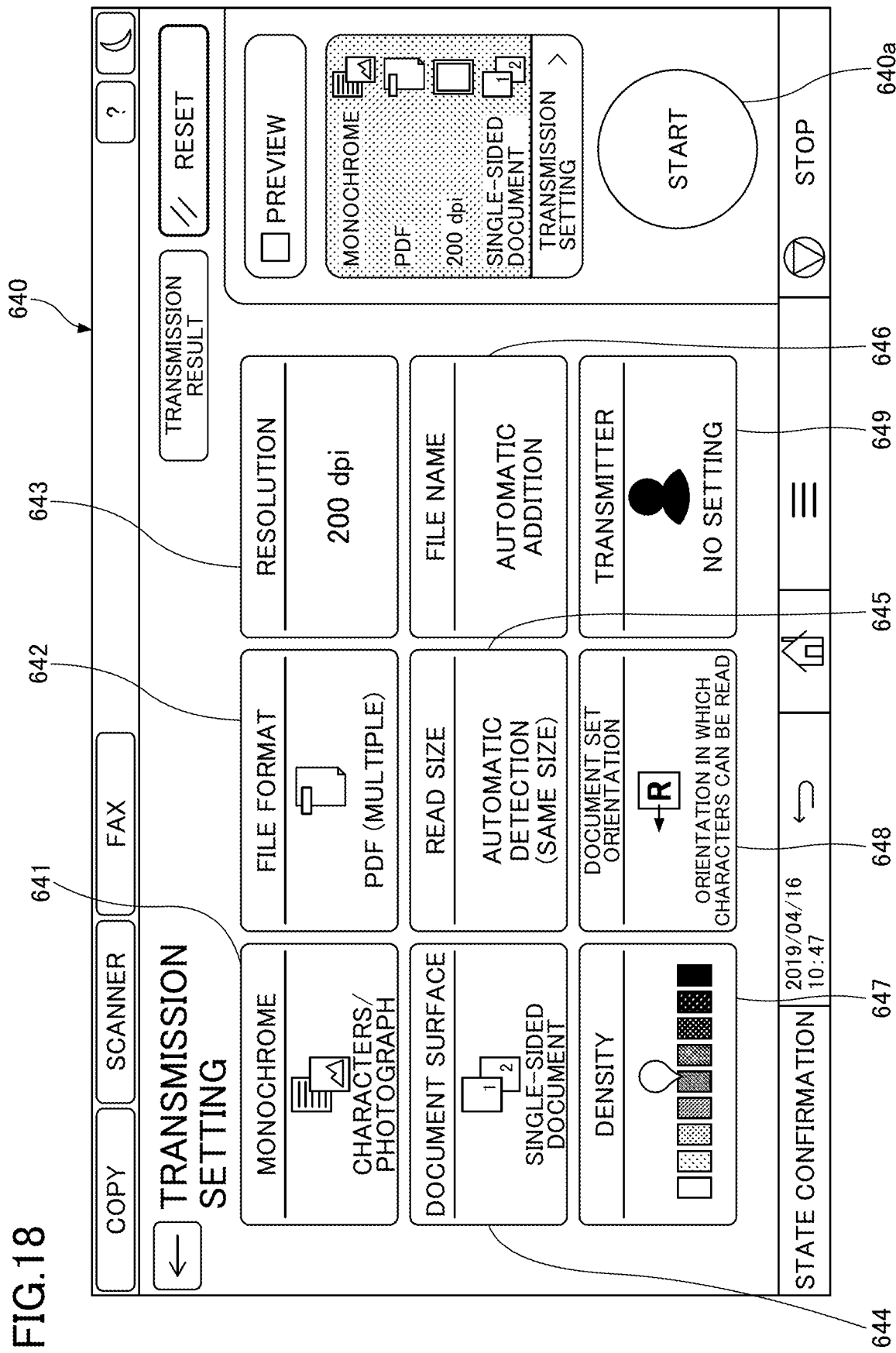
FIG. 18 is a diagram illustrating an example of a read setting/execution screen according to the first embodiment of the present invention.

When a user inputs a read instruction, the read screen transitions to the read setting/execution screen. The user can set reading conditions on the read setting/execution screen. An example of the read setting/execution screen is illustrated in FIG. 18.

S37: The display processing unit 21 specifies a reading condition and transmits a read request to the input unit 24.

S38: The input unit 24 executes reading of the document according to the reading conditions. Accordingly, image data of the document is generated.

S39: The input unit 24 transmits a request to transmit the image data to the communicating unit 25.

S40: The communicating unit 25 of the apparatus 20 transmits the image data to the service providing system 10.

S41: The communicating unit 16 of the service providing system 10 receives image data, and the read workflow processing unit 15 detects the image code and analyses (decodes) the image code, if any. Accordingly, the ID of the document type is restored.

S42: The read workflow processing unit 15 specifies the ID of the document type and acquires processing method information from the processing method storage unit 13. Here, the processing method is to be acquired. When "paper_id 003" is the ID of the document type read from the image code, the processing method includes the data storage destination "/kyuka folder and below" and the report destination "ccc@bb.cc".

S43: The read workflow processing unit 15 stores image data in a folder set in the processing method storage unit 13. In FIG. 16, it is assumed that the folder is in the read data storage unit 12.

S44: Similarly, the read workflow processing unit 15 transmits image data to the external system set in the processing method storage unit 13 and requests a process corresponding to the external system. In the case of the processing method storage unit 13 indicated in Table 1, the process is to transmit a report mail to "ccc@bb.cc". Also, a request for a cooperation process may be sent to another external system.

S45: The read workflow processing unit 15 transmits the process result to the apparatus 20.

S46: The communicating unit 25 of the apparatus 20 receives the process result and transmits the process result to the input unit 24.

S47: The input unit 24 transmits the process result to the display processing unit 21.

Figure 19:
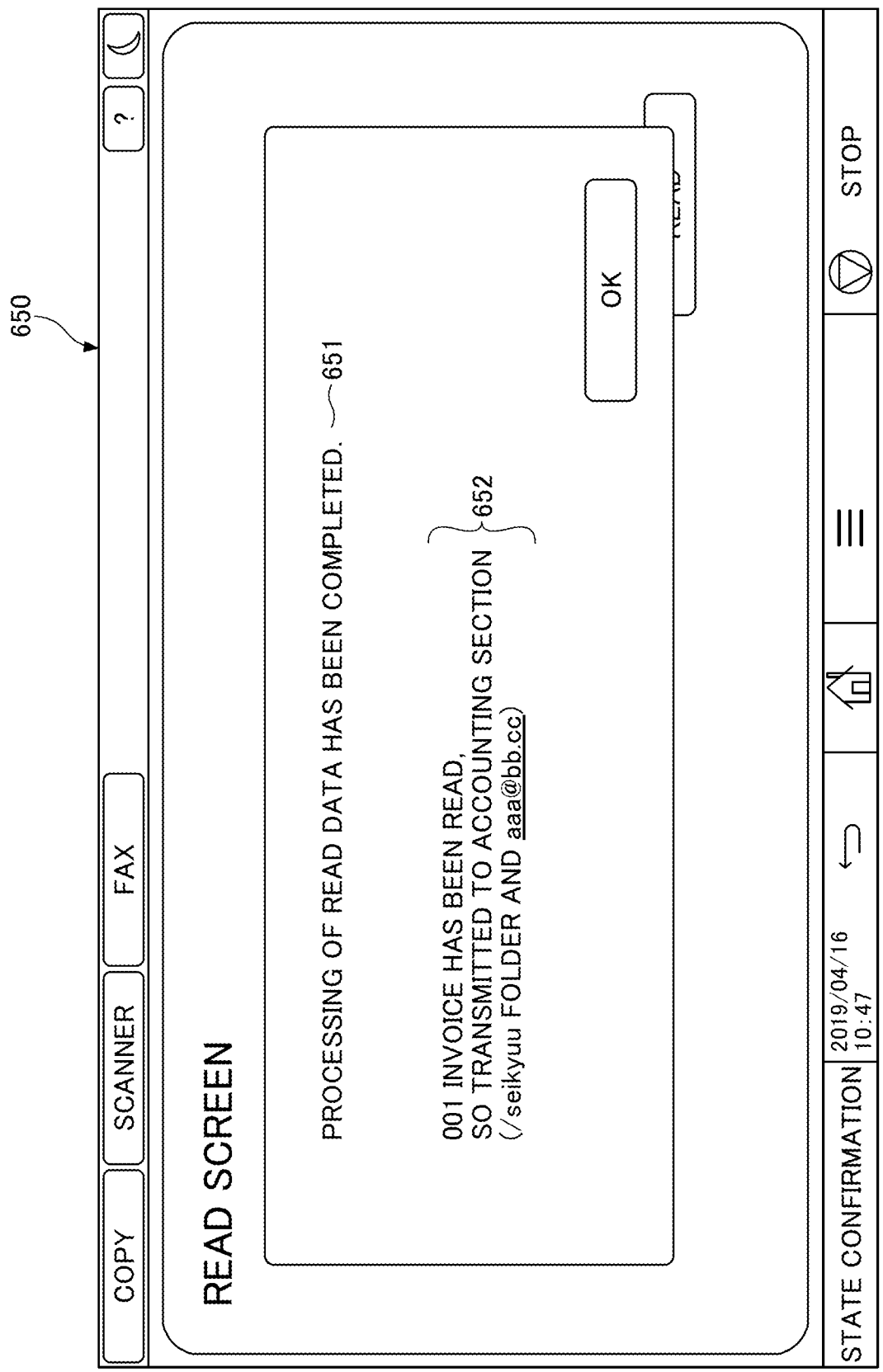
FIG. 19 is a diagram illustrating an example of a read/process result screen according to the first embodiment of the present invention.

S48: The display processing unit 21 displays a read/process result screen including the process result on the operation panel 940. An example of the read/process result screen is illustrated in FIG. 19.

Accordingly, the read workflow is executed, and the document is transmitted to a folder determined according to the document type, or processed by an external system.

<Example of Read Screen According to the First Embodiment>

FIG. 17 illustrates an example of a read screen 630. The screen transitions to the read screen 630 of FIG. 17 is made when the simple application service 602 is selected in the home screen of FIG. 12. The read screen 630 includes a message 631 stating "Set the read document in the ADF and click the read button", and a read button 632. When the read button 632 is pressed, the read screen 630 moves to a read setting/execution screen 640.

FIG. 18 illustrates an example of the read setting/execution screen 640. In the read setting/execution screen 640, monochrome 641, file format 642, resolution 643, document surface 644, read size 645, file name 646, density 647, document set orientation 648, and transmitter 649 can be set. When a start button 640*a* is pressed, the reading is started (step S37 and subsequent steps are processed). When the reading is completed, the screen transitions to a read/process result screen 650.

FIG. 19 is an example of the read/process result screen 650. In the read/process result screen 650, a message 651 stating "processing of read data has been completed" and a processing method 652 performed for processing the image data based on the ID of the document type and the processing method information are displayed. The processing method 652 is, for example, "001 invoice has been read, so transmitted to accounting section (/seikyu folder and aaa@bb.cc)". "001" is the ID of the document type. Further, it is assumed that information such as "accounting section" is preset in the processing method storage unit 13.

<Read Workflow Including Fax Transmission According to the First Embodiment>

A supplementary explanation is given for a case where a fax transmission process is included in the read workflow. The print workflow is unchanged.

FIG. 20 illustrates an example of a read workflow that includes fax transmission. The read workflow sequentially executes a series of processes of "OCR on image", "transmit image to cloud A", "transmit mail", and "fax transmission". This constructed in advance in a program-less manner.

FIG. 21 illustrates an example of processing method information corresponding to a workflow including fax transmission. The fax transmission destination is set in association with an ID. The fax transmission destination may be "none".

Figure 22:
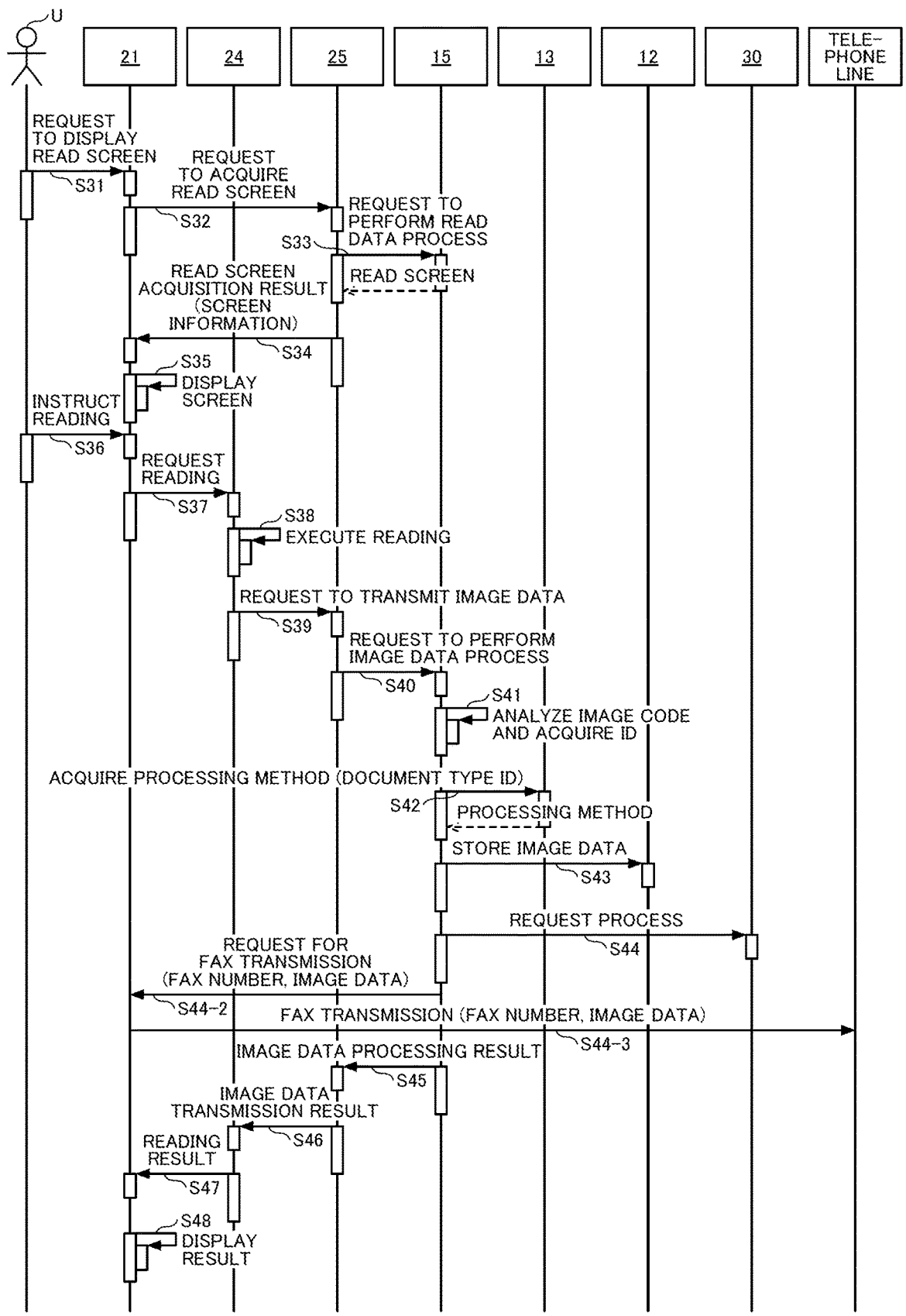
FIG. 22 is a sequence diagram illustrating a process executed by an information processing system in a read workflow according to the first embodiment of the present invention.

FIG. 22 is an example of a sequence diagram describing the process executed by the information processing system 1 in the read workflow. In the description of FIG. 22, the difference from FIG. 16 will be mainly described. Steps S31 to S44 of the sequence diagram of FIG. 22 may be the same as those of FIG. 16.

S44-2: The read workflow processing unit 15 requests the apparatus 20 to perform fax transmission based on the workflow. In this case, in step S42, a fax number acquired from the processing method storage unit 13 and the image data are transmitted to the apparatus 20.

S44-3: The apparatus 20 connects to a telephone line, specifies the fax number, and transmits the image data by fax. The sequence diagram illustrates these processes in a simplified form. The subsequent processes may be the same as those in FIG. 16. Accordingly, in the case of fax transmission, the fax transmission destination can be changed depending on the document type. In the case of the Internet fax, the destination is specified by an e-mail address instead of a fax number, and an external system transmits the fax in the same manner as an e-mail.

<Overview of the First Embodiment>

As described above, at the time of printing and at the time of printing, reference is made to a common processing method storage unit 13, and the print workflow and the reading workflow are linked (performed in cooperation with each other). Therefore, when it is desired to extend the workflow, this can be done only by modifying the processing method. The workflow can be changed only by setting the processing method by the administrator. The workflow can be changed only by setting the "ID: document type: processing method" in the processing method storage unit 13, and, therefore, the workflow can be easily extended.

When the user selects the document, the image data can be processed by a processing method according to the document type. The workflow can be extended according to the user-selected document, without changing the print workflow or the read workflow.

Note that in the present embodiment, the apparatus 20 outputs the document; however, the document does not have to be output. For example, the user may operate the hard key 940*b* with respect to print data displayed on the operation panel 940 by the apparatus 20 and transmit the document to the service providing system 10 without outputting the document. The same operation is possible even if the apparatus 20 is an information processing apparatus such as a PC. Further, if handwriting input to the apparatus 20 (or tablet and the like) is possible, the user can input handwriting to the document and transmit the document to the service providing system 10 without outputting the document.

In the present embodiment, the apparatus 20 prints the print data of the document stored in the service providing system 10, but the apparatus 20 may print a fax message received by the apparatus 20. A document type ID is appended to the fax message, and when the fax message is read, the service providing system 10 can process the fax message using a processing method according to the ID.

Second Embodiment

In a second embodiment, the information processing system 1 capable of executing a workflow corresponding to a user who has logged in at the time of printing, will be described. The workflow can be extended for each logged-in user.

In the present embodiment, the hardware configuration diagrams of FIGS. 3 and 4 described in the first embodiment and the functional block diagram of FIG. 5 may be incorporated, and only the main differences may be described.

In the present embodiment, processing method information for each user is stored in the processing method storage unit 13. Table 2 indicates the processing method information for each user.

TABLE 2

| ID | USER NAME | SUPERVISOR INFORMATION | GENERAL AFFAIRES INFORMATION |
|---|---|---|---|
| User_001 | Mr. A | Mr. D (ddd@bb.cc) | Mr. G (ggg@bb.cc) |
| User_002 | Mr. B | Mr. E (eee@bb.cc) | Mr. G (ggg@bb.cc) |
| User_003 | Mr. C | Mr. F (fff@bb.cc) | Mr. H (hhh@bb.cc) |

Table 2 is an example of processing method information for users. In the processing method information for users, a processing method of a workflow according to the user who has logged in at the time of printing, is set. For example, the user ID "User_001" is Mr. A, and Mr. A transmits image data to his supervisor "Mr. D (ddd@bb.cc)" and to general affairs "Mr. G (ggg@bb.cc)". Such processing method information may be created separately by the administrator, or an existing personnel database, etc., may be used to create the processing method information.

<Process of Print Workflow According to the Second Embodiment>

Figure 23:
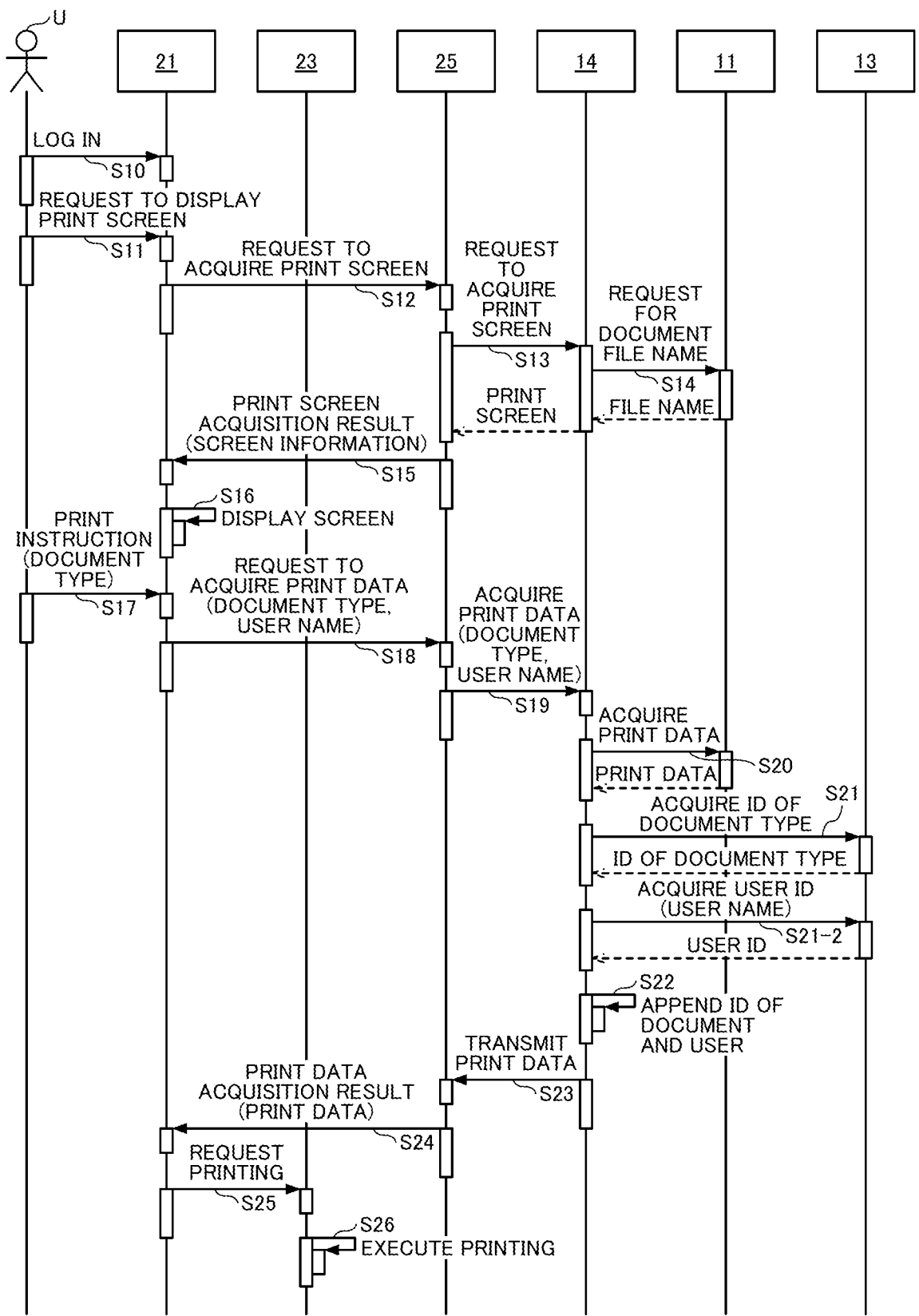
FIG. 23 is a sequence diagram illustrating a process executed by an information processing system in a print workflow according to a second embodiment of the present invention.

FIG. 23 is an example of a sequence diagram illustrating a process performed by the information processing system 1 in a print workflow. In the description of FIG. 23, the difference from FIG. 11 will be mainly described.

S10: First, in the present embodiment, in order to identify the user ID, the user logs into the apparatus 20. An example of an authentication screen is illustrated in FIG. 24. The user inputs account information to the apparatus 20, and the authenticating unit 26 authenticates the user based on the account information accepted by the operation accepting unit 22. The authenticating unit 26 reports to the display processing unit 21 as to whether the authentication is successful or unsuccessful. Here, it is assumed that the authentication is successful and the user name has been identified. The information to be identified is not limited to a user name, as long as it is possible to identify information for specifying or identifying a user and information that is registered in the processing method storage unit 13. Subsequent processes of steps S11 to S17 may be the same as those of FIG. 11.

S18: The display processing unit 21 specifies the document type and the user name of the logged-in user, and transmits a print data acquisition request to the communicating unit 25.

S19: The communicating unit 25 specifies a document type and a user name and transmits a print data acquisition request to the service providing system 10.

S20: The communicating unit 16 of the service providing system 10 receives the document type and the user name, and the print workflow processing unit 14 of the service providing system 10 specifies the document type and acquires the print data from the print data storage unit 11.

S21: The print workflow processing unit 14 of the service providing system 10 specifies the document type and acquires an ID from the processing method storage unit 13. In the example indicated in Table 1, if the document type is a vacation request, the ID "paper_id 003" is acquired.

S21-2: The print workflow processing unit 14 of the service providing system 10 specifies the user name and acquires a user ID from the processing method storage unit 13. In the example indicated in Table 2, if the user name is "Mr. A", the user ID of "User_001" is acquired.

S22: The print workflow processing unit 14 processes the print data. That is, the ID and the user ID are appended to the print data. The appending method may be the same as that of FIG. 11. The subsequent processes are the same as those in FIG. 11.

Thus, a print workflow is executed, and a template of a desired document in which the image code 9 including an ID of a document type and a user ID is formed, is printed.

<Example of Authentication Screen According to the Second Embodiment>

Figure 24B:
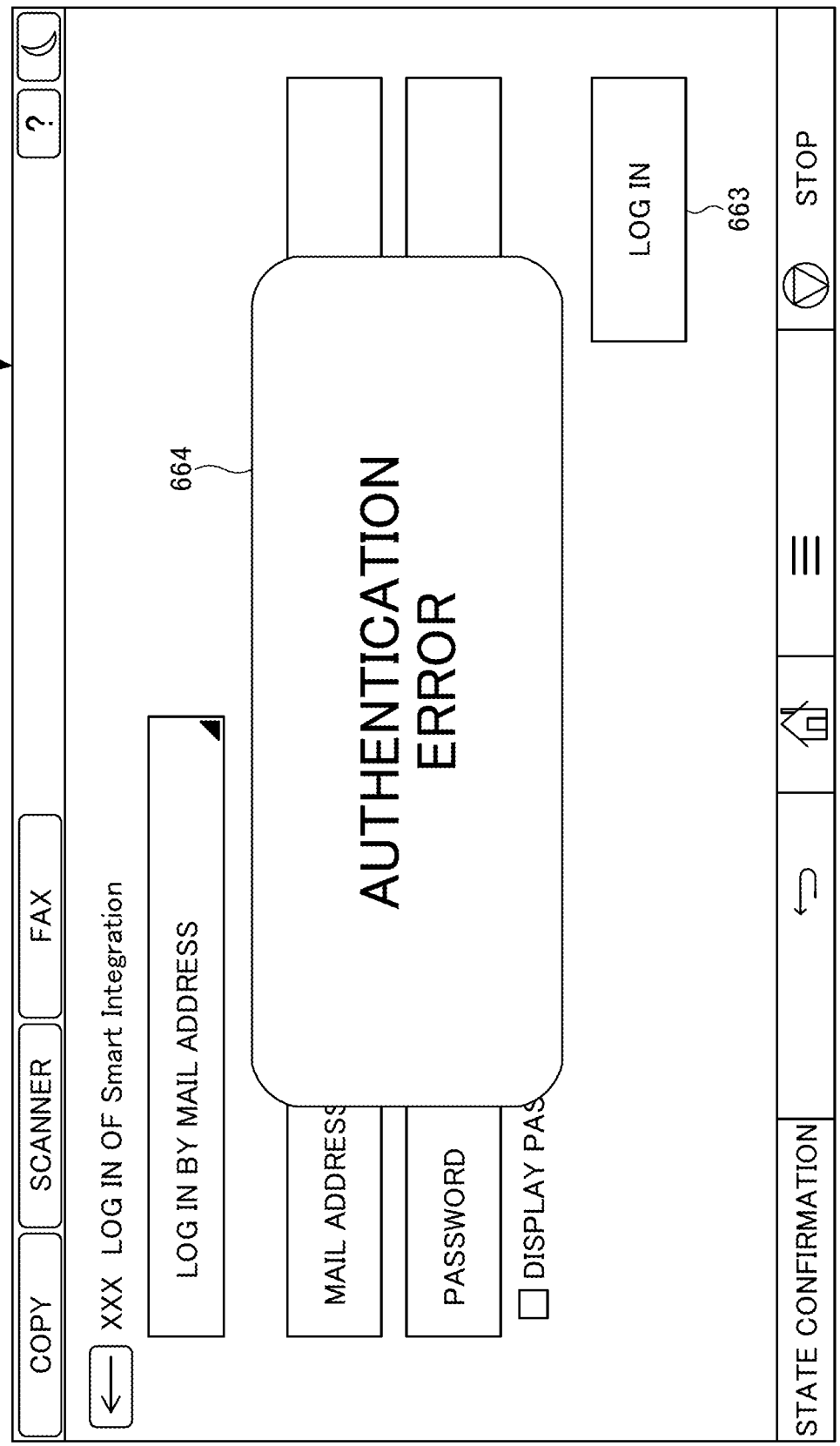

FIGS. 24A and 24B illustrate an example of an authentication screen 660. As illustrated in FIG. 24A, the authentication screen 660 includes a mail address field 661, a password field 662, and a login button 663. When the application document printing service 601 or the simple application service 602 is pressed on the home screen 600, the screen transitions to the authentication screen 660.

The user inputs a mail address in the mail address field 661 and a password in the password field 662, and presses the login button 663. The mail address is one example of identification information of the user. Accordingly, the authenticating unit 26 determines whether the authentication is successful or unsuccessful based on the account information (mail address and password). If authentication is successful, the print screen 610 or the read screen 630 is displayed. If authentication is unsuccessful, the error message 664 illustrated in FIG. 24B is displayed. In this case, the user inputs the mail address and password again.

<Process of Read Workflow According to the Second Embodiment>

Figure 25:
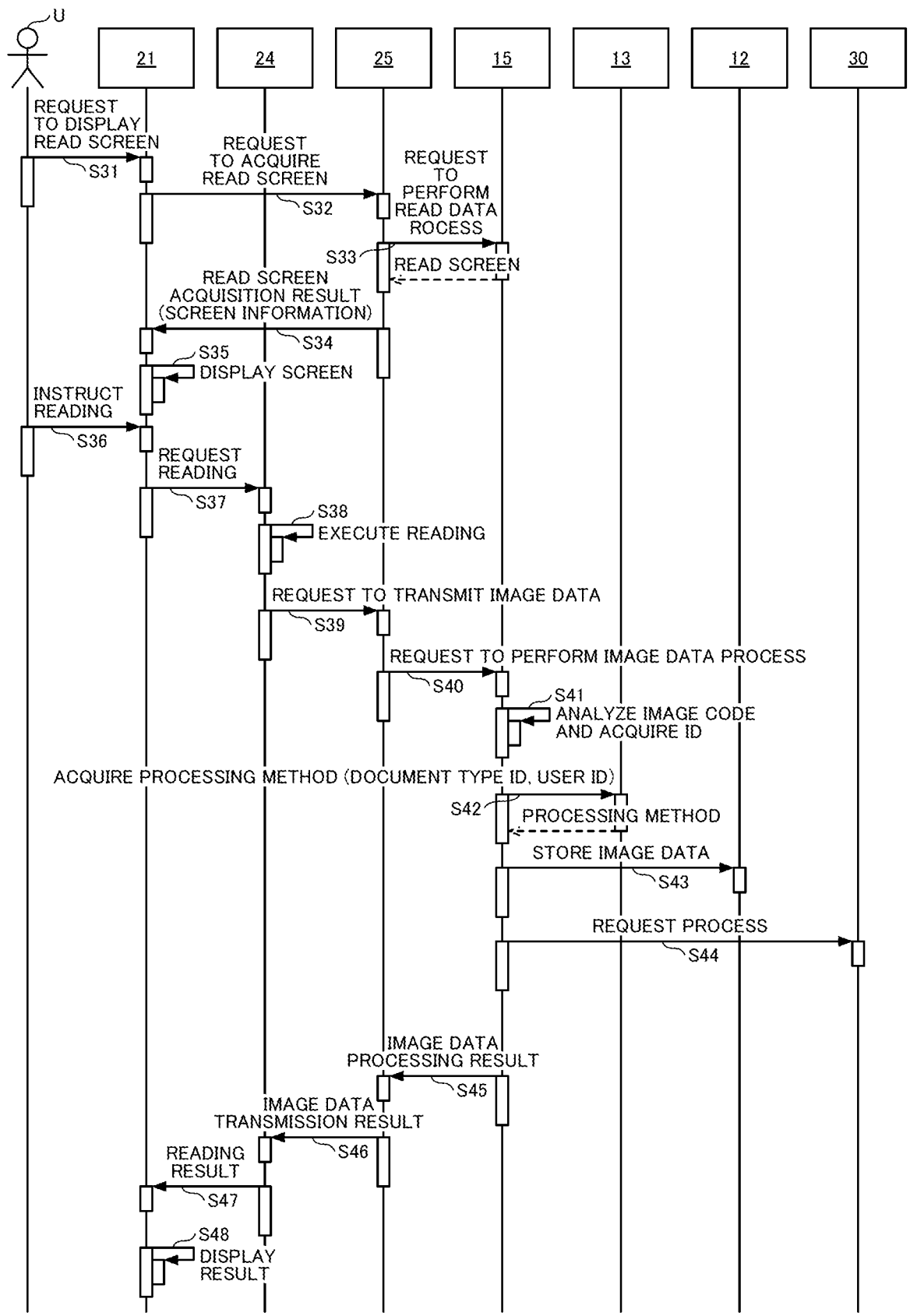
FIG. 25 is a sequence diagram illustrating a process executed by an information processing system in a read workflow according to the second embodiment of the present invention.

FIG. 25 is an example of a sequence diagram illustrating a process performed by the information processing system 1 in a read workflow. In the description of FIG. 25, the difference from FIG. 16 will be mainly described. First, the processes of steps S31 to S40 may be the same as those of FIG. 16.

S41: The communicating unit 16 of the service providing system 10 receives image data, and the read workflow processing unit 15 detects an image code and analyses (decodes) the image code, if any. Accordingly, the ID of the document type and the user ID are restored.

S42: The read workflow processing unit 15 specifies the ID of the document type and the user ID, and acquires the processing method information from the processing method storage unit 13. Here, the processing method is to be acquired. When "paper_id 003" is the ID of the document type read from the image code, the processing method includes the data storage destination "/kyuka folder and below" and the report destination "ccc@bb.cc". When the user ID is "User_001", the processing method includes the report destinations "ddd@bb.cc" and "ggg@bb.cc".

S43: The read workflow processing unit 15 stores image data in a folder set in the processing method storage unit 13. In FIG. 25, it is assumed that the folder is in the read data storage unit 12.

S44: Similarly, the read workflow processing unit 15 transmits image data to an external system set in the processing method storage unit 13 and requests a process corresponding to the external system. In the case of the processing method information indicated in Table 1, the process is to transmit a report mail to "ccc@bb.cc", "ddd@bb.cc", and "ggg@bb.cc". Also, a request for a cooperation process may be sent to another external system. The subsequent processes may be the same as those in FIG. 16.

Accordingly, the read workflow is executed, and the document is transmitted to a folder determined according to the document type, or processed by an external system.

<Overview of the Second Embodiment>

According to the present embodiment, the workflow can be extended for each logged-in user. For example, the submission destination can be changed by each user, by each supervisor corresponding to the user, or by each department to which the user belongs. Further, in addition to the processing method for each document type ID according to the first embodiment, the processing method for each user or for each supervisor/department can be additionally executed. For example, in addition to the management department of the head office (e.g., transmission destination and report destination in Table 1), a submission destination (e.g., supervisor and general affairs information in Table 2) for each branch office or workplace can be added as the submission destination. Further, the user or the administrator may select either a processing method for each document type ID or a processing method for each user or for each supervisor/department, to perform the process.

Third Embodiment

In a third embodiment, the information processing system 1 capable of executing a workflow corresponding to a user who has logged in at the time of reading, will be described. Similar to the second embodiment, the workflow can be extended for each logged-in user, but the timing of logging in is different from that of the second embodiment. In the present embodiment, the user logs in at the time of reading, and the read workflow processing unit 15 executes the workflow by using the user information obtained at the time when the user has logged in. Any user can use a document that another user has printed out, to extend the workflow for each user.

In the present embodiment, the hardware configuration diagrams of FIGS. 3 and 4 described in the first embodiment and the functional block diagram of FIG. 5 may be incorporated, and only the main differences may be described. The sequence diagram of the print workflow of the present embodiment may be the same as that of FIG. 11 of the first embodiment, and, therefore, reference is made to FIG. 11 as necessary. The processing method information for each user is assumed to be the same as in Table 2.

<Process of Read Workflow According to the Third Embodiment>

Figure 26:
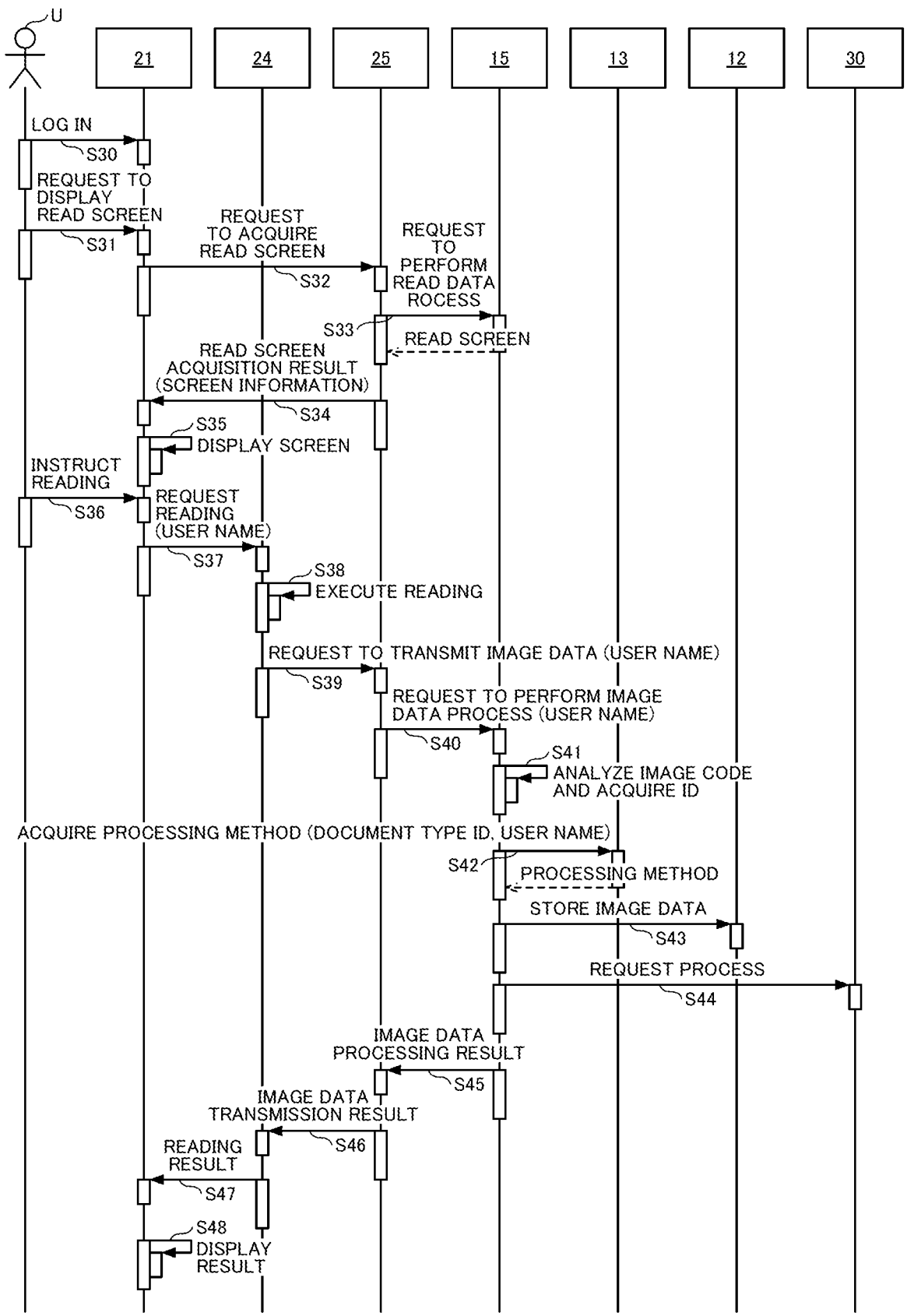
FIG. 26 is a sequence diagram illustrating a process executed by an information processing system in a read workflow according to a third embodiment of the present invention.

FIG. 26 is an example of a sequence diagram illustrating a process performed by the information processing system 1 in a read workflow. In the description of FIG. 26, the differences from FIG. 16 will be mainly described.

S30: A user logs in to the apparatus 20 at the time of reading. A user name is identified by the login. A user ID may be identified. The processes of steps S31 to S36 may be the same as those of FIG. 16.

S37: The display processing unit 21 specifies the reading condition and the user name and transmits a read request to the input unit 24.

S38: The input unit 24 executes reading of a document according to the reading condition. Accordingly, image data of the document is generated.

S39: The input unit 24 transmits a request to transmit the image data and the user name, to the communicating unit 25.

S40: The communicating unit 25 of the apparatus 20 transmits image data and the user name to the service providing system 10.

S41: The communicating unit 16 of the service providing system 10 receives the image data, and the read workflow processing unit 15 detects the image code and analyses (decodes) the image code, if any. Accordingly, the ID of the document type is restored.

S42: The read workflow processing unit 15 specifies the ID of the document type and the user name and acquires processing method information from the processing method storage unit 13. Here, the processing method is to be acquired. When "paper_id 003" is the ID of the document type read from the image code, the processing method includes the data storage destination "/kyuka folder and below" and the report destination "ccc@bb.cc". When the user name is "Mr. A", the processing method incudes the report destinations "ddd@bb.cc" and "ggg@bb.cc".

S43: The read workflow processing unit 15 stores image data in a folder set in the processing method storage unit 13. In FIG. 26, it is assumed that the folder is in the read data storage unit 12.

S44: Similarly, the read workflow processing unit 15 transmits image data to the external system set in the processing method storage unit 13 and requests a process corresponding to the external system. In the case of the processing method storage unit 13 indicated in Table 1, the process is to transmit a report mail to "ccc@bb.cc", "ddd@bb.cc", and "ggg@bb.cc". Also, a request for a cooperation process may be sent to another external service. Subsequent processes may the same as those of FIG. 16.

Accordingly, the read workflow is executed, and the document is transmitted to a folder determined according to the document type, or processed by an external system.

<Overview of the Third Embodiment>

According to the present embodiment, in addition to the effect of the first embodiment, the workflow can be extended for each logged-in user. Any user can use a document that another user has printed out, to extend the workflow for each user.

<When the Document Includes a User ID and the User Also Logs in at the Time of Reading>

In the second embodiment, the user logs in at the time of printing, and in the third embodiment, the user logs in at the time of printing; however, the user may log in both at the time of printing and at the time of reading. In this case, the processing method for each of the workflows (for each of the print workflow and the read workflow) can be identified by the user ID formed in the document at the time of printing and the user name identified by login at the time of reading. Accordingly, different folder names and report destinations can be obtained for the respective workflows, and the service providing system 10 can perform transmission to the respective destinations.

When the user desires to adopt either a processing method associated with the user ID formed in the document at the time of printing or a processing method associated with the user name identified by login at the time of reading, the user may set the desired processing method in the read screen 630. In this case, the read workflow processing unit 15 displays radio buttons and the like that accept a selection for prioritizing either the user ID at the time of printing or the user name identified by login, on the read screen 630.

Figure 27:
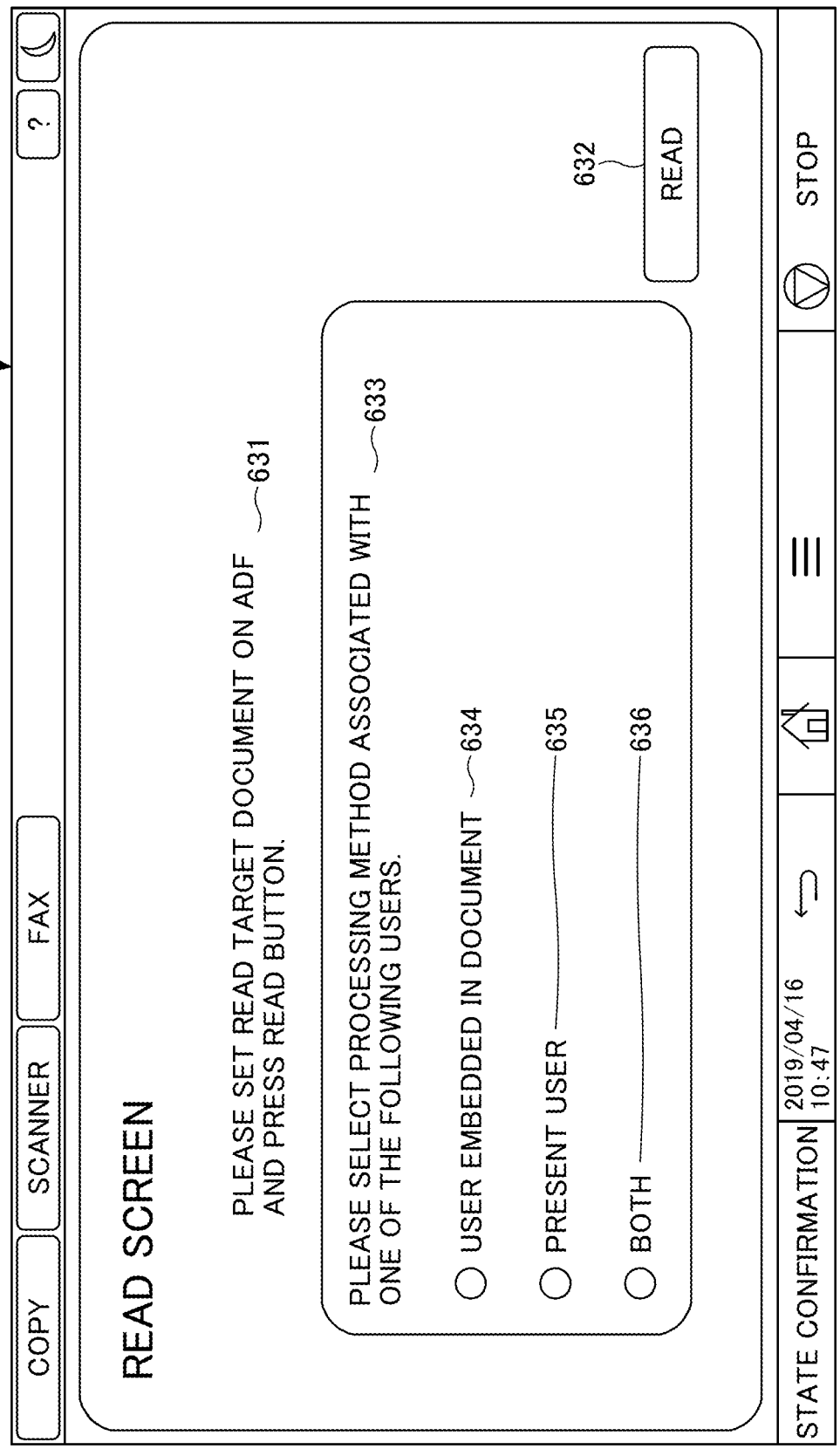
FIG. 27 is a diagram illustrating an example of a read screen according to the third embodiment of the present invention.

FIG. 27 is an example of the read screen 630. The screen transitions to the read screen 630 of FIG. 27 when the simple application service is selected in the home screen 600 of FIG. 12. In the read screen 630 of FIG. 27, in addition to the message 631 of FIG. 17, a message 633 stating "please select processing method associated with one of the following users" is displayed, together with "user embedded in document" 634, "present user" 635, and "both" 636 that are displayed in a selectable manner.

Accordingly, at the time of reading, the logged-in user can select a processing method associated with one of the users in the processing method storage unit 13. The selection result is transmitted to the service providing system 10, and the service providing system 10 adopts the processing method in accordance with the selection result.

Fourth Embodiment

In a fourth embodiment, the information processing system 1 in which the user can select the processing method of a workflow at the time of reading, will be described.

In the present embodiment, the hardware configuration diagrams of FIGS. 3 and 4 described in the first embodiment and the functional block diagram of FIG. 5 may be incorporated, and only the main differences may be described. The sequence diagram of the print workflow of the present embodiment may be the same as that of FIG. 11 of the first embodiment, and, therefore, reference is made to FIG. 11 as necessary.

<Processing Method for Each User According to the Fourth Embodiment>

In the present embodiment, a processing method is registered for each logged-in user. Table 3 indicates an example of the processing method information of the present embodiment.

S33-2: The read workflow processing unit 15 acquires the transmission destination candidate associated with the user name, from the processing method storage unit 13. The read workflow processing unit 15 transmits screen information of the read screen 630 to the apparatus 20 via the communicating unit 16. In the present embodiment, the transmission destination candidate is displayed on the read screen 630, and, therefore, the read workflow processing unit 15 generates screen information.

S34: The communicating unit 25 of the apparatus 20 transmits the received screen information of the read screen 630 to the display processing unit 21.

Figure 29:
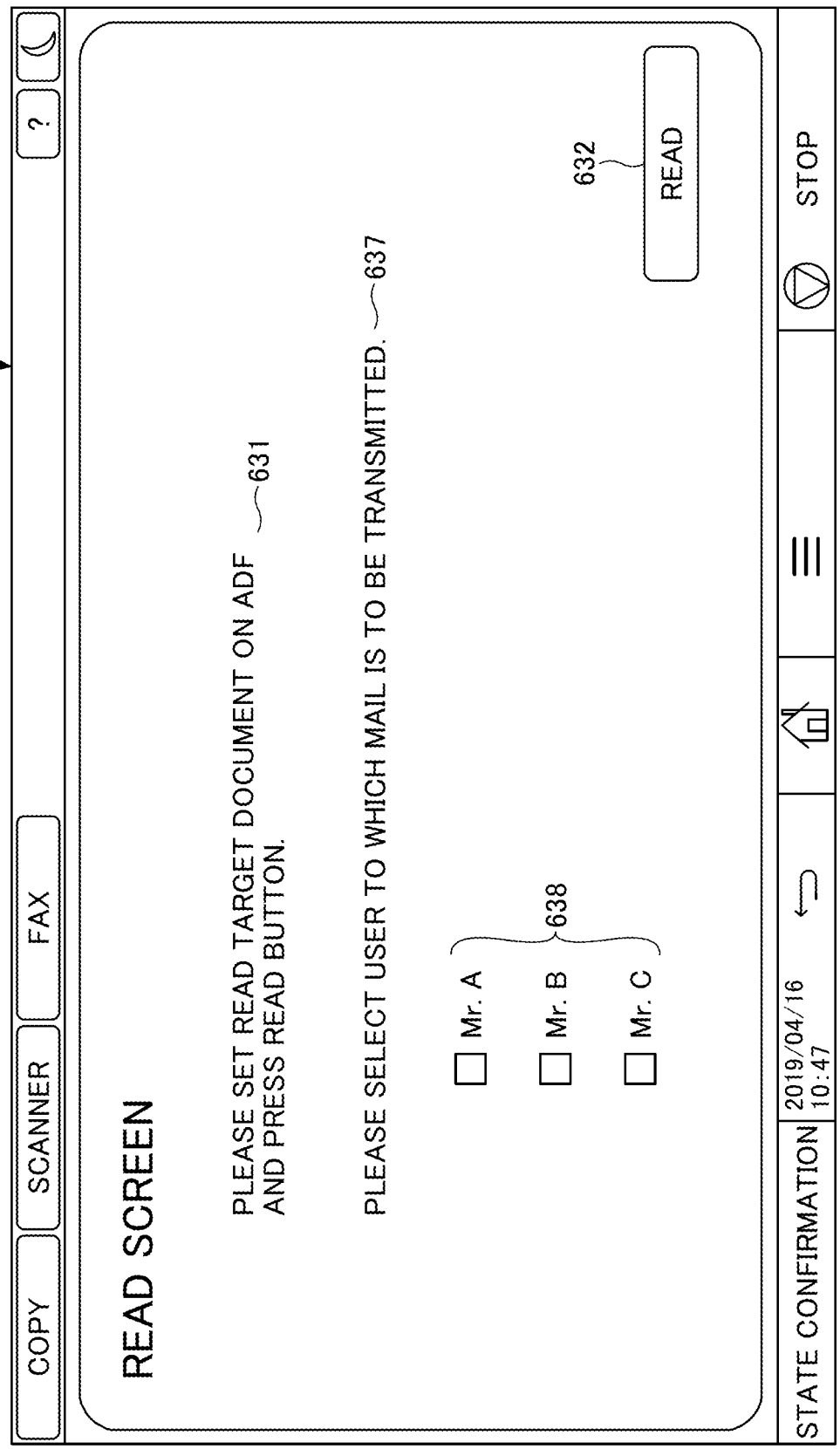
FIG. 29 is a diagram illustrating an example of a read screen according to the fourth embodiment of the present invention.

S35: The display processing unit 21 displays the read screen 630 on the operation panel 940 based on the screen information of the read screen 630. An example of the read screen 630 is illustrated in FIG. 29.

S36: The user refers to the read screen 630 and sets the document in the ADF and the like. Also, the user selects a transmission destination to which the image data is to be transmitted, from among the transmission destination candidates. Then, the user inputs an instruction to read the filled in document, to the apparatus 20. The operation accepting unit 22 accepts the read instruction. Subsequently, the user sets reading conditions in the read setting/execution screen illustrated in FIG. 18.

S37: The display processing unit 21 specifies a reading condition and the transmission destination selection result and transmits a read request to the input unit 24.

S38: The input unit 24 executes reading of the document according to the reading conditions. Accordingly, image data of the document is generated.

TABLE 3

| USER ID | USER NAME | TRANSMISSION DESTINATION CANDIDATE | | |
| --- | --- | --- | --- | --- |
| User_004 | Mr. D | Mr. A (aaa@b.cc) | Mr. B (bbb@b.cc) | Mr. C (ccc@b.cc) |
| User_005 | Mr. E | Mr. B (bbb@b.cc) | Mr. C (ccc@b.cc) | Mr. D (ddd@b.cc) |

In the processing method information indicated in Table 3, the transmission destination candidate is registered in association with the user ID and user name. The logged-in user can select a transmission destination from among the transmission destination candidates. A delivery destination folder of image data may be set as the transmission destination candidate.

<Read Workflow According to the Fourth Embodiment>

Figure 28:
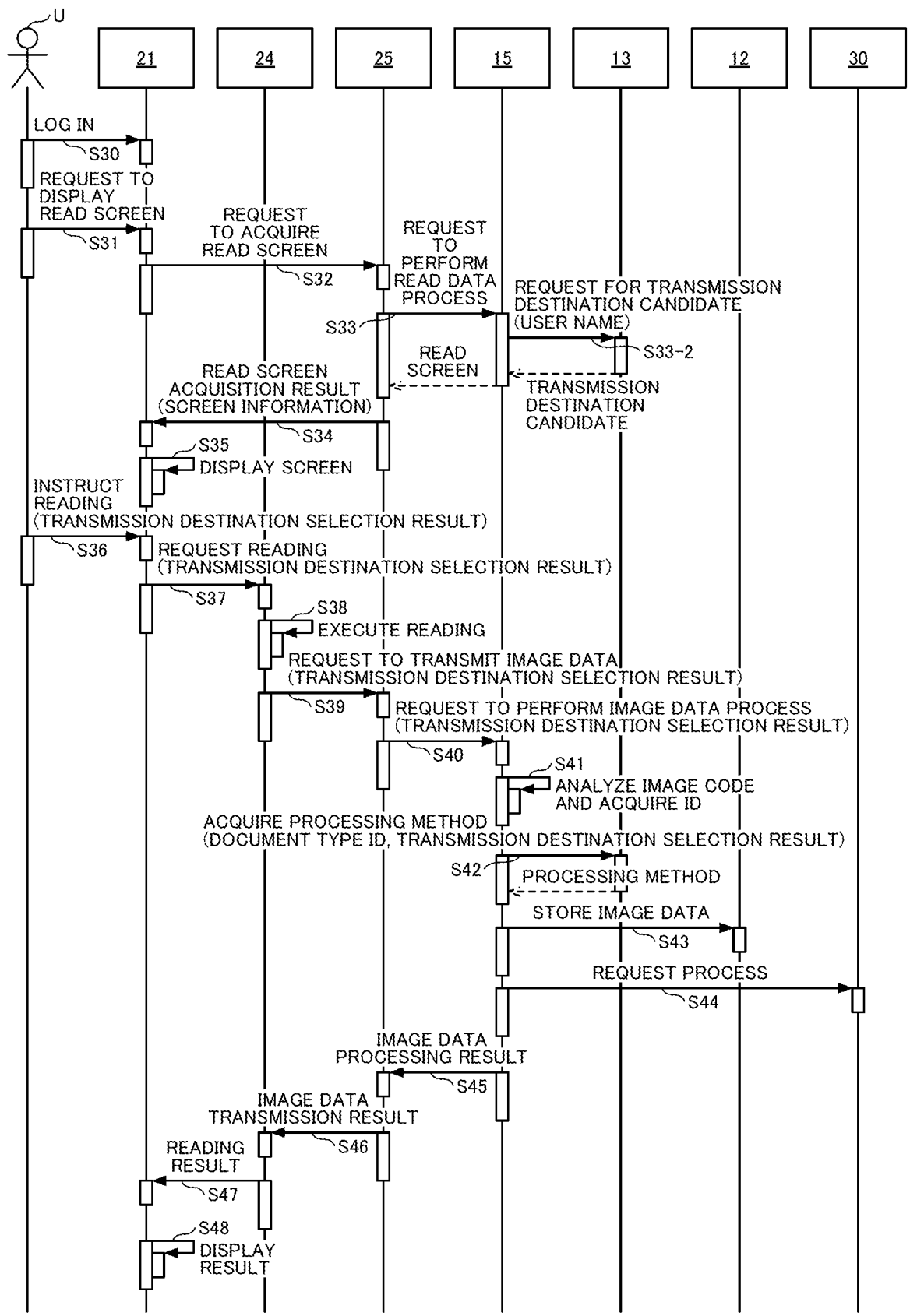
FIG. 28 is a sequence diagram illustrating a process executed by an information processing system in a read workflow according to a fourth embodiment of the present invention.

FIG. 28 is an example of a sequence diagram illustrating a process performed by the information processing system 1 in a read workflow. In the description of FIG. 28, the difference from FIG. 16 will be mainly described.

S30: A user logs into the apparatus 20 during reading. The user name is identified by the login. A user ID may be identified.

S31: The home screen 600 is displayed, and the user selects an application (the simple application service 602) that corresponds to the read workflow.

S32: The display processing unit 21 transmits a request for acquiring a read screen to the communicating unit 25 together with the user name.

S33: The communicating unit 25 transmits the request for acquiring the read screen 630 to the service providing system 10 together with the user name. The communicating unit 16 of the service providing system 10 receives the request for acquiring the read screen 630.

S39: The input unit 24 transmits a request to transmit the transmission destination selection result and the image data to the communicating unit 25.

S40: The communicating unit 25 transmits the transmission destination selection result and the image data to the service providing system 10.

S41: The communicating unit 16 of the service providing system 10 receives the transmission destination selection result and image data, and the read workflow processing unit 15 detects the image code and analyses (decodes) the image code, if any. Accordingly, the ID of the document type is restored.

S42: The read workflow processing unit 15 specifies the ID of the document type and acquires processing method information from the processing method storage unit 13. Here, the processing method is to be acquired. When "paper_id 003" is the ID of the document type read from the image code, the data storage destination is "/kyuka folder and below" and the report destination is "ccc@bb.cc". Further, if the transmission destination selection result is "Mr. A", "aaa@b.cc" is acquired as the report destination.

S43: The read workflow processing unit 15 stores image data in a folder set in the processing method storage unit 13. In FIG. 28, it is assumed that the folder is in the read data storage unit 12.

S44: Similarly, the read workflow processing unit 15 transmits image data to the external system set in the processing method storage unit 13 and requests a process corresponding to the external system. In the case of the processing method storage unit 13 indicated in Table 1, the process is to transmit a report mail to "ccc@bb.cc". Further, the process is to transmit a report mail to "aaa@b.cc" according to the transmission destination selection result. Subsequent processes may the same as those of FIG. 16.

<Example of Read Screen According to the Fourth Embodiment>

FIG. 29 illustrates an example of the read screen 630. In the read screen 630 of FIG. 29, in addition to the message 631 of the read screen 630 of FIG. 17, a message 637 stating "please select user to which mail is to be transmitted" and transmission destination candidates 638 are displayed. The destination candidate 638 is acquired from the processing method storage unit 13 according to the logged-in user. Therefore, the user can select the transmission destination of the image data at the time of reading.

<Overview of the Fourth Embodiment>

According to the present embodiment, in addition to the effect of the first embodiment, the user who has logged in at the time of reading can select the transmission destination of the image data at the time of reading, and, therefore, the workflow can be extended at the time of reading.

Fifth Embodiment

In a fifth present embodiment, the information processing system 1 capable of displaying a message according to the document type at the end of a workflow, will be described. For some documents, the storage method is determined in advance, so that the user can know how to store the documents that has been read.

In the present embodiment, the hardware configuration diagrams of FIGS. 3 and 4 described in the first embodiment and the functional block diagram of FIG. 5 may be incorporated, and only the main differences may be described. The sequence diagram of the print workflow of the present embodiment may be the same as that of FIG. 11 of the first embodiment, and, therefore, reference is made to FIG. 11 as necessary.

<Processing Method for Storing Message According to the Fifth Embodiment>

In the present embodiment, a message is registered for each document type. Table 4 indicates an example of the processing method information according to the present embodiment.

an invoice, please send by post to the head office in the case of a transportation expense application form, and please immediately delete in the case of a vacation request.

<Read Workflow According to the Fifth Embodiment>

Figure 30:
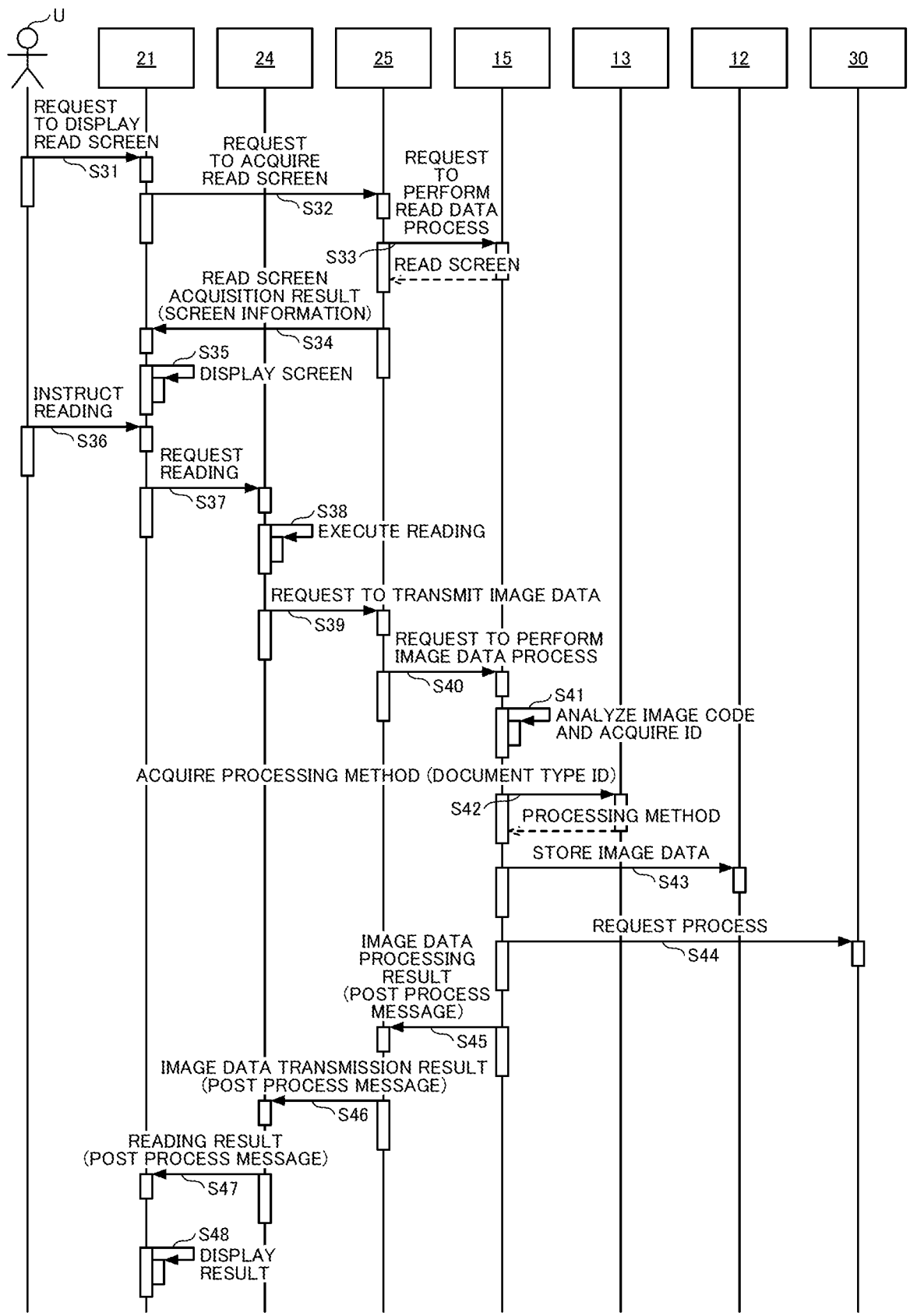
FIG. 30 is a sequence diagram illustrating a process executed by an information processing system in a read workflow according to a fifth embodiment of the present invention.

FIG. 30 is an example of a sequence diagram illustrating a process performed by the information processing system 1 in a read workflow. In the description of FIG. 30, the differences from FIG. 16 will be mainly described. First, the processes of steps S31 to S41 may be the same as those of FIG. 16.

S42: The read workflow processing unit 15 specifies the ID of the document type and acquires processing method information from the processing method storage unit 13. Here, a post-process message is included in the processing method. When "paper_id 003" is the ID of the document type read from the image code 9, a post-process message of "please immediately delete" is acquired.

S43: The read workflow processing unit 15 stores image data in a folder set in the processing method storage unit 13. In FIG. 30, it is assumed that the folder is in the read data storage unit 12.

S44: Similarly, the read workflow processing unit 15 transmits image data to the external system set in the processing method storage unit 13 and requests a process corresponding to the external system. In the case of the processing method information in Table 4, the process is to transmit a report mail to "ccc@bb.cc". Also, a request for a cooperation process may be sent to another external service.

S45: The read workflow processing unit 15 adds the post-process message to the process result and transmits the process result to the apparatus 20 via the communicating unit 16.

S46: The communicating unit 25 of the apparatus 20 receives the process result and the post-process message and transmits the process result and the post-process message to the input unit 24.

S47: The input unit 24 transmits the process result and the post-process message to the display processing unit 21.

S48: The display processing unit 21 displays the read/process result screen 650 including the process result and the post-process message on the operation panel 940. An example of the read/process result screen 650 is illustrated in FIG. 31.

Accordingly, the read workflow is executed, and the document is transmitted to a folder determined according to the document type, or processed by an external system.

TABLE 4

| ID | DOCUMENT TYPE | TRANSMISSION DESTINATION (FOLDER) | REPORT DESTINATION | POST-PROCESS MESSAGE |
|---|---|---|---|---|
| paper_id_001 | INVOICE | /seikyuu FOLDER AND BELOW | aaa@bb.cc | PLEASE STORE FOR SIX MONTHS. |
| paper_id_002 | TRANSPORTATION EXPENSE APPLICATION FORM | /koutuu FOLDER AND BELOW | NONE | PLEASE SEND BY POST TO THE HEAD OFFICE. |
| paper_id_003 | VACATION REQUEST | /kyuuka FOLDER AND BELOW | ccc@bb.cc | PLEASE IMMEDIATELY DELETE. |

The processing method information indicated in Table 4, includes post-process messages in addition to the processing methods indicated in Table 1. The post-process message is a message displayed on the read/process result screen 650, and various messages can be displayed depending on the document type. For example, the apparatus 20 may display messages such as please store for six months in the case of <Read/Process Result Screen According to the Fifth Embodiment>

Figure 31A:
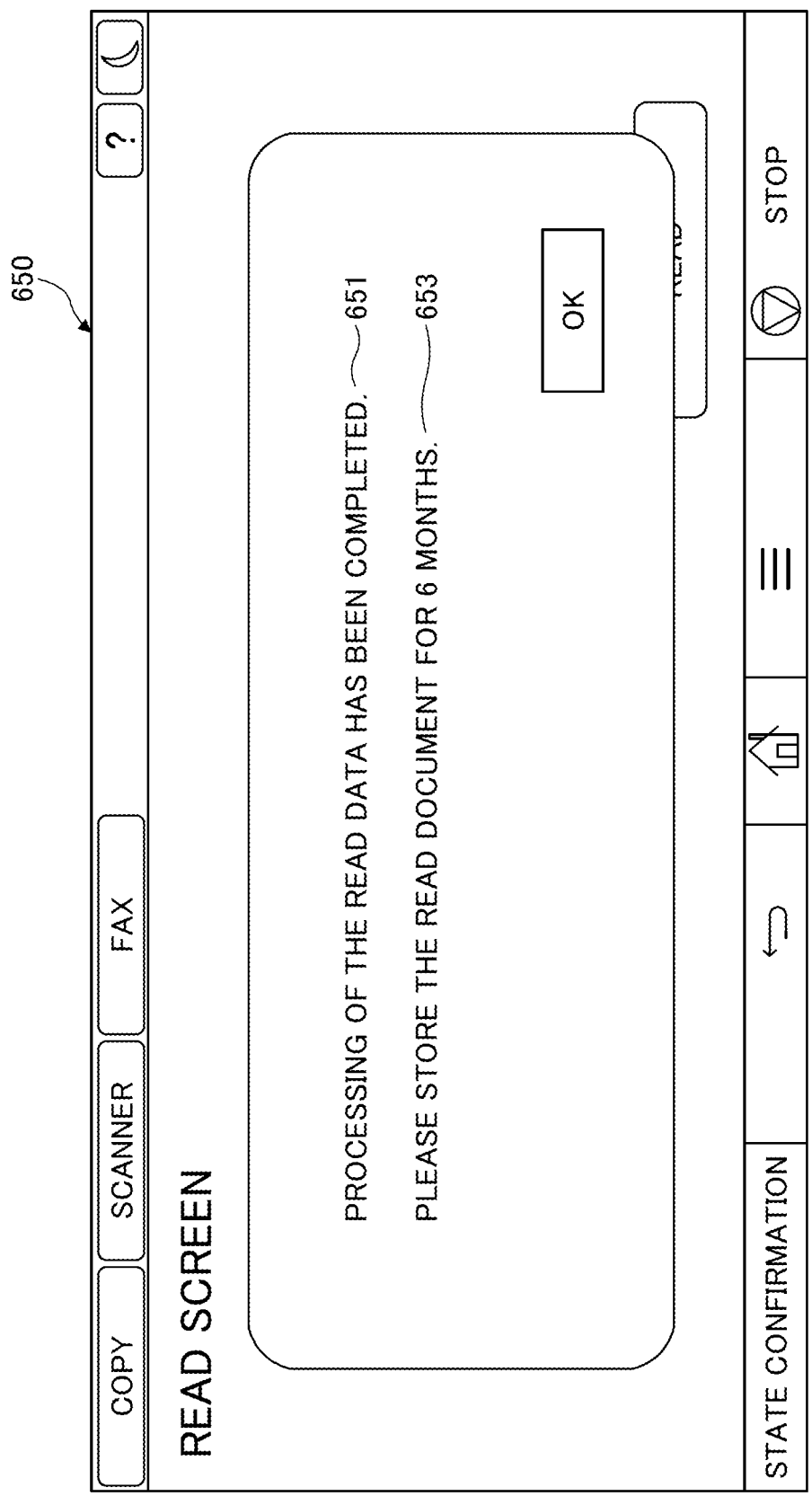
FIGS. 31A to 31C are diagrams illustrating an example of a read/process result screen according to the fifth embodiment of the present invention.
Figure 31B:
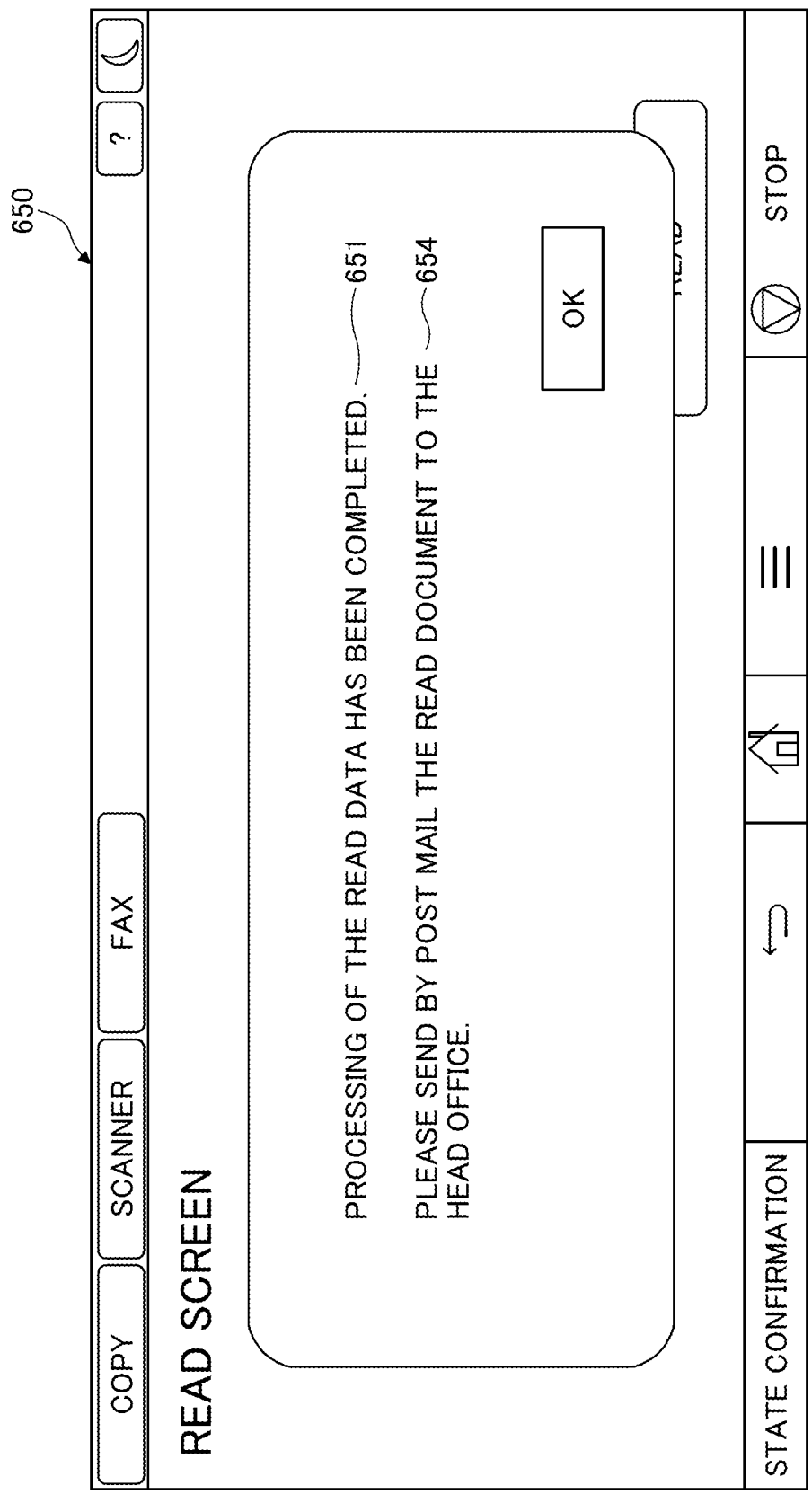
Figure 31C:
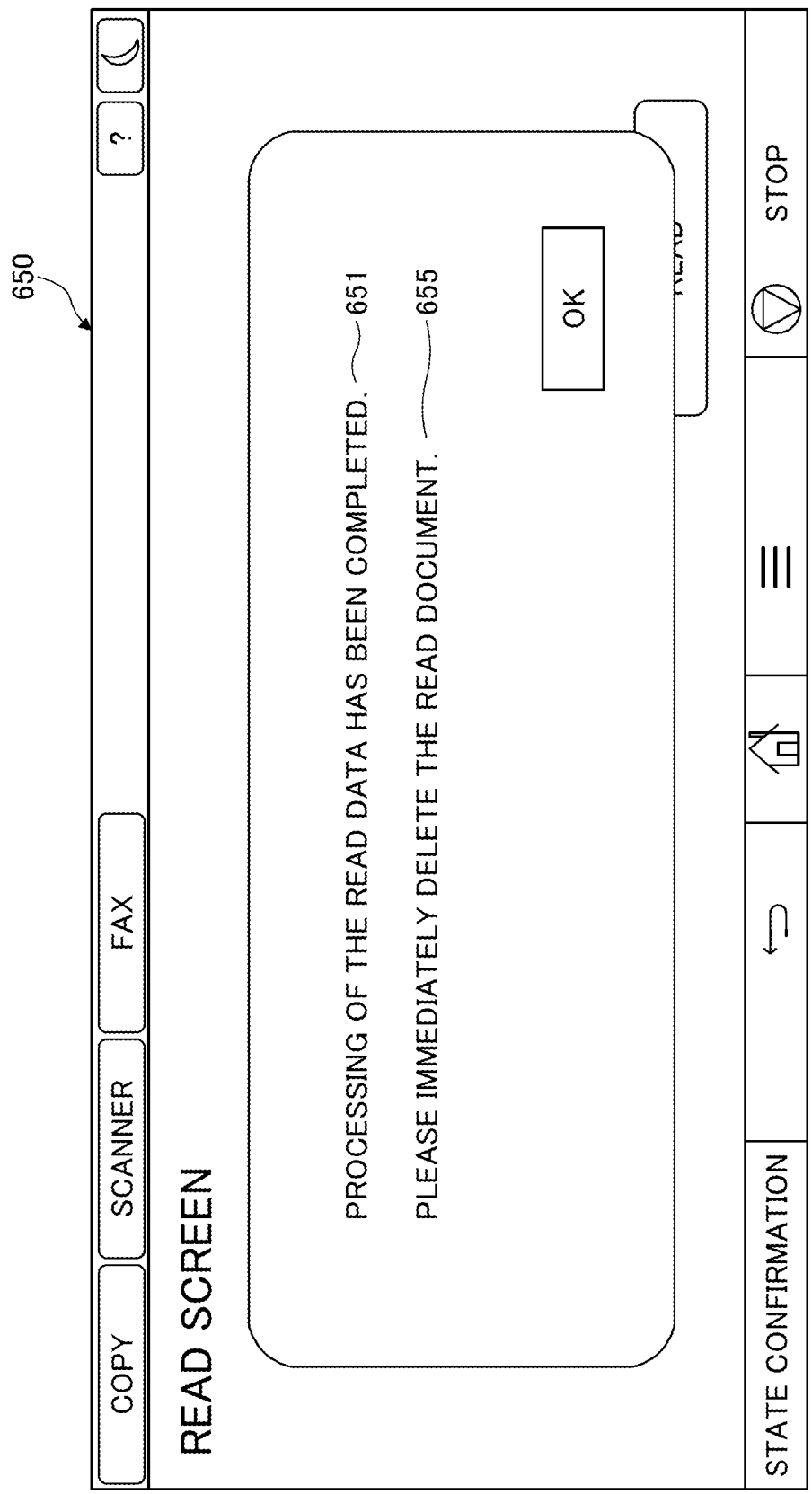

FIGS. 31A to 31C illustrate examples of the read/process result screen 650. The read/process result screen 650 of FIGS. 31A to 31C displays a post-process message in addition to the message 651 of the read/process result screen 650 of FIG. 19. FIG. 31A illustrates a post-process message 653 when the document type is an invoice, FIG. 31B illustrates a post-process message 654 when the document type is a transportation expense application form, and FIG. 31C illustrates a post-process message 655 when the document type is a vacation request. In this way, a message can be displayed for each document type.

<Overview of the Fifth Embodiment>

According to the present embodiment, in addition to the effect of the first embodiment, a message can be displayed for each document type regarding how the document is to be stored upon completion of the workflow. Although a method of storing the document is displayed as a message in the present embodiment, the content of the message may be any content. For example, a message may include precautions with respect to the contents to be written in, and an indication to read an accompanying document (e.g., identification) to be submitted.

Sixth Embodiment

Figure 32:
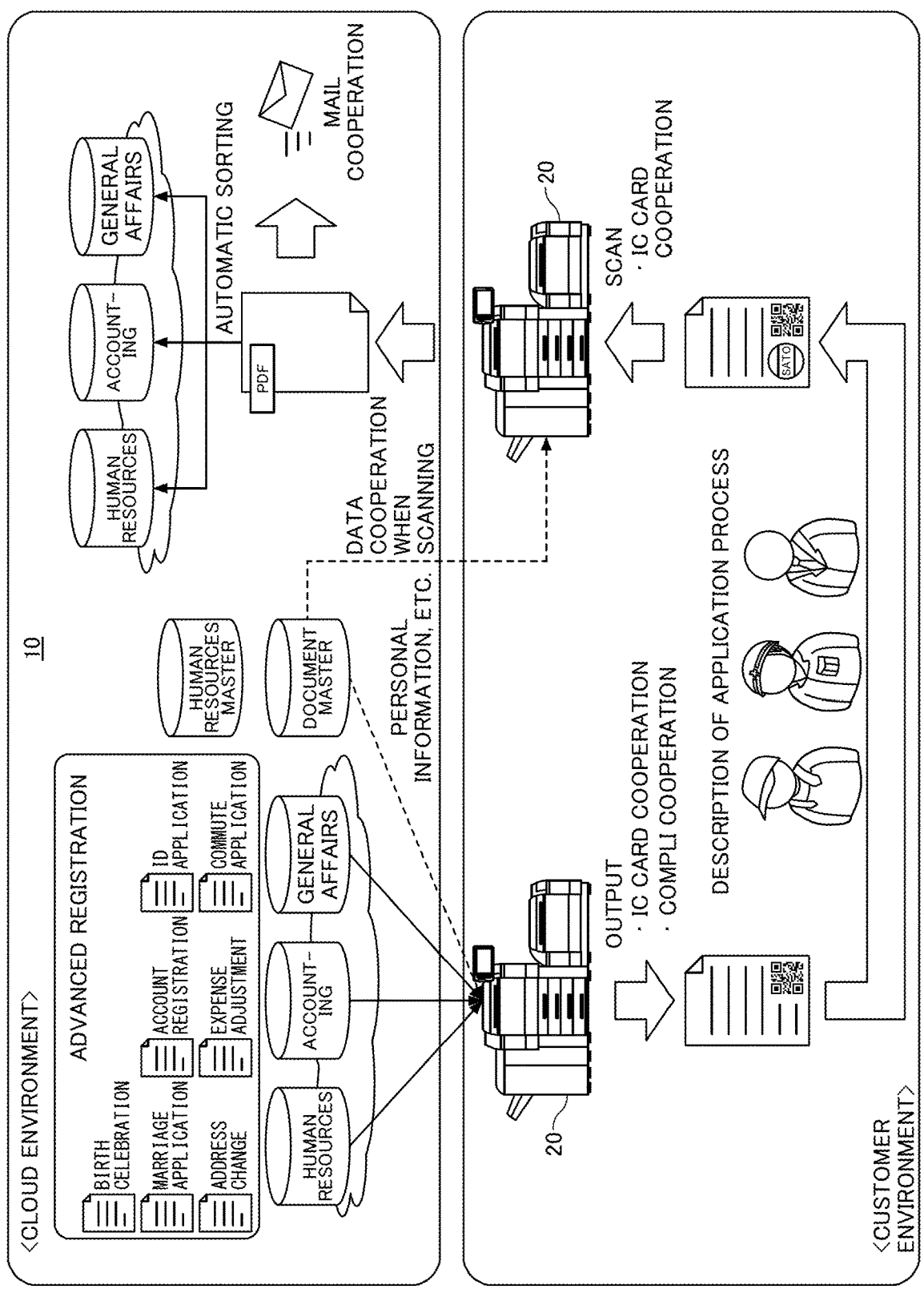
FIG. 32 is an example of another configuration diagram of an information processing system according to a sixth embodiment of the present invention.

FIG. 32 illustrates an example of another configuration diagram of the information processing system 1 according to a sixth embodiment.

<Preparation according to the sixth embodiment>
1. Registration of the application draft document (PDF)
2. Cooperation with personnel information
3. Registration of document master
   Submission destination information
   Storage destination information <Process Flow According to the Sixth Embodiment>
1. Output
   Perform authentication, etc.
   Selection of document and output instruction
   Image code is appended to the application form internally
   Employee number
   Submission destination information
   Document information
   Execute printing
2. Process (entry, seal impression)
3. Scan
   Perform authentication, etc.
   One-touch scan
   Process according to image code
   Acquisition of accompanying information from employee number
   Acquisition of accompanying information from document information
   Document Tagging
   Delivery (e-mail, cloud storage)

<Process Flow and Data Used According to the Sixth Embodiment>

Figure 33:
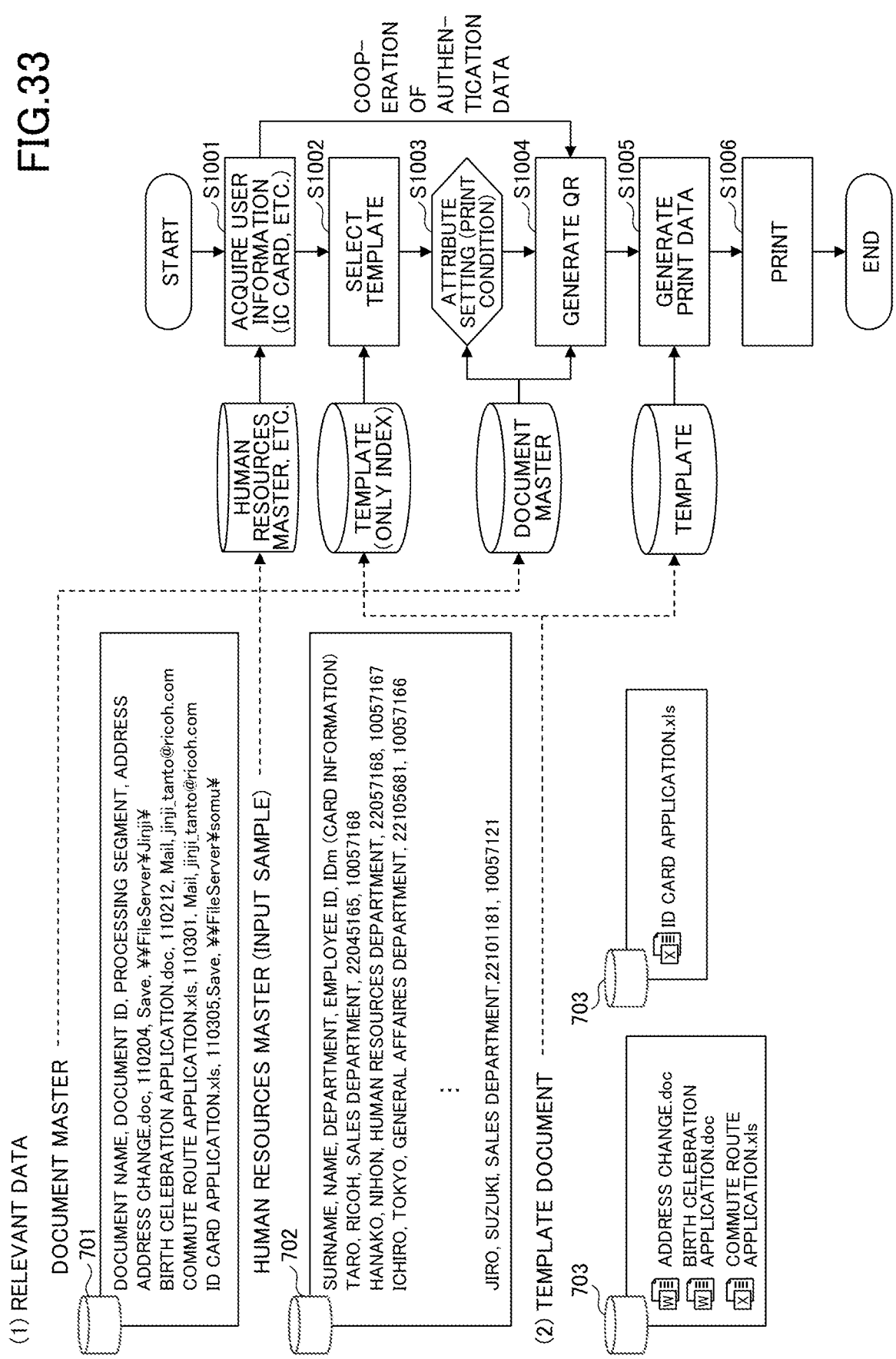
FIG. 33 is a flowchart illustrating an example of an overall process flow of an information processing system according to the sixth embodiment of the present invention.

FIG. 33 is an example of a flowchart illustrating an overall process flow of the information processing system 1 according to the sixth embodiment. First, a document master 701 corresponds to the processing method information of the first to fifth embodiments. As illustrated in the figure, a document name, a document ID, a processing segment, and an address are registered in the document master 701, and the document ID corresponds to the ID of the document type, and the processing segment and the address correspond to the processing method. A human resources master 702 is user information and is used primarily for authentication. A template document 703 corresponds to the print data of the first to fifth embodiments.

S1001: The apparatus 20 authenticates the user.
S1002: The apparatus 20 accepts the selection of a template (document).
S1003: The apparatus 20 accepts a print setting.
S1004: The information processing system 1 generates an image code of the document ID.
S1005: The apparatus 20 generates PDL data.
S1006: The apparatus 20 executes printing.

Seventh Embodiment

In a seventh embodiment, a method of creating each workflow will be described.

<System Configuration According to the Seventh Embodiment>

Figure 34:
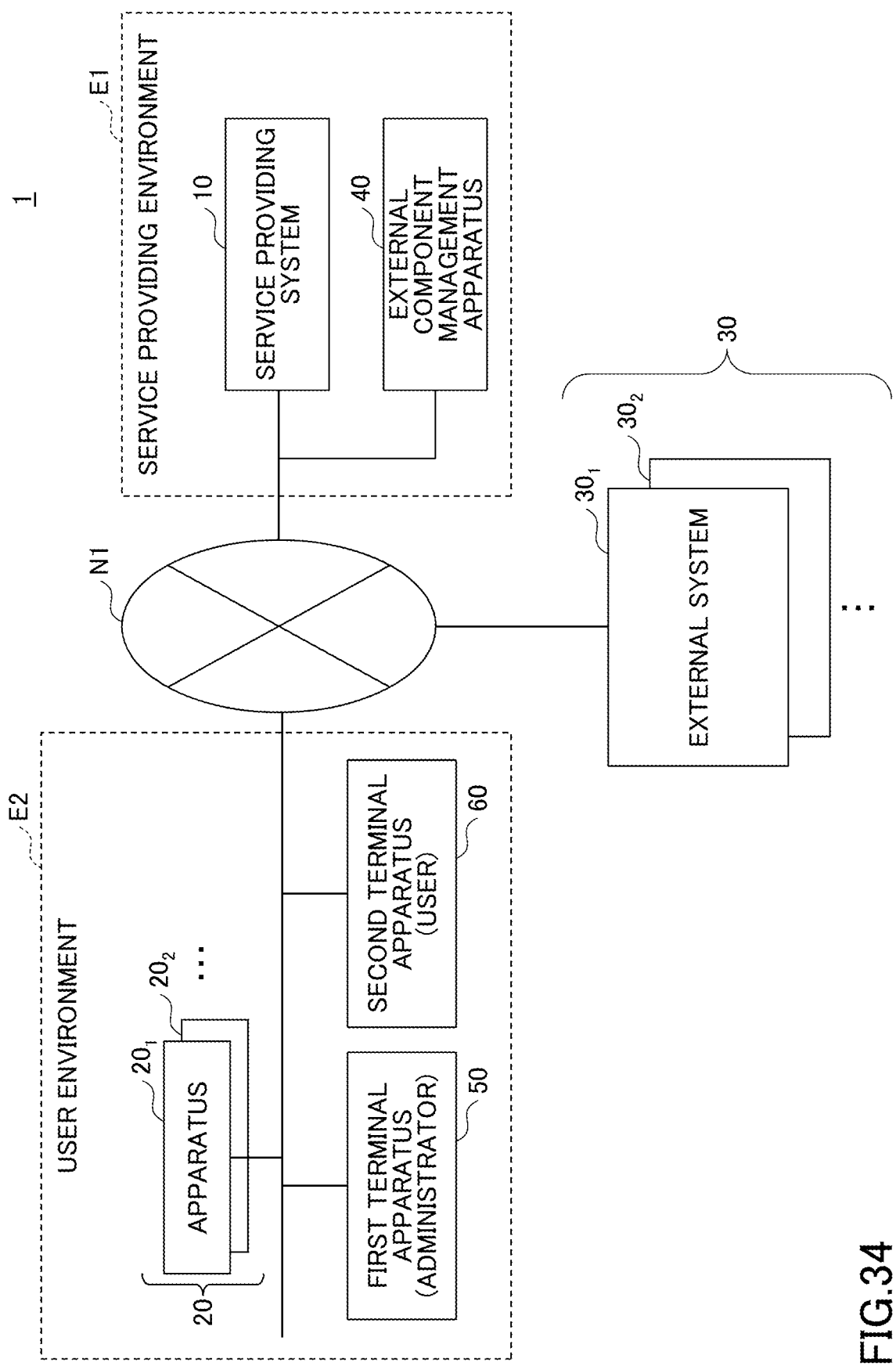
FIG. 34 is a configuration diagram of an example of an information processing system according to a seventh embodiment of the present invention.

FIG. 34 is a configuration diagram illustrating an example of the information processing system 1 according to the seventh embodiment. In the description of FIG. 34, the elements having the same reference numerals as those of FIG. 2 perform the same function, so only the main elements of the present embodiment may be described. The service providing environment E1 of the information processing system 1 illustrated in FIG. 34 includes an external component management apparatus 40.

The external component management apparatus 40 is implemented in one or more information processing apparatuses and manages the external components. As described above, in the information processing system 1 according to the present embodiment, an external component is managed in the external component management apparatus 40 that is different from the apparatus of the service providing system 10. Thus, for example, the impact of an external component having a significant bug can be localized to the external component management apparatus 40.

FIG. 34 illustrates an example in which one external component management apparatus 40 is included in the service providing environment E1, but the number of the external component management apparatuses 40 is not limited thereto. The servicing environment E1 may include a plurality of the external component management apparatuses 40. For example, the service providing environment E1 may include the external component management apparatus 40 for managing external components developed by Company A, the external component management apparatus 40 for managing external components developed by Company B, and the like.

<Software Configuration According to the Seventh Embodiment>

Figure 35:
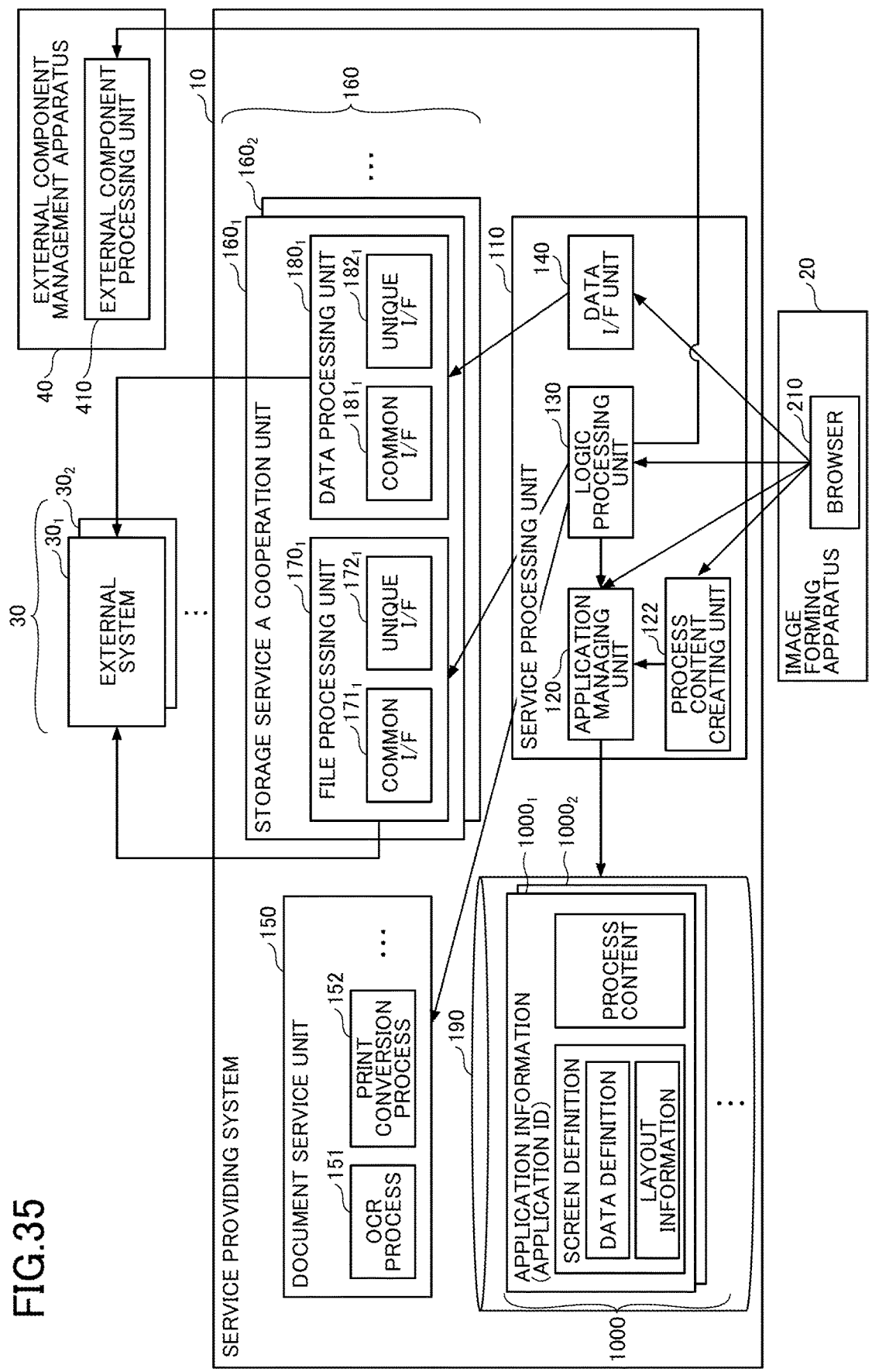
FIG. 35 is a process block diagram of an example of an information processing system according to the seventh embodiment of the present invention.

The information processing system 1 according to the seventh embodiment can be implemented by processing blocks, for example, as illustrated in FIG. 35. FIG. 35 is a processing block diagram illustrating an example of the information processing system 1 according to the seventh embodiment.

The apparatus 20 (for example, an image forming apparatus 20) includes a browser 210 implemented, for example, by the CPU 211. The user of the apparatus 20 may use the services provided by the service providing system 10 via the browser 210. As described above, the apparatus 20 according to the present embodiment will suffice as long as the browser 210 is installed, and it is not necessary to develop an exclusive-use application for using the service.

The service providing system 10 includes a service processing unit 110, a document service unit 150, and a storage service cooperation unit 160. These units are implemented, for example, by the CPU 501 and the like.

Further, the service providing system 10 includes an application information storage unit 190. The application information storage unit 190 is implemented by the HD 504 and the like. The application information storage unit 190 may be implemented by a storage device and the like connected to the service providing system 10 via a network.

The service processing unit 110 includes an application managing unit 120, a logic processing unit 130, a data I/F unit 140, and a process content creating unit 122.

The application managing unit 120 manages application information 1000 stored in the application information storage unit 190. The application managing unit 120 returns an application screen based on the screen definition included in the application information 1000 in response to a request from the browser 210. Accordingly, the browser 210 of the apparatus 20 displays an application screen for using the service provided by the service providing system 10. Here, the application information 1000 is information describing the screen definition for displaying the above-described application screen on the apparatus 20 and the process content of the service implemented by the application information 1000, which will be described in detail later.

The application managing unit 120 returns the process content included in the application information 1000 in response to a request from the logic processing unit 130. The details of the process are described below, but in the process content, a series of processes are described for implementing a scan delivery service, a cloud print service, etc. A series of processes is also referred to as a "process flow" or a "flow". The print workflow (the print workflow processing unit 14) and the read workflow (the read workflow processing unit 15) described in the first to sixth embodiments are examples of the application information 1000.

The logic processing unit 130 acquires the process content from the application managing unit 120 in response to a request from the browser 210. The logic processing unit 130 requests a file processing unit 170 of the document service unit 150 and/or the storage service cooperation unit 160 to execute a process according to the acquired process content. Thus, various services of the service providing system 10 are provided to the apparatus 20. The detailed processing blocks of the logic processing unit 130 will be described in <process details> which will be described later.

The data I/F unit 140 requests a data processing unit 180 of the storage service cooperation unit 160 to acquire, for example, a folder list in response to a request from the browser 210.

The process content creating unit 122 creates a screen (a process content creation screen) for creating the process content in response to a request from the browser 210.

The application managing unit 120 stores the process content created in the process content creation screen in the application information storage unit 190 in response to a request from the process content creating unit 122. Accordingly, a service implemented by a series of processes indicated by the process content created by the user is added.

The logic processing unit 130 requests an external component processing unit 410 to execute a process, when there is a process to be executed by an external component in a series of processes indicated by the process content acquired from the application managing unit 120. Detailed processing blocks of the logic processing unit 130 will be described later.

The document service unit 150 is a group of programs (modules) for implementing the services provided by the service providing system 10. The document service unit 150 includes, for example, an OCR process 151 for executing an OCR process on an electronic file and a print conversion process 152 for converting an electronic file to a data format (print data) printable by the apparatus 20. The document service unit 150 may also include other programs for executing various processes, such as programs for compressing or decompressing electronic files, programs for converting the data format of electronic files (for example, converting to the PDF format).

The storage service cooperation unit 160 requests the external system 30 to execute various processes in response to a request from the logic processing unit 130 and the data I/F unit 140. Here, the service providing system 10 includes the storage service cooperation unit 160 for each external system 30. That is, the service providing system 10 includes the storage service A cooperation unit 160$_1$ for requesting a process to the external system 30$_1$, the storage service B cooperation unit 160$_2$ for requesting a process to the external system 30$_2$, and the like. As described above, the service providing system 10 includes the corresponding storage service cooperation unit 160 for each external system 30 that performs processing in a cooperative manner. Hereinafter, when distinguishing each of the plurality of storage service cooperation units 160, a description is made by using a subscript such as the "storage service A cooperation unit 160$_1$," or "the storage service B cooperation unit 160$_2$," as described above.

As described above, the storage service cooperation unit 160 includes the file processing unit 170 that accepts a request from the logic processing unit 130 and the data processing unit 180 that accepts a request from the data I/F unit 140.

The file processing unit 170 includes a common I/F 171 and a unique I/F 172 in which an Application Programming Interface (API) is defined for performing operations (e.g., acquisition, storage, editing, etc.) on an electronic file stored in the external system 30. The common I/F 171 is an API that can be commonly used among a plurality of the external systems 30, for example, an API as illustrated in FIG. 36A. That is, the common I/F 171 of the file processing unit 170 is an API group for using functions relating to file operations (e.g., acquisition and storage of files) that can be used by all the external systems 30. On the other hand, the unique I/F 172 is an API that can be used by a particular external system 30, such as the API illustrated in FIG. 36B. That is, the unique I/F 172 of the file processing unit 170 is an API group for using functions relating to file operations (for example, editing a file) that can be used by a particular specific external system 30. Accordingly, the common I/F 171 is similarly defined for all of the storage service cooperation units 160, while the unique I/F 172 is defined for a particular storage service cooperation unit 160 that can use the API defined in the unique I/F 172.

On the other hand, the data processing unit 180 includes a common I/F 181 and a unique I/F 182 in which APIs are defined for acquiring metadata (for example, a list of files, a list of folders, etc.) such as bibliographic information of electronic files stored in the external system 30. The common I/F 181 is an API that can be commonly used among a plurality of the external systems 30, for example, an API as illustrated in FIG. 36D. That is, the common I/F 181 of the data processing unit 180 is an API group for using functions such as metadata acquisition that can be used by all the external systems 30. On the other hand, the unique I/F 182 is an API that can be used by a particular external system 30, such as the API illustrated in FIG. 36D. That is, the unique I/F 182 of the data processing unit 180 is an API group for using functions such as metadata acquisition (e.g., acquisition of an image file list) that can be used by a particular external system 30. Accordingly, the common I/F 181 is similarly defined for all storage service cooperation units 160, while the unique I/F 182 is defined for a particular storage service cooperation unit 160 that can use the API defined in the unique I/F 182.

As described above, the service providing system 10 according to the present embodiment includes the storage service cooperation unit 160 for each external system 30 that performs processes in a cooperative manner. For this reason, when the external system 30 that is the cooperative target is added, etc., the corresponding storage service cooperation unit 160 is to be added to the service providing system 10. Therefore, the impact associated with the addition, etc., of the external system 30 that is the cooperative target, can be localized. That is, the external system 30 to be the cooperative target can be added, etc., without affecting other processing blocks (e.g., the service processing unit 110 or the document service unit 150, etc.) (i.e., without requiring modification of other processing blocks). Accordingly, the man-hours required for development of the addition, etc., of the external system 30 that is a cooperative target, can be reduced. The addition, etc., of the storage service cooperation unit 160 may be performed using a Software Development Kit (SDK).

Further, the storage service cooperation unit 160 defines the common I/F 171 and the unique I/F 172 by different modules and the like. Further, the API defined in the common I/F 171 and the unique I/F 172 can be used by specifying a "storage service name" (i.e., the "storage service name" is a variable part). Accordingly, when the external system 30 that is a cooperative target is added, the common I/F 171 defined in another storage service cooperation unit 160 can be reused. That is, when adding the external system 30 as a cooperative target, only the unique I/F 172 of the external system 30 to be added needs to be developed. Accordingly, the man-hours required for development of the addition, etc., of the external system 30 as a cooperative target can be further reduced. This is also the same for the common I/F 181 and the unique I/F 182.

The application information storage unit 190 stores the application information 1000. The application information 1000 is information in which a screen definition for displaying the application screen on the apparatus 20 and a process content indicating a series of processes for implementing a service, are described, and is stored in the application information storage unit 190 for each application ID for uniquely identifying the application information 1000. In the present embodiment, the application information for implementing a scan delivery service in cooperation with a cloud service A is defined as the "application information $1000_1$", and the application information $1000_1$ has an application ID "app001". In the present embodiment, the application information for implementing the cloud print service linked to the cloud service A is the "application information $1000_2$", and the application information $1000_2$ has an application ID "app002".

Here, the data definition included in the screen definition of the application information $1000_1$ and the data definition included in the screen definition of the application information $1000_2$ are illustrated in FIGS. 37A and 37B, respectively. The data definition includes information for configuring the input field (input box) and the selection field (selection box) of the application screen displayed on the operation panel 940 and the like by the browser 210 of the apparatus 20. For example, in a data definition portion 1101 illustrated in FIG. 37A, information for configuring an input field for inputting a file name of an electronic file generated by a scan is described. Further, in a data definition portion 1102, information for configuring a selection field for selecting a storage destination folder in the storage service A is described. Note that in "data source" of the data definition portion 1102, the Uniform Resource Locator (URL) from which each selection element in the selection field (folder name and folder ID of the storage destination candidate) is to be acquired, is described.

Next, FIGS. 38A and 38B illustrate the layout information included in the screen definition of the application information $1000_1$ and the layout information included in the screen definition of the application information $1000_2$, respectively. The layout information includes information such as characters (such as the display name of the input field), the display position of the input field or the selection field and the like, displayed on the application screen that is displayed on the operation panel 940 and the like by the browser 210 of the apparatus 20. For example, in a layout definition portion 1301 illustrated in FIG. 38A, the information of the display position and the display name of "data_id":1 (i.e., the data definition portion 1101) in the data definition is described. Accordingly, an input field whose display name is "File name" is displayed at the first position on the application screen; a specific example is described later. Further, in a layout definition portion 1302, information of the display position and the display name of "data_id":2 (that is, the data definition portion 1102) in the data definition is described. Accordingly, a selection field whose display name is "select storage destination folder" is displayed at the second position on the application screen; a specific example is illustrated later.

Next, the process content of the application information $1000_1$ and the process content of the application information $1000_2$ are illustrated in FIGS. 39A and 39B, respectively. In the process content, in order to implement the service provided by the service providing system 10, a series of processes to be requested to the document service unit 150 and the storage service cooperation unit 160 is described. For example, in the process content illustrated in FIG. 39A, a series of processes (that is, a series of processes in which a scanned electronic file is subjected to an OCR process and then the scanned electronic file is delivered to a specified folder of the storage service A) for implementing a scan delivery service according to the present embodiment, is described. In the process content illustrated in FIG. 39B, a series of processes for implementing the cloud print service according to the present embodiment (i.e., a series of processing in which an electronic file acquired from the storage service A is converted into print data and then transmitted to the apparatus 20) is described. Details of these process contents are described later.

Referring back to FIG. 35, the external component management apparatus 40 includes the external component processing unit 410. The external component processing unit 410 is implemented, for example, by a CPU provided in the external component management apparatus 40.

The external component processing unit 410 executes an external component in response to a request from the logic processing unit 130. The detailed processing blocks of the external component processing unit 410 will be described later.

As described above, the service providing system 10 according to the present embodiment provides the service by using the application information 1000 in which a screen definition for displaying the application screen on the apparatus 20 and a series of process content for implementing the service, are described. Therefore, when the service provided by the service providing system 10 is added, etc., the application information 1000 is to be added to the application information storage unit 190. Further, the application information 1000 can be added only by describing the screen definition and the process content as described above, and, therefore, the addition of the application information can be easily developed. Accordingly, it is possible to reduce the man-hours associated with the addition or change of services, and it is also possible to easily add or change services, for example, by third-party vendors.

FIG. 40 is an example of a processing block diagram of the logic processing unit 130. The logic processing unit 130 includes a flow executing unit 131, a component managing unit 132, a component group 133, a type conversion managing unit 134, a type conversion group 135, and a component management table 5000. Further, the logic processing unit 130 uses a type conversion table 3000.

When a request for executing a process of the scan delivery service is accepted from the browser 210, the flow executing unit 131 acquires the process content from the application information 1000 via the application managing unit 120. The flow executing unit 131 requests the component to execute a process according to the acquired process content. The component is a program (module) for executing various processes, and is defined by a class or a function.

The component managing unit 132 generates a component in response to a request from the flow executing unit 131. Generating a component means loading, for example, a component defined by a class into a memory (e.g., the RAM 503).

The component group 133 is an assembly of components. The component group 133 includes a delivery component 1331 for delivering electronic files to the external system 30 and an acquisition component 1332 for acquiring electronic files from the external system 30. The component group 133 also includes an OCR component 1333 for performing OCR processing on an electronic file, a print conversion component 1334 for converting an electronic file into print data, and an external component cooperation component 1335 for cooperating with an external component. Further, the components of the print workflow (the print workflow processing unit 14) according to the first to the sixth embodiments include a component for acquiring a list of file names of documents from the print data storage unit 11, a component for generating screen information including a list of file names of documents, a component for acquiring the information of the processing method (the ID of the document type and a table in which the ID of the user is associated with the processing method) stored in the processing method storage unit 13, a component for acquiring the print data (the image file of the application form) corresponding to the specified document type, a component for converting the acquired ID of the document type and/or the ID of the user into an image code, and a component for appending the image code to the print data (image file of an application form) to generate the print data to be transmitted to the apparatus 20. Further, components of the read workflow (the read workflow processing unit 15) include a component for analyzing the image code at a predetermined position of the image data of the application form received from the apparatus 20 that has read the application form, a component for acquiring the information of the processing method according to the ID of the document type and/or the user's ID included in the image code from the processing method storage unit 13, and a component for performing a predetermined process (a process for transmitting to a predetermined storage destination, a transmission destination, etc.) according to the acquired processing method. Each application formed of a combination of these components is stored and managed by the service providing system 10 as a web application of various workflows.

Further, each of these components includes a component common I/F 1330. The component common I/F 1330 is a commonly defined API for each component and includes an API for creating a component and an API for requesting a component to execute a process. In this way, each component includes the component common I/F 1330, and, therefore, the impact associated with the addition, etc., of components can be localized. That is, the addition, etc., of components can be performed without affecting the flow executing unit 131 or the component managing unit 132. Accordingly, the man-hours required for the development of the addition, etc., of components can be reduced.

The type conversion managing unit 134 manages the type conversion of the data type. Here, for each component, there is a predetermined data type that the component can handle. Accordingly, the type conversion managing unit 134 generates the type conversion defined in the type conversion group 135 by referring to the type conversion table 3000 illustrated in FIG. 41 in response to a request from a component. The type conversion managing unit 134 requests the execution of the type conversion process for the generated type conversion. Here, type conversion is a program (module) for a type conversion process on the data type, and is defined, for example, by a class or a function.

The generation of the type conversion means that, for example, the type conversion defined by a class is loaded into the memory (e.g., the RAM 503). The data type includes, for example, an "InputStream" data type representing stream data, a "LocalFilePath" representing the path (address) of an electronic file stored in a storage device, and a "File" representing the entity of an electronic file.

The type conversion group 135 is an assembly of type conversions. The type conversion group 135 includes a first type conversion 1351, which converts the data type "InputStream" to "Local FilePath", and a second type conversion 1352, which converts "Local FilePath" to "File", and the like.

Further, each of these type conversions includes a type conversion common I/F 1350. The type conversion common I/F 1350 is a commonly defined API for the respective type conversions and includes an API for generating a type conversion and an API for requesting execution of a process to a type conversion. As described above, by making each of the type conversions include the type conversion common I/F 1350, the impact associated with the addition, etc., of a type conversion can be localized. That is, the addition, etc., of components can be performed without affecting the type conversion managing unit 134. Thus, it is possible to reduce the man-hours required for the development of the addition, etc., of a type conversion.

The flow executing unit 131 requests the component managing unit 132 to acquire a component according to the process content acquired from the application managing unit 120. At this time, the flow executing unit 131 specifies a component name to be described later based on the process content and requests the component to be acquired.

In response to the request from the flow executing unit 131, the component managing unit 132 refers to the component management table 5000 and determines whether a component relating to the request is an internal component or an external component. The component managing unit 132A generates the external component cooperation component 1335 when the component relating to the request is an external component.

The external component cooperation component 1335 included in the component group 133 is a component for performing cooperative processing with the external component processing unit 410 of the external component management apparatus 40. The external component cooperation component 1335 requests the external component processing unit 410 to execute a process of an external component. The external component cooperation component 1335 includes the component common I/F 1330.

Here, the component management table 5000 includes data items as illustrated in FIG. 42. FIG. 42 is a diagram for explaining an example of a component management table.

The component management table 5000 illustrated in FIG. 42 includes, as data items, a component ID, a component name, and a host name. A component ID is identification information that uniquely identifies a component. The component name is the name of a component. In the present embodiment, a component name is uniquely applied to a component.

The host name is the information identifying the apparatus that manages the component. Thus, for example, an internal component may be associated with the host name "localhost" and may be managed by the service providing system 10. On the other hand, for example, the external component may be associated with the host name "server 2.com" and may be managed by the external component management apparatus 40 of the host name.

Thus, in the component management table 5000, to each component, the host name of the apparatus in which the component is managed, is associated. Note that the process content creating unit 122 acquires a list of components from the component management table 5000 to create a process content creation screen.

Figure 43:
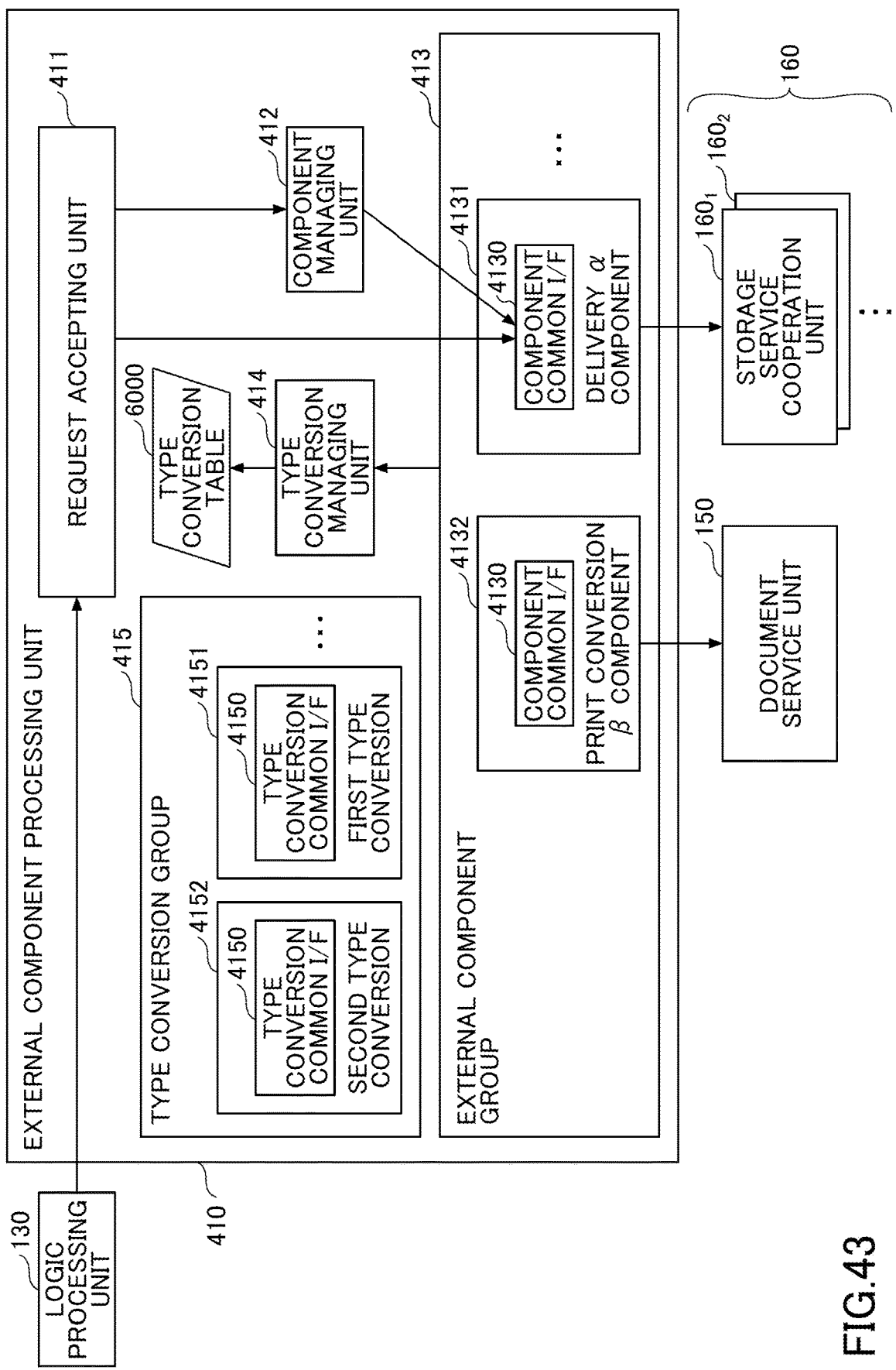
FIG. 43 is a process block diagram illustrating an example of an external component processing unit according to the seventh embodiment of the present invention.

Next, detailed processing blocks of the external component processing unit 410 will be described. FIG. 43 is an example of a processing block diagram of the external component processing unit 410 according to the seventh embodiment.

The external component processing unit 410 includes a request accepting unit 411, a component managing unit 412, an external component group 413, a type conversion managing unit 414, and a type conversion group 415. Further, the external component processing unit 410 uses a type conversion table 6000.

When a request is accepted from the logic processing unit 130, the request accepting unit 411 requests the component managing unit 412 to generate an external component. When an external component is generated, the request accepting unit 411 requests the external component to execute the processing.

The component managing unit 412 generates an external component in response to a request from the request accepting unit 411.

The external component group 413 is an assembly of external components. The external component group 413 includes a variety of external components developed by third vendors and the like. For example, the external component group 413 includes a delivery α component 4131 for delivering electronic files to the external system 30 and a print conversion β component 4132 for converting electronic files to print data.

Each of these external components also includes a component common I/F 4130. The component common I/F 4130 is an API a commonly defined for each external component and includes an API for generating external components and an API for requesting external components to execute a process.

The type conversion managing unit 414 manages the data type conversion. Here, for each external component, there is a predetermined data type that the external component can handle. Accordingly, the type conversion managing unit 414 generates the type conversion defined in the type conversion group 415 by referring to the type conversion table 3000 illustrated in FIG. 41 in response to a request from an external component. The type conversion managing unit 414 requests the execution of a type conversion process to the generated type conversion.

The type conversion group 415 is an assembly of type conversions. The type conversion group 415 includes a first type conversion 4151 for converting the data type "InputStream" to a "Local FilePath" and a second type conversion 4142 for converting the "Local FilePath" to a "File" and the like.

Each of these type conversions includes a type conversion common I/F 4150. The type conversion common I/F 4150 is an API commonly defined for the respective type conversions and includes an API for generating a type conversion and an API for requesting execution of a process to a type conversion.

<Process Details According to the Seventh Embodiment>

Next, the process of the information processing system 1 according to the present embodiment will be described in detail.

<<Overall Process of Scan Delivery Service According to the Seventh Embodiment>>

Figure 44:
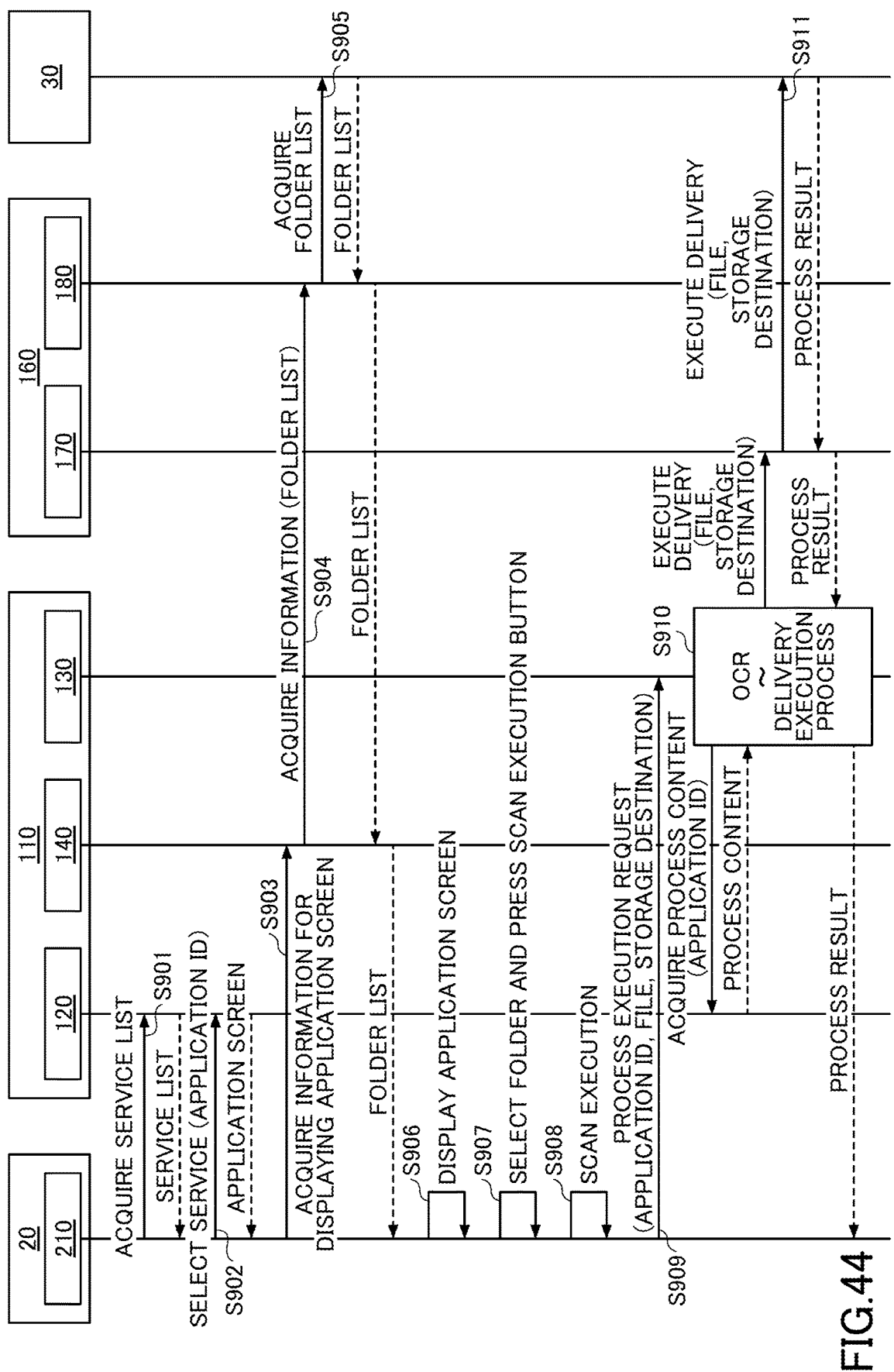
FIG. 44 is a sequence diagram illustrating an example of the overall processing of a scan delivery service according to the seventh embodiment of the present invention.

First, the overall process when the user of the apparatus 20 uses the scan delivery service according to the present embodiment will be described. FIG. 44 is a sequence diagram illustrating an example of the overall process of the scan delivery service according to the seventh embodiment.

First, the user of the apparatus 20 performs an operation to acquire a list of services provided by the service providing system 10 using the browser 210. In step S901, the apparatus 20 transmits a request for acquiring a list of services to the service processing unit 110 of the service providing system 10. When the application managing unit 120 of the service processing unit 110 receives the acquisition request, the application managing unit 120 transmits a list of services provided by the service providing system 10 to the apparatus 20. This causes the browser 210 of the apparatus 20 to display a list of the services provided by the service providing system 10 on the operation panel 940 of the apparatus 20. The list of services includes the service name of the service provided by the service providing system 10 and the application ID of the application information 1000 for implementing the service.

The user selects the service he or she wishes to use from a list of services displayed on the operation panel 940 of the apparatus 20. In step S902, the browser 210 transmits the application ID of the application information 1000 for implementing the selected service to the application managing unit 120. Here, it is assumed that the user has selected to use the service name "Scan delivery service". Therefore, the browser 210 transmits the application ID "app001" of the application information 1000$_1$ to the application managing unit 120.

The application managing unit 120 generates an application screen in the form of HTML (HyperText Markup Language) based on the screen definition included in the application information 1000$_1$ of the application ID "app001" received from the browser 210 and transmits the application screen to the browser 210.

In step S903, when the browser 210 accepts the application screen from the application managing unit 120, the browser 210 requests the data I/F unit 140 to acquire the display information. Here, the display information is, for example, each selection element in the selection field of the application screen. That is, in the present embodiment, the browser 210 requests the data I/F unit 140 to acquire a list of folders of the storage service A that is the delivery destination (storage destination) of the scan delivery. Such a request can be made by transmitting an HTTP request to the URL "http://sample.xxx.co.jp/sery ee-a/data/folders" defined in "data source" described in the data definition portion 1102 of FIG. 37A. In the URL, the portion of the host name "http://sample.xxx.co.jp" is the host name of the service providing system 10, and the portion of "/service-a/data/folders" specifies the API (i.e., the API illustrated in FIGS. 36A to 36D) of the storage service cooperation unit 160.

Next, when the data I/F unit 140 accepts the request for acquiring the display information from the browser 210, in step S904, the data I/F unit 140 transmits the request to the data processing unit 180 of the corresponding storage service cooperation unit 160. According to the present embodiment, the data I/F unit 140 transmits the request to the data processing unit $180_1$ of the storage service A cooperation unit $160_1$ based on the "service-a" (storage service name) included in the above-described URL.

In step S905, when the request is accepted from the data I/F unit 140, the data processing unit 180 transmits a corresponding processing request to the external system 30 based on the URL included in the request. That is, the data processing unit 180 requests the corresponding external system 30 to perform a process based on the URL included in the request accepted from the data I/F unit 140 using the API defined in the common I/F 181 or the unique I/F 182. In the present embodiment, based on "/service-a/data/folders" included in the URL, the data processing unit 180 requests the storage service A to acquire a folder list using the API defined in the common I/F 181. Then, the browser 210 receives the list of folders via the storage service A cooperation unit 1601. The folder list is information such as the folder name and the folder ID of the storage service A which is a candidate storage destination for storing an electronic file in the scan delivery service according to the present embodiment.

Next, the browser 210 displays an application screen 2000, for example, illustrated in FIG. 45A, on the operation panel 940 based on the application screen and the folder list received from the application managing unit 120 in step S902 (step S906).

Here, the application screen 2000 for using the scan delivery service illustrated in FIG. 45A includes a file name input field 2001, a storage destination folder selection field 2002, and a scan execution button 2003. Among these, the file name input field 2001 and the storage destination folder selection field 2002 are described by HTML source codes 2101 and 2102, respectively, as illustrated in FIG. 45B. The HTML source codes 2101 and 2102 are generated by the application managing unit 120 based on the data definition portions 1101 and 1102 illustrated in FIG. 37A and the layout definition portions 1301 and 1302 illustrated in FIG. 38A. However, the setting value of "option" specified in the HTML source code 2102 is set by the browser 210 based on the list of folders acquired from the external system 30. As described above, the application screen 2000 is generated by setting the information of the folder list, acquired from the external system $30_1$, to the HTML generated by the application managing unit 120 based on the screen definition of the application information 10001.

Next, in the application screen 2000 of FIG. 45A, the user inputs the desired file name in the file name input field 2001 and selects the desired storage destination folder from the storage destination folder selection field 2002. In step S907, a document is set in the input unit 24 of the apparatus 20, and the scan execution button 2003 is pressed. Here, it is assumed that the user inputs a file name "test" in the file name input field 2001, selects "Folder B" in the storage destination folder selection field 2002, and then presses the scan execution button 2003. Accordingly, the document is read by the input unit 24 of the apparatus 20, and an electronic file having the file name "test" is generated (step S908).

In step S909, the browser 210 transmits a request for executing a process of the scan delivery service (process execution request), to the logic processing unit 130. Here, the execution request includes an application ID "app001", the electronic file generated in step S908 above, and a folder ID "folder_id_b" of the selected storage destination folder "FolderB".

In step S910, when the process execution request is accepted, the logic processing unit 130 acquires the process content from the application information 1000 of the application ID included in the process execution request via the application managing unit 120 and executes the process according to the process content. That is, in the scan delivery service according to the present embodiment, after performing the OCR process on the electronic file included in the process execution request, the electronic file that has undergone the OCR process is delivered (uploaded) to the folder "FolderB" of the storage service A. Details of the process of this step S910 will be described later. Here, the description is continued assuming that the logic processing unit 130 has transmitted a request for executing delivery (delivery execution request) including the electronic file that has undergone the OCR process and the folder ID "folder_id_b" of the folder "FolderB", to the file processing unit $170_1$ of the storage service A cooperation unit 1601.

In step S911, when the file processing unit 170 accepts the delivery execution request from the logic processing unit 130, the file processing unit 170 requests the corresponding external system 30 to execute a process, using the API defined in the common I/F 171 or the unique I/F 172. Specifically, in the present embodiment, the electronic file is delivered (uploaded) to the folder "FolderB" using the API "/service-a/process/folder" for storing the file in the storage service A defined in the common I/F 1711 of the file processing unit $170_1$. Then, when the upload of the electronic file is completed, the process result is displayed on the browser 210. Thus, the scan delivery service according to the present embodiment is completed.

Next, the process of the information processing system 1 according to the present embodiment will be described in detail. In the present embodiment, a description is given of a case in which a series of processes for implementing a scan delivery service includes a process executed by an external component. That is, the scan delivery service according to the present embodiment is implemented by a series of processes formed of a process executed by an internal component and a process executed by an external component.

<<Process from OCR to Delivery Execution According to the Seventh Embodiment>>

Figure 46:
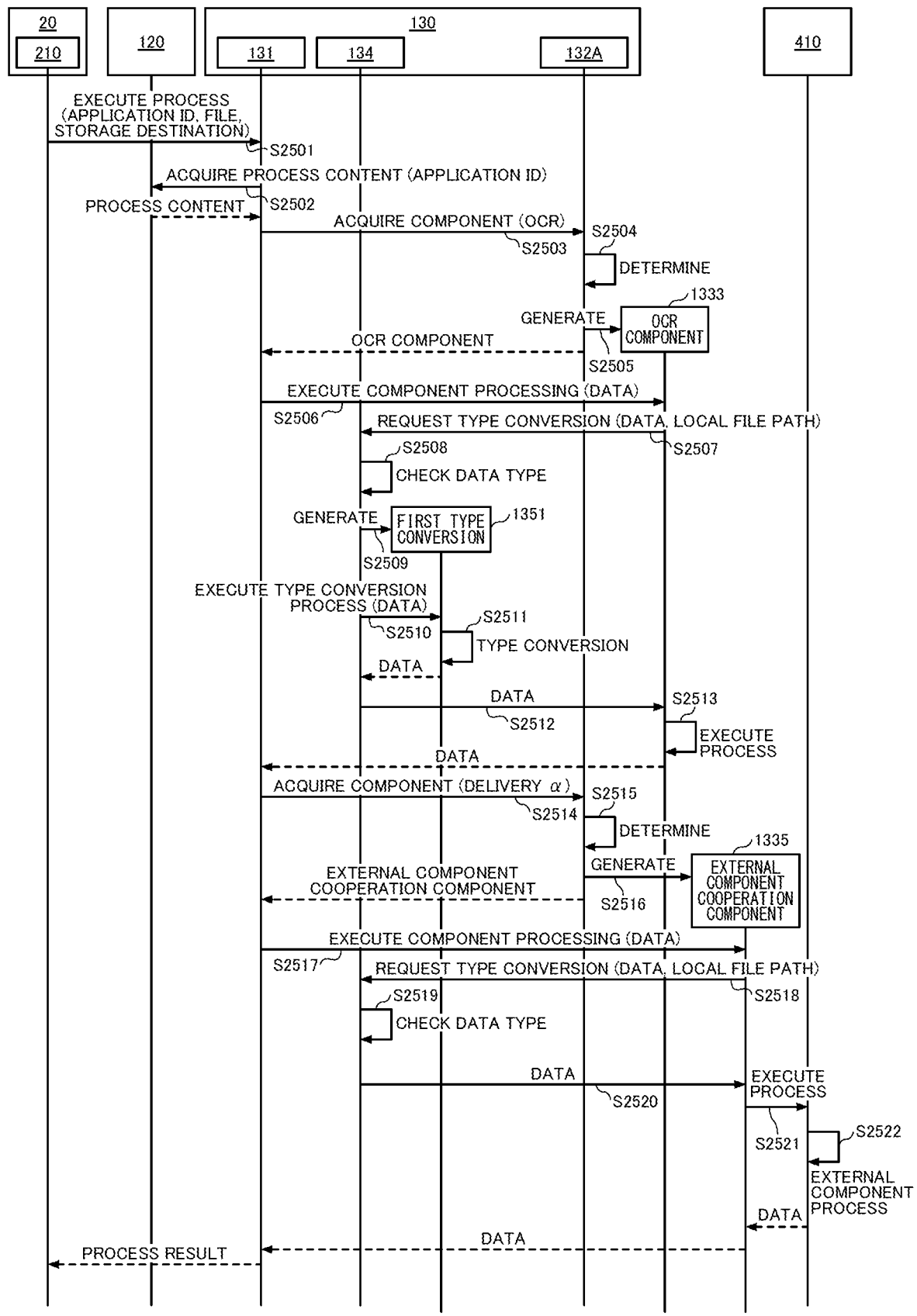
FIG. 46 is a sequence diagram illustrating an example of processing from OCR to execution of delivery according to the seventh embodiment of the present invention.

FIG. 46 is a sequence diagram illustrating an example of a process from OCR to the execution of delivery according to the seventh embodiment. First, in step S2501, the flow executing unit 131 accepts the process execution request for a scan delivery service from the browser 210. Here, the execution request includes an application ID "app001", the electronic file generated in step S908 of FIG. 44, and a folder ID (storage destination) of the selected storage destination folder "FolderB". Here, it is assumed that the electronic file having the data type "InputStream" (i.e., stream data) is transferred from the browser 210.

In step S2502, when the flow executing unit 131 accepts the request for executing the scan delivery service from the browser 210, the flow executing unit 131 requests the application managing unit 120 to acquire the process content. In the present embodiment, it is assumed that the process content illustrated in FIG. 47 is acquired by the flow executing unit 131.

In step S2503, the flow executing unit 131 requests the component managing unit 132A to acquire a component according to the acquired process content. More specifically, the flow executing unit 131 requests the component managing unit 132A to acquire the component whose component name is "ocr" based on ".to ("process:ocr")" specified after "from ("file:input")" of the process content illustrated in FIG. 47.

In step S2504, when the component managing unit 132A accepts the component acquisition request, the component managing unit 132A determines whether the component relating to the acquisition request is an internal component or an external component by referring to the component management table 5000.

That is, the component managing unit 132A determines whether the host name associated with the component name included in the acquisition request is "localhost", in the component management table 5000. Then, when the host name is "localhost", the component managing unit 132A determines that the component relating to the acquisition request is an internal component. On the other hand, when the host name is not "localhost", the component managing unit 132A determines that the component relating to the acquisition request is an external component.

Here, in the component management table 5000, the host name associated with the component name "ocr" is "localhost". Accordingly, the component managing unit 132A determines that the component relating to the acquisition request is an internal component.

In step S2505, the component managing unit 132A generates an internal component corresponding to the component name included in the acquisition request when it is determined that the component relating to the component acquisition request is an internal component. That is, the component managing unit 132A generates the OCR component 1333 corresponding to the component name "ocr" included in the acquisition request.

The component managing unit 132A returns the generated OCR component 1333 to the flow executing unit 131.

In step S2506, the flow executing unit 131 specifies data and requests the execution of a process to the generated OCR component 1333. The data specified here is an electronic file having the data type "InputStream" transferred from the browser 210. That is, the flow executing unit 131 simply transfers an electronic file, having the data type "InputStream" transferred from the browser 210, to the OCR component 1333 as "data" (without considering the data type) and requests the execution of a process. In FIG. 46, an electronic file and the like which is transferred without considering the data type, is simply referred to as "data".

In step S2507, the OCR component 1333 requests the type conversion managing unit 134 to execute type conversion. Here, the type conversion request includes data and a "Local FilePath" specification indicating the data type that the OCR component 1333 can handle.

In step S2508, the type conversion managing unit 134 checks whether the data type of the data included in the received type conversion request matches with the specified data type. Here, the data type of data included in the received type conversion request is "InputStream", while the specified data type is "LocalFilePath", so it is determined that the data types do not match.

In step S2509, the type conversion managing unit 134 identifies the type conversion for converting "InputStream" to "Local FilePath" with reference to the type conversion table 3000 (in which the first type conversion 1351 is identified), and generates the identified type conversion.

In step S2510, the type conversion managing unit 134 specifies data and requests the generated first type conversion 1351 to execute a type conversion process. In step S2511, the first type conversion 1351 converts the data type of the specified data from "InputStream" to "Local FilePath" and returns the data after the conversion to the type conversion managing unit 134. Thereafter, in step S2512, the type conversion managing unit 134 transmits the data after the type conversion to the OCR component 1333.

In step S2513, the OCR component 1333 executes the process upon receiving the data after the type conversion. That is, an OCR process is performed for the electronic file indicated by the data (i.e., a path or an address) of data type "Local FilePath". More specifically, the OCR component 1333 requests the process execution to the OCR process 151 of the document service unit 150, and the OCR process 151 executes the process on the electronic file. The OCR component 1333 returns data to the flow executing unit 131. Here, the data to be returned is a path or an address indicating an electronic file after the OCR process (i.e., the data type of the data to be returned is "LocalFilePath").

Next, in step S2514, the flow executing unit 131 requests the component managing unit 132A to acquire a component according to the acquired process content. More specifically, the flow executing unit 131 requests the component managing unit 132A to acquire the component whose component name is "send_to_folder α" based on ".to ("store:send_to_folder α?type=service-b")" specified after ".to ("process:ocr")" in the process content illustrated in FIG. 47. Note that in the specified process content, the portion of "?type=service-b" is an optional parameter and indicates that the data is to be uploaded to "storage service B" by the process by the component of the component name "send_to_folder α".

When the component managing unit 132A accepts a component acquisition request, in step S2515, the component managing unit 132A determines whether the component relating to the acquisition request is an internal component or an external component by referring to the component management table 5000.

That is, in the component management table 5000, the component managing unit 132A determines whether the host name associated with the component name included in the acquisition request is "localhost". Then, when the host name is "localhost", the component managing unit 132A determines that the component relating to the acquisition request is an internal component. On the other hand, when the host name is not "localhost", the component managing unit 132A determines that the component relating to the acquisition request is an external component.

Here, in the component management table 5000, the host name associated with the component name "send_to_folder α" is "server 2.com". Accordingly, the component managing unit 132A determines that the component relating to the acquisition request is an external component.

In step S2516, the component managing unit 132A generates the external component cooperation component 1335 when it is determined that the component relating to the component acquisition request is an external component.

As described above, the service providing system 10 according to the present embodiment generates the external component cooperation component 1335 when the component relating to the component acquisition request is an external component.

The component managing unit 132A returns the generated external component cooperation component 1335 to the flow executing unit 131.

In step S2517, the flow executing unit 131 specifies data and requests the generated external component coordinating component 1335 to execute a process. The data type of the data specified here is "Local FilePath".

In step S2518, the external component 1335 requests the type conversion managing unit 134 to execute type conversion. Here, the type conversion request includes data and a "Local FilePath" specification indicating the data type that the external component 1335 can handle.

In step S2519, the type conversion managing unit 134 checks whether the data type of the data included in the received type conversion request matches with the specified data type. Here, the data type of data included in the received type conversion request is "LocalFilePath", and the specified data type is also "LocalFilePath", so it is determined that the data types match. In step S2520, the type conversion managing unit 134 directly transmits the data included in the type conversion request to the external component cooperation component 1335.

In step S2521, the external component 1335 executes a process when data is received from the type conversion managing unit 134. That is, the external component cooperation component 1335 requests the external component processing unit 410 of the external component management apparatus 40 indicated by the host name "server 2.com" to execute a process including the component name "send_to_folder.α" and the data. The execution request includes the optional parameter "?type=service-b" which indicates the storage service that is the upload destination described above.

Next, in step S2522, when the external component processing unit 410 accepts the process execution request from the external component cooperation component 1335, the external component processing unit 410 executes the external component processing according to the process execution request. The external component processing unit 410 returns data indicating the process result.

Figure 48:
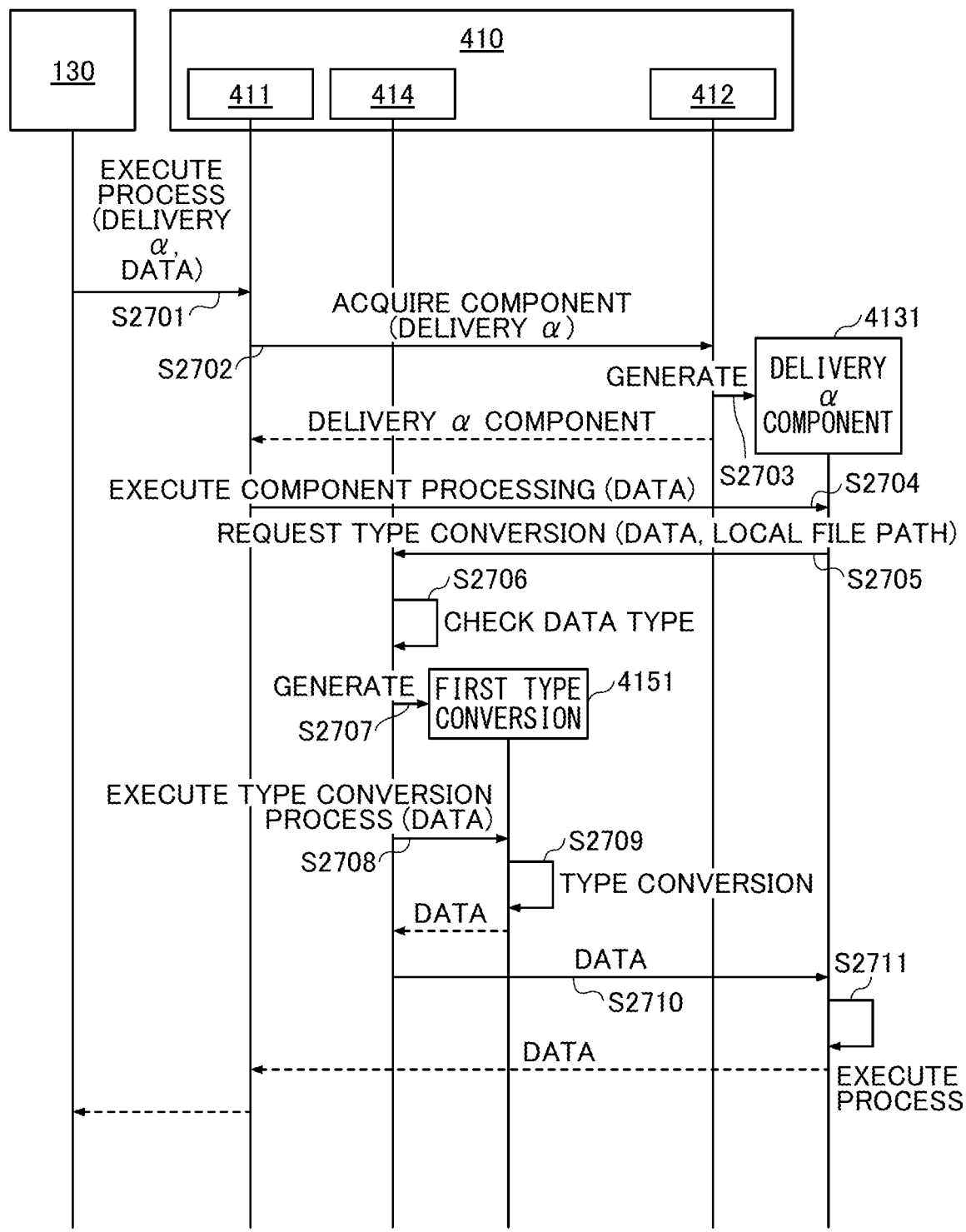
FIG. 48 is a sequence diagram illustrating an example of an external component process according to the seventh embodiment of the present invention.

Here, the above-described process of step S2522 will be described in detail. FIG. 48 is a sequence diagram illustrating an example of the external component process according to the seventh embodiment.

First, in step S2701, the request accepting unit 411 accepts the process execution request from the logic processing unit 130 (more specifically, the external component cooperation component 1335). The execution request includes the component name "send_to_folder α" of the external component, the data, and the optional parameter "?type=service-b".

If no optional parameters are specified in the process content, the process execution request does not include optional parameters. The data included in the execution request to be transferred has a data type "InputStream".

In step S2702, when the process execution request is accepted, the request accepting unit 411 requests the component managing unit 412 to acquire the external component having the component name "send_ to_folder α" included in the execution request.

In step S2703, when the request for acquiring an external component is accepted, the component managing unit 412 generates the delivery α component 4131 corresponding to the component name "send_to_folder α" included in the acquisition request. The generation of the delivery α component 4131 can be performed using the API for generating a component defined in the component common I/F 4130.

The component managing unit 412 returns the generated delivery α component 4131 to the request accepting unit 411. For example, the component managing unit 412 returns an address in a memory in which the delivery α component 4131 is loaded (e.g., the RAM) to the request accepting unit 411.

In step S2704, the request accepting unit 411 specifies the data and requests the generated delivery α component 4131 to execute the process.

In step S2705, when the delivery α component 4131 accepts the process execution request, the delivery α component 4131 requests the type conversion managing unit 414 to perform the type conversion. Here, the type conversion request includes data and a "Local FilePath" specification indicating the data type that can be handled by the delivery α component 4131.

In step S2706, the type conversion managing unit 414 checks whether the data type of the data included in the accepted type conversion request matches with the specified data type. The data type of data included in the accepted type conversion request is "InputStream", while the specified data type is "LocalFilePath", so it is determined that the data types do not match.

In step S2707, the type conversion managing unit 414 identifies a type conversion for converting "InputStream" to "Local FilePath" with reference to the type conversion table 6000 (here, the first type conversion 4151 is identified) and generates the identified type conversion.

In step S2708, the type conversion managing unit 414 specifies data and requests the generated first type conversion 4151 to execute the type conversion process. In step S2709, the first type conversion 4151 converts the data type of the specified data from "InputStream" to "Local FilePath" and returns the data after the conversion to the type conversion managing unit 414.

Thereafter, in step S2710, the type conversion managing unit 414 transmits the data after the type conversion to the delivery α component 4131.

In step S2711, the delivery α component 4131 executes a process upon accepting data from the type conversion managing unit 414. That is, in the present embodiment, the delivery α component 4131 executes the delivery of data to the storage service B.

The delivery α component 4131 delivers the data to the storage service B involving the storage service B cooperation unit 160$_2$. As described above, unlike the internal component, the external component executes various processes such as a delivery process and an OCR process without using the storage service cooperation unit 160 or the document service unit 150. However, the present embodiment is not limited thereto. The external components may execute various kinds of processes by making a process request to the storage service cooperation unit 160 and the document service unit 150 in the same manner as the internal components.

The delivery α component 4131 returns data indicating the process result. Accordingly, a scan delivery service according to the present embodiment is provided.

As described above, when the process content includes a process to be executed by an external component, the service providing system 10 according to the present embodiment requests the external component management apparatus 40 that manages the external component to execute the process. The external component is executed in the external component management apparatus 40 that is a different apparatus from the service providing system 10.

Thus, for example, even in the case where a significant bug or failure exists in an external component developed by a third vendor and the like, the impact of the bug or failure can be localized within the external component management apparatus 40. That is, the servicing providing system 10 can continue to provide services without being affected by bugs or failures of external components.

In the present embodiment, the external component is managed by the external component management apparatus 40. However, for example, after the quality of the external component is secured, the external component may be managed by the service providing system 10.

<<Process of Creating Process Content According to the Seventh Embodiment>>

Next, a process in which a user such as the developer of the application information 1000 creates the process content included in the application information 1000 will be described. FIG. 49 is a sequence diagram illustrating an example of a process of creating a process content according to the seventh embodiment.

First, the user of the apparatus 20 performs an operation to display the creation screen of the process content using the browser 210. In step S2801, the browser 210 of the apparatus 20 requests the process content creating unit 122 to acquire the process content creation screen.

Figure 50A:
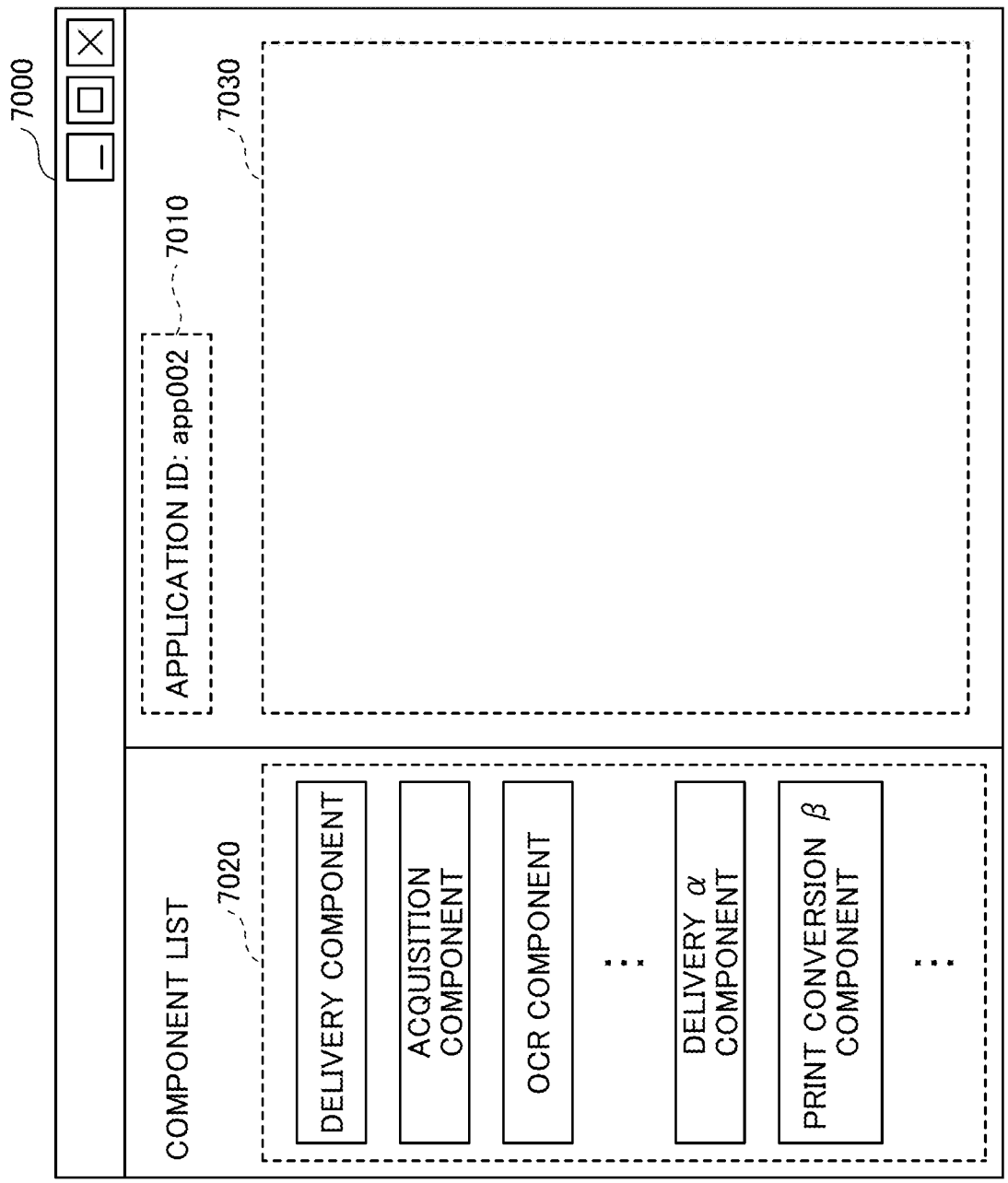
FIGS. 50A and 50B are diagrams for explaining an example of creating a process content according to the seventh embodiment of the present invention.

In step S2802, the process content creating unit 122 acquires a list of components (for example, a list of component names) from the component management table 5000 and creates a content process creation screen 7000 as illustrated in FIG. 50A. The process content creating unit 122 returns the created process content creation screen 7000 to the browser 210.

Here, the content process creation screen 7000 illustrated in FIG. 50A includes an application ID display field 7010, a component display field 7020, and a process content creation field 7030.

In the application ID display field 7010, the application ID of the application information 1000 including the process content to be created is displayed. For example, the application ID may be specified by the user in step S2801 above.

The component display field 7020 displays a list of icons (parts of the display processing unit 21) representing each component. A list of icons representing such components is created based on the component names acquired from the component management table 5000. The process content creation field 7030 is an area for the user to create the process content. For example, the process content can be created by dragging and dropping an icon representing the component included in the component display field 7020.

Figure 50B:
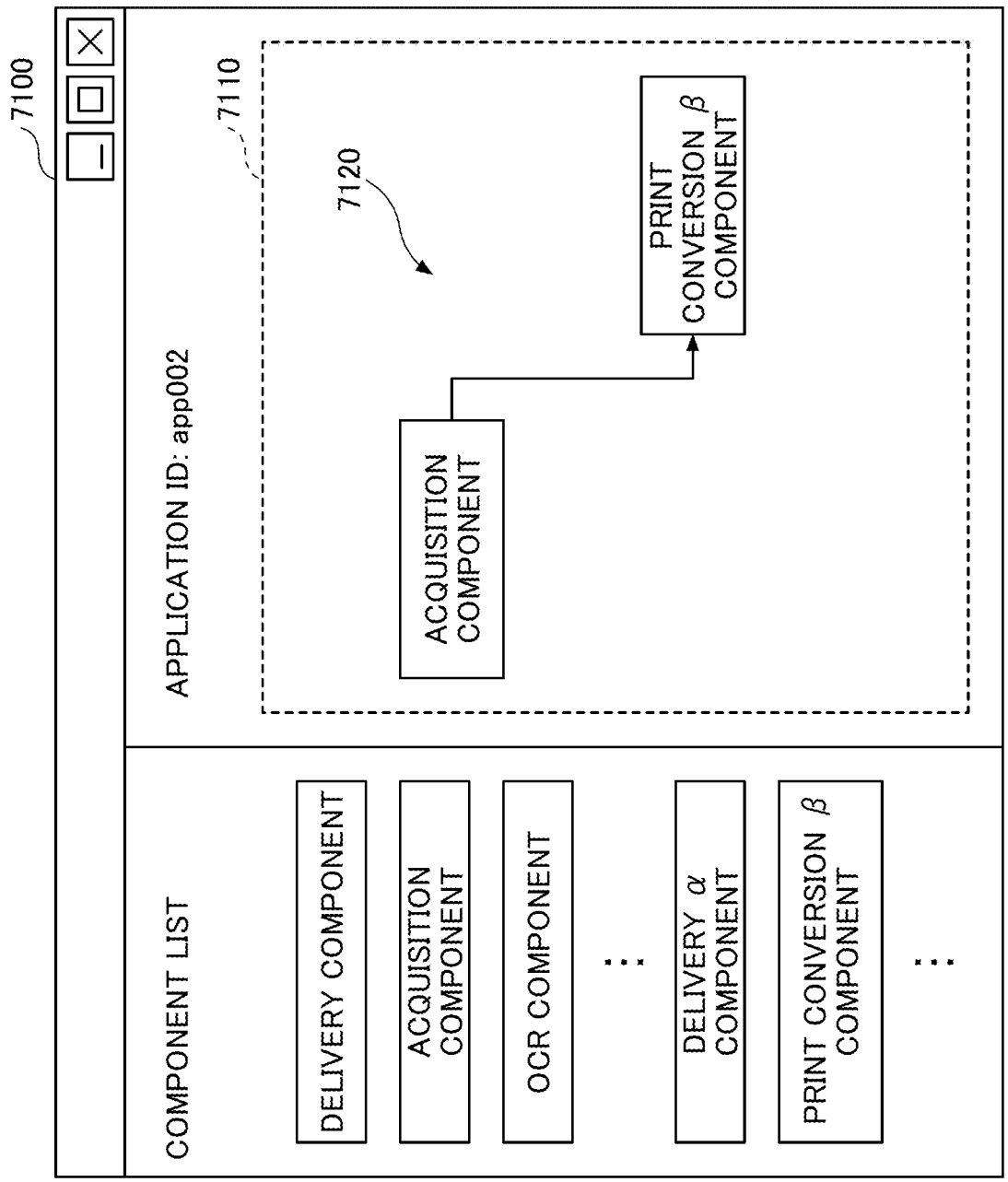

Here, the user is assumed to use the browser 210 to drag and drop the acquisition component included in the component display field 7020 and the print conversion β component into the process content creation field 7030 in this order. Then, as illustrated in FIG. 50B, a flow 120 schematically representing the process content is created in a process content creation field 7110 of the process content creation screen 7100. The flow 120 indicates the process of executing the acquisition component that is an internal component and then executing the print conversion β component that is an external component.

Accordingly, the process content is created by the user. Further, at this time, the user can create the process content without considering whether the component executing the series of processes included in the process content is an internal component or an external component. Accordingly, the user can easily create the process content.

In step S2803, the browser 210 of the apparatus 20 accepts the created process content when the user creates the process content. In step S2804, the browser 210 of the apparatus 20 requests the process content creating unit 122 to store the created process content. The storage request includes the application ID and the process content created by the user.

In step S2805, when the process content creating unit 122 of the service processing unit 110 accepts the request to store the process content, the storage request is transferred to the application managing unit 120. Next, when the application managing unit 120 accepts the process content storage request, in step S2806, the process content included in the storage request is associated with the application ID and stored in the application information storage unit 190. The application managing unit 120 returns the storage result. Thus, the process content created by the user is stored in the application information storage unit 190.

<Overview of the Seventh Embodiment>

As described above, according to the information processing system 1, the service providing system 10 can provide a service in cooperation with an external service to the apparatus 20. Further, the service providing system 10 can easily add or change the external service of the partner. Further, the service providing system 10 can easily add or change the service provided to the apparatus 20 (i.e., add to or change the application information 1000). Accordingly, the service providing system 10 according to the first embodiment can reduce the man-hours required for development and maintenance associated with the addition or modification of services.

The external components developed by the third vendor and the like can be managed and executed by the external component management apparatus 40 which is a different apparatus from the service providing system 10. Accordingly, even in a case where the quality of the external component is insufficient, for example, when there is a bug or a failure in the external component, the impact of a bug or failure can be localized to the external component management apparatus 40.

Accordingly, according to the information processing system 1 according to the seventh embodiment, for example, a situation in which the processing capacity of the service providing system 10 decreases or the service providing system 10 stops due to a bug or a failure in an external component, can be prevented.

<Other Applications>

While the preferred embodiment of the present invention has been described with reference to examples, various modifications and substitutions may be made thereto without departing from the spirit and scope of the invention. A process combining the embodiments may be executed.

Further, although the image forming apparatus is mainly used as the apparatus 20 according to the present embodiment, the apparatus 20 is not limited to the image forming apparatus. The apparatus 20 may be, for example, a Projector (PJ), an Interactive White Board (IWB, a whiteboard having a blackboard function capable of mutual communication), an output device such as a digital signage, a Head Up Display (HUD) device, an industrial machine, an imaging device, a sound collector, a medical device, a network appliance, a connected car, a notebook PC, a mobile phone, a smartphone, a tablet terminal, a game machine, a Personal Digital Assistant (PDA), a digital camera, a wearable PC, a desktop PC, and the like.

Furthermore, the configuration example of FIG. 5, etc., indicated in the above embodiment is divided according to the main functions to facilitate the understanding of processes by the service providing system 10. The present invention is not limited by how the process units are divided or the names of the process units. The processes of the service providing system 10 may be further divided into many process units according to the process contents. Furthermore, the process units may be divided such that a single process unit further includes many processes.

Also, the apparatus group described in the examples are merely indicative of one of a plurality of computing environments for carrying out the embodiments disclosed herein. In some embodiments, the servicing providing system 10 includes a plurality of computing devices, such as server clusters. The plurality of computing devices are configured to communicate with each other via any type of communication link, including networks, a shared memory, and the like, and perform the processes disclosed herein.

Further, the service providing system 10 may be configured to share various combinations of disclosed processing steps, such as in FIGS. 11 and 16. For example, a process executed by a predetermined unit may be executed by a plurality of information processing apparatuses included in the service providing system 10. The service providing system 10 may be organized into a single server apparatus or may be divided into a plurality of apparatuses.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, an information processing system by which a process can be easily extended, can be provided.

The information processing system, the information processing method, and the apparatus are not limited to the specific embodiments described in the detailed description, and variations and modifications may be made without departing from the spirit and scope of the present invention.

What is claimed is:

1. An information processing system comprising:
a service providing system; and
an apparatus that communicates with the service providing system via a network, wherein
the service providing system includes:
a processing method storage configured to register a processing method in association with identification information of output data to be output by the apparatus, and
a first processor configured to transmit, to the apparatus, the output data to which the identification information of the output data is appended, and wherein the apparatus includes:
a second processor configured to
output the output data received from the service providing system together with the identification information of the output data;
accept input of input data based on the output data output by the second processor together with the identification information of the output data; and
transmit, to the service providing system, the input data input by the second processor, to which the identification information of the output data is appended, wherein
the service providing system performs a process on the input data by the processing method associated with the identification information of the output data appended to the input data,
wherein
upon accepting, by the apparatus, a selection of a first application for outputting the output data received from the service providing system,
the apparatus:
requests the service providing system to transmit a list of the output data,
displays the list of the output data acquired from the service providing system, and
reports, to the service providing system, a selection of the output data accepted at the list, and outputs the output data received from the service providing system, and wherein
upon accepting, by the apparatus, a selection of a second application for accepting the input of the input data based on the output data output by the second processor,
the apparatus accepts the input of the input data together with the identification information of the output data and transmits the input data to the service providing system, and
the service providing system performs the process on the input data by the processing method associated with the identification information of the output data appended to the input data.

2. The information processing system according to claim 1, wherein the apparatus displays a file name of the output data stored in the service providing system or a name of the output data.

3. The information processing system according to claim 1, wherein
in the processing method storage, the processing method is registered in association with identification information of a user,
the apparatus transmits, to the service providing system, the identification information of the user for which authentication is successful,
the service providing system transmits, to the apparatus, the output data to which the identification information of the user and the identification information of the output data are appended, and
upon receiving the input data from the apparatus, the service providing system performs the process on the input data by the processing method associated with the identification information of the output data appended to the input data and the processing method associated with identification information of the user.

4. The information processing system according to claim 3, wherein
in the processing method storage, the processing method is registered in association with the identification information of the user, the apparatus transmits, to the service providing system, the input data accepted, by the second processor and the identification information of the user for which the authentication is successful, and upon receiving the input data and the identification information of the user, the service providing system performs the process on the input data by the processing method associated with the identification information of the output data appended to the input data and the processing method associated with identification information of the user.

5. The information processing system according to claim 4, wherein the apparatus displays a screen configured to accept a selection of whether to cause the service providing system to perform the process on the input data by the processing method that is associated with the identification information of the user appended to the output data or the processing method that is associated with the identification information of the user for which the authentication is successful.

6. The information processing system according to claim 1, wherein in the processing method storage, the processing method is registered in association with identification information of a user, the service providing system transmits, to the apparatus, the processing method associated with the identification information of the user transmitted from the apparatus, the apparatus
displays the processing method transmitted from the service providing system, and
transmits, to the service providing system, a selection result of the processing method for which a selection is accepted and the input data accepted by the second processor, and
the service providing system performs the process on the input data by the processing method associated with the identification information of the output data appended to the input data and the processing method identified by the selection result of selecting the processing method.

7. The information processing system according to claim 1, wherein in the processing method storage, the processing method and a post-process message of the output data are registered in association with the identification information of the output data, upon receiving the input data from the apparatus, the service providing system
performs the process on the input data by the processing method associated with the identification information of the output data appended to the input data, and
transmits, to the apparatus, the post-process message associated with the identification information of the output data, and the apparatus displays the post-process message received from the service providing system.

8. The information processing system according to claim 1, wherein the service providing system performs the process on the input data by the processing method associated with the identification information of the output data appended to the input data, and subsequently transmits, to the apparatus, the processing method used for performing the process on the input data, and the apparatus displays the processing method received from the service providing system.

9. The information processing system according to claim 1, wherein the first application corresponds to a first workflow for executing a series of processes in which a plurality of processes are combined, the second application corresponds to a second workflow for executing a series of processes in which a plurality of processes are combined, and upon accepting, by the apparatus, the selection of the first application,
the apparatus displays a selection screen used for selecting the output data, accepts the selection of the output data, and transmits, to the service providing system, the identification information of the output data for which the selection is accepted, and
the service providing system executes the first work flow of acquiring print data corresponding to the identification information of the output data in response to receiving the identification information of the output data from the apparatus, and transmitting, to the apparatus, the output data to which an image code, including the identification information of the output data in the processing method storage, is appended, to cause the apparatus to print out the output data, and upon accepting, by the apparatus, the selection of the second application,
the apparatus reads a document on which the output data, to which the image code is appended, has been printed by execution of the first workflow, and transmits, to service providing system, the input data generated by reading the document, and
the service providing system executes the second workflow of analyzing the image code included in the input data to acquire the identification information of the output data, and transmitting the input data to a transmission destination relating to the identification information of the output data, based on the processing method associated with the identification information of the output data, among the processing methods registered in the processing method storage based on the acquired identification information of the output data.

10. The information processing system according to claim 9, wherein the processing method storage, a print data storage configured to store the print data, and a read data storage configured to store image data generated by reading the document, are provided in a cloud storage connected to the service providing system via a network, the first processor is further configured to accept input of account information of the cloud storage and a setting specifying the processing method storage, the print data storage, and the read data storage in the cloud storage as reference destinations to be referred to when the first workflow and the second workflow are executed, and wherein upon determining that the first workflow is executed,
the service providing system
refers to the processing method storage for which the setting has been accepted by the first processor,
acquires the output data, corresponding to the identification information transmitted from the apparatus, from the print data storage for which the setting has been accepted by the first processor, and transmits the output data to the apparatus upon appending the image code to the output data, and wherein
upon determining that the second workflow is executed, the service providing system
refers to the processing method storage for which the setting has been accepted by the first processor, and
transmits the input data, generated by the apparatus by reading the document, to the read data storage, for which the setting has been accepted by the first processor, to be stored in the read data storage as a transmission destination corresponding to the identification information of the output data, based on the processing method corresponding to the identification information of the output data acquired from the image code.

11. The information processing system according to claim 10, wherein
the processing method stored in the processing method storage is acquired by a terminal apparatus via a network, the terminal apparatus displays the acquired processing method, and editing is accepted with respect to the processing method displayed by the terminal apparatus, the editing including changing the transmission destination for each piece of identification information of the document or changing the transmission destination for each piece of identification information of a user, and
the service providing system performs the process by referring to the processing method that has been edited when executing the first workflow or the second workflow.

12. An information processing method performed by an information processing system including a service providing system and an apparatus that communicate with each other via a network, the information processing method comprising:
transmitting, by the service providing system to the apparatus, output data to which identification information of the output data to be output by the apparatus is appended;
outputting, by the apparatus, the output data received from the service providing system together with the identification information of the output data;
accepting, by the apparatus, input of input data based on the output data that has been output, together with the identification information of the output data;
transmitting, from the apparatus to the service providing system, the input data that has been input, to which the identification information of the output data is appended; and
performing, by the service providing system, a process on the input data by a processing method associated with the identification information of the output data appended to the input data, wherein the method further comprises
upon accepting, by the apparatus, a selection of a first application for outputting the output data received from the service providing system,
requesting, by the apparatus, the service providing system to transmit a list of the output data,
displaying, by the apparatus, the list of the output data acquired from the service providing system, and
reporting, by the apparatus, to the service providing system, a selection of the output data accepted at the list, and outputting the output data received from the service providing system, and wherein the method further comprises
upon accepting, by the apparatus, a selection of a second application for accepting the input of the input data based on the output data output by the second processor,
accepting, by the apparatus, the input of the input data together with the identification information of the output data and transmits the input data to the service providing system, and
performing, by the service providing system, the process on the input data by the processing method associated with the identification information of the output data appended to the input data.

13. An apparatus for communicating with a service providing system via a network, the apparatus comprising:
a second processor configured to:
output output data to which identification information of the output data is appended, received from the service providing system, together with the identification information of the output data;
accept input of input data based on the output data output by the outputter together with the identification information of the output data; and
transmit, to the service providing system, the input data input by the inputter, to which the identification information of the output data is appended, wherein
the service providing system performs a process on the input data by a processing method associated with the identification information of the output data appended to the input data,
wherein
upon accepting, by the apparatus, a selection of a first application for outputting the output data received from the service providing system,
the apparatus:
requests the service providing system to transmit a list of the output data,
displays the list of the output data acquired from the service providing system, and
reports, to the service providing system, a selection of the output data accepted at the list, and outputs the output data received from the service providing system, and wherein
upon accepting, by the apparatus, a selection of a second application for accepting the input of the input data based on the output data output by the second processor,
the apparatus accepts the input of the input data together with the identification information of the output data and transmits the input data to the service providing system, and
the service providing system performs the process on the input data by the processing method associated with the identification information of the output data appended to the input data.

* * * * *